(12) United States Patent
Xu

(10) Patent No.: US 11,848,016 B2
(45) Date of Patent: Dec. 19, 2023

(54) VOICE CONTROL COMMAND GENERATION METHOD AND TERMINAL

(71) Applicant: Huawei Technologies Co., Ltd., Shenzhen (CN)

(72) Inventor: Jun Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 489 days.

(21) Appl. No.: 17/266,448

(22) PCT Filed: Aug. 7, 2018

(86) PCT No.: PCT/CN2018/099253
§ 371 (c)(1),
(2) Date: Feb. 5, 2021

(87) PCT Pub. No.: WO2020/029094
PCT Pub. Date: Feb. 13, 2020

(65) Prior Publication Data
US 2021/0295839 A1    Sep. 23, 2021

(51) Int. Cl.
*G10L 15/22*        (2006.01)
*H04M 1/72448*   (2021.01)
(Continued)

(52) U.S. Cl.
CPC .............. *G10L 15/22* (2013.01); *G10L 15/08* (2013.01); *H04M 1/72403* (2021.01);
(Continued)

(58) Field of Classification Search
CPC ....... G10L 15/22; G10L 15/08; G10L 15/193; G10L 15/26; G10L 2015/223;
(Continued)

(56) References Cited

U.S. PATENT DOCUMENTS

2008/0140413 A1    6/2008   Millman et al.
2012/0035935 A1    2/2012   Park et al.
(Continued)

FOREIGN PATENT DOCUMENTS

CN    102510426 A    6/2012
CN    102855872 A    1/2013
(Continued)

*Primary Examiner* — Don N Vo
(74) *Attorney, Agent, or Firm* — Conley Rose, P.C.

(57) ABSTRACT

A voice control command generation method includes displaying, by a terminal, prompt information in response to a first operation, where the prompt information prompts a user to enter a to-be-recorded operation, receiving, by the terminal, one or more operations from the user, recording, by the terminal in response to a second operation of the one or more operations, operation information corresponding to the one or more operations determining, by the terminal based on a third operation of the one or more operations, first text information corresponding to the operation information, receiving, by the terminal, a first voice command, and performing, by the terminal, a corresponding operation based on the operation information when a text of the first voice command matches the first text information.

20 Claims, 37 Drawing Sheets

(51) Int. Cl.
*H04M 1/72403* (2021.01)
*G10L 15/08* (2006.01)

(52) U.S. Cl.
CPC .... *H04M 1/72448* (2021.01); *H04M 2201/40* (2013.01); *H04M 2250/74* (2013.01)

(58) Field of Classification Search
CPC ........ G10L 2015/221; G10L 2015/225; H04M 1/72403; H04M 1/72448; H04M 2201/40; H04M 2250/74; H04M 1/271; G06F 3/167
USPC .......................................................... 455/418
See application file for complete search history.

(56) References Cited

U.S. PATENT DOCUMENTS

| | | | |
|---|---|---|---|
| 2014/0270258 A1* | 9/2014 | Wang | G06F 3/167 |
| | | | 381/110 |
| 2014/0278419 A1 | 9/2014 | Bishop et al. | |
| 2015/0133109 A1 | 5/2015 | Freeman et al. | |
| 2015/0235642 A1 | 8/2015 | Nishikawa et al. | |
| 2015/0348551 A1 | 12/2015 | Gruber et al. | |
| 2016/0104484 A1 | 4/2016 | Chakladar et al. | |
| 2016/0155442 A1 | 6/2016 | Kannan et al. | |
| 2016/0225369 A1 | 8/2016 | Agrawal et al. | |
| 2018/0121810 A1 | 5/2018 | Guo et al. | |
| 2018/0122366 A1* | 5/2018 | Nishikawa | G06F 3/167 |
| 2019/0066675 A1 | 2/2019 | Liang et al. | |
| 2019/0279638 A1* | 9/2019 | Kwon | H04N 21/482 |
| 2020/0219510 A1 | 7/2020 | Pan | |
| 2020/0349947 A1* | 11/2020 | Kim | G06F 3/167 |

FOREIGN PATENT DOCUMENTS

| | | |
|---|---|---|
| CN | 202798881 U | 3/2013 |
| CN | 105354199 A | 2/2016 |
| CN | 105869640 A | 8/2016 |
| CN | 105895093 A | 8/2016 |
| CN | 106128456 A | 11/2016 |
| CN | 106528531 A | 3/2017 |
| CN | 107015962 A | 8/2017 |
| CN | 107015964 A | 8/2017 |
| CN | 107122179 A | 9/2017 |
| CN | 107277904 A | 10/2017 |
| CN | 107506434 A | 12/2017 |
| CN | 107861706 A | 3/2018 |
| EP | 3010015 A1 | 4/2016 |
| JP | 2008033835 A | 2/2008 |
| JP | 2011199902 A | 10/2011 |
| JP | 2018077696 A | 5/2018 |
| KR | 20160043836 A | 4/2016 |
| KR | 20170092550 A | 8/2017 |
| WO | 2015144065 A1 | 10/2015 |

* cited by examiner

VOICE CONTROL COMMAND GENERATION METHOD AND TERMINAL

CROSS-REFERENCE TO RELATED APPLICATIONS

This application is a U.S. National Stage of International Patent Application No. PCT/CN2018/099253 filed on Aug. 7, 2018, which is hereby incorporated by reference in its entirety.

TECHNICAL FIELD

Embodiments of this application relate to the field of voice control technologies, and in particular, to a voice control command generation method and a terminal.

BACKGROUND

A voice assistant is an important application of a terminal (for example, a mobile phone). The voice assistant may perform intelligent conversation and instant question and answer-based intelligent interaction with a user. Custom voice control of the voice assistant has become a development trend of the voice assistant.

The custom voice control of the voice assistant means that the voice assistant may receive a custom command (voice data or text information) entered by the user, and bind the custom command to an operation that the user expects to control, by using the custom command, the terminal to perform. In this way, when the voice assistant receives a voice command corresponding to the custom command next time, the terminal can automatically perform an operation bound to the custom command.

Some terminals can provide a custom voice control function of the voice assistant. However, an operation that can be bound to a custom command is predefined. To be specific, the user can select an operation that needs to be bound to the custom command only from the predefined operation. If the operation that the user expects to control, by using the custom command, the terminal to perform is not included in the foregoing predefined operation, the voice assistant cannot provide the custom voice control function. In other words, the terminal cannot implement personalized custom voice control of the user.

To resolve the foregoing problem, voice assistants of some other terminals may receive a custom command (for example, "Purchase milk in Taobao") entered by the user, learn operations (for example, tapping a "Taobao" application icon and entering "Milk" in a search box on a home page of "Taobao") corresponding to the custom command of the user in the terminal, and bind the custom command to the operations corresponding to the custom command of the user. In this way, when the voice assistant receives a voice command (for example, "Purchase milk in Taobao") corresponding to the custom command next time, the terminal may sequentially display interfaces for simulating the user to perform the operations (for example, tapping the "Taobao" application icon and entering "Milk" in the search box on the home page of "Taobao") corresponding to the custom command. Finally, the terminal may display a result interface corresponding to the custom command, for example, a search result interface obtained after the user enters "Milk" in the search box on the home page of "Taobao".

However, although the voice assistant may implement personalized custom voice control of the user by learning the operations corresponding to the custom command of the user in the terminal, once the voice assistant binds the custom command to the operations corresponding to the custom command of the user, the terminal may perform the operations corresponding to the custom command only when the user speaks the voice command (for example, "Purchase milk through Taobao") corresponding to the custom command next time word by word. Even if the voice assistant receives a voice command similar to the voice command corresponding to the custom command, the terminal does not perform the operations corresponding to the custom command. Therefore, flexibility of a custom voice control function of the terminal is poor, thereby affecting user experience.

SUMMARY

Embodiments of this application provide a voice control command generation method and a terminal, to improve flexibility of custom voice control and improve user experience.

According to a first aspect, an embodiment of this application provides a voice control command generation method. The voice control command generation method may include: A terminal displays, in response to a first operation, prompt information used to prompt a user to enter a to-be-recorded operation. The terminal receives one or more operations entered by the user. The terminal records, in response to a second operation entered by the user, operation information corresponding to the one or more operations. The terminal determines, based on a third operation entered by the user, first text information corresponding to the operation information. The terminal receives a first voice command. The terminal performs a corresponding operation based on the operation information when a text corresponding to the first voice command matches the first text information.

In this embodiment of this application, the terminal may first obtain the operation information corresponding to the one or more operations, and then determine, based on the third operation of the user, the first text information corresponding to the operation information, namely, text information corresponding to the one or more operations. The first text information is a command that is selected by the user and that conforms to a language habit of the user. After the terminal receives the first voice command, the terminal may perform the corresponding operation based on the operation information provided that the text of the first voice command matches the first text information, instead of performing the corresponding operation only when the user speaks a voice command corresponding to the text information word by word. According to this solution, flexibility of custom voice control can be improved and user experience can be improved.

With reference to the first aspect, in a possible design manner, the first text information includes at least one first part and a second part. That the text corresponding to the first voice command matches the first text information includes: at least one third part in the text corresponding to the first voice command is the same as the at least one first part, and a location relationship between the at least one third part and a fourth part in the first voice command is the same as a location relationship between the at least one first part and the second part in the first text information.

The operation information includes a first application identifier, a first interface identifier, a first search word, and operation indication information. The first application identifier is an identifier of an operation object application corresponding to the one or more operations, the first interface identifier is an identifier of an operation object interface corresponding to the one or more operations, and the operation indication information is used to indicate an operation performed in the operation object interface through the one or more operations.

It may be understood that the at least one first part includes the first application identifier and/or the first interface identifier, and the second part includes the first search word. In other words, the first voice command matches the first text information when the third part in the first voice command is the first application identifier and/or the first interface identifier, and the location relationship between the fourth part and the third part in the first voice command is the same as the location relationship between the first part and the second part in the first text information.

With reference to the first aspect, in another possible design manner, the method in which the terminal displays the prompt information in response to the first operation may include: The terminal displays the prompt information in a first interface of a voice assistant in response to the first operation. The first operation may be a tap operation (for example, a single tap operation) performed by the user on an "Adding a custom command" option in a "Custom voice control" interface in a "Settings" application of the terminal. Alternatively, the first operation may be entering a preset voice command by the user in a voice control interface of the voice assistant. For example, the preset voice command may be "Follow me". The first interface of the voice assistant may be an "Adding a custom command" interface that is in the voice assistant and that is used to add a custom command.

The method in which the terminal receives the one or more operations entered by the user may include: The terminal displays a second interface in response to a fourth operation performed the user in the first interface. The terminal receives the one or more operations entered by the user in the second interface. The second interface is used by the user to enter the one or more operations. For example, the fourth operation may be a second preset gesture entered by the user in the first interface, for example, any gesture such as a tick "\i" gesture, a slide-up gesture, a slide-down gesture, or a circular gesture. Alternatively, the first interface includes a "Start learning" button used to trigger the terminal to learn the to-be-recorded operation. The fourth operation may be a tap operation (for example, a single tap operation) performed by the user on the "Start learning" button in the first interface.

With reference to the first aspect, in another possible design manner, before the terminal determines, based on the third operation entered by the user, the text information corresponding to the operation information, the method in this embodiment of this application further includes: The terminal displays a third interface in response to the second operation. The third interface includes at least two pieces of text information, and the at least two pieces of text information are a statement formed by connecting the first application identifier and/or the first interface identifier and the first search word based on a preset location relationship by using a connection word. That the terminal determines, based on a third operation entered by the user, text information corresponding to the operation information includes: The terminal receives the third operation performed by the user on the first text information in the at least two pieces of text information in the third interface. The terminal determines, in response to the third operation, the first text information as the text information corresponding to the operation information. The third operation is used to select the first text information from the at least two pieces of text information.

After obtaining the operation information corresponding to the one or more operations, the terminal connects the first application identifier and/or the first interface identifier and the first search word based on the preset location relationship by using the connection word to form the statement, so as to obtain a plurality of pieces of text information, and displays the third interface including the plurality of pieces of text information, so that the user selects, from the plurality of pieces of text information, the first text information that conforms to a language habit of the user. The first text information is a command that is selected by the user and that conforms to the language habit of the user. Therefore, after the terminal receives the first voice command, the terminal may perform the corresponding operation based on the operation information provided that the text of the first voice command matches the first text information, instead of performing the corresponding operation only when the user speaks a voice command corresponding to the text information word by word. According to this solution, flexibility of custom voice control can be improved and user experience can be improved.

With reference to the first aspect, in another possible design manner, after the terminal determines, in response to the third operation, the first text information as the text information corresponding to the operation information, before the terminal receives the first voice command, the method in this embodiment of this application may further include: The terminal generates a first template text, so that after receiving the first voice command, the terminal 100 can more quickly and accurately identify that the first voice command is a voice command that matches the first text information, and then perform the corresponding operation based on the operation information. The first template text is generated by replacing the second part in the first text information with type information of the first search word. That the text of the first voice command matches the first text information is specifically: the text of the first voice command matches the first template text. That the text of the first voice command matches the first template text includes: the at least one third part in the text corresponding to the first voice command is the same as the at least one first part, the location relationship between the at least one third part and the fourth part in the first voice command is the same as the location relationship between the at least one first part and the second part in the first text information, and the fourth part is a word of a type indicated by type information in the first template text.

The terminal may replace the first search word in the first text information with the type information of the first search word, to obtain the first template text. If the terminal 100 receives, next time, a voice command that matches the template text, even if an operation corresponding to the voice command is not recorded in the terminal, the terminal may also simulate the user to trigger the terminal to perform the operation corresponding to the voice command, and display a corresponding operation interface. In this way, flexibility of custom voice control can be improved and user experience can be improved.

With reference to the first aspect, in another possible design manner, after the terminal generates the first template text, before the terminal receives the first voice command, the method in this embodiment of this application may further include: The terminal displays a fourth interface, where the fourth interface is used to prompt the user to send, through the voice assistant, the first voice command that matches the first template text, to trigger the terminal to perform a corresponding operation. Optionally, the fourth interface may further include a statement instance of the first template text. For example, the statement instance of the first template text "Purchase ** through Taobao" may include "Purchase a pen through Taobao" and "Purchase milk through Taobao". The fourth interface may be used to prompt the user to use a voice command that matches the first template text to trigger the terminal to perform a corresponding operation, so that the user can send, through the voice assistant, the voice command indicated by the fourth interface, to trigger the terminal to perform the corresponding operation.

With reference to the first aspect, in another possible design manner, considering that the user may have different names (or statements) for a same object, before displaying the fourth interface, the terminal may further display a fifth interface including an alias input box. The alias input box is used to receive second text information. The second text information is an alias created by the user for the first text information. In this way, the user may create the alias for the first text information in the alias input box.

Optionally, the fifth interface may further include prompt information used to indicate the user to enter the second text information in the alias input box. For example, the fifth interface further includes prompt information "Tip: You may enter an alias for the foregoing command in the alias input box".

Some users do not enter the second text information in the alias input box in the fifth interface. In other words, the user does not create an alias for the first text information. In this case, the terminal receives a fifth operation performed by the user in the fifth interface. The terminal may directly display the fourth interface in response to the fifth operation.

Some other users enter the second text information in the alias input box in the fifth interface, to create an alias for the first text information. In this case, after the terminal displays the fifth interface, the terminal may receive the second text information entered by the user in the alias input box, and display the second text information in the alias input box. Correspondingly, the terminal may store the second text information and a correspondence between the second text information and the operation information in response to the fifth operation performed by the user in the fifth interface. In this way, after receiving a second voice command whose text is the same as the second text information, the terminal may perform, based on the operation information corresponding to the second text information, an operation corresponding to the operation information. Optionally, the fourth interface displayed by the terminal further includes the second text information.

With reference to the first aspect, in another possible design manner, the terminal may further receive a second voice command entered by the user through the voice assistant; and when a text of the second voice command is the same as the second text information, the terminal performs, based on the correspondence between the second text information and the operation information, an operation corresponding to the operation information.

In this embodiment of this application, the terminal may further provide a service of the alias (namely, the second text information) created by the user for the first text information. In addition, when receiving the second text information, the voice assistant of the terminal may also simulate the user to trigger the terminal to perform an operation corresponding to the second voice command, and display a corresponding operation interface. In this way, flexibility of custom voice control can be improved and user experience can be improved.

According to a second aspect, an embodiment of this application provides a terminal. The terminal includes a display unit, an input unit, a recording unit, a determining unit, and an execution unit. The display unit is configured to display prompt information in response to a first operation, where the prompt information is used to prompt a user to enter a to-be-recorded operation. The input unit is configured to: receive one or more operations entered by the user; and receive a second operation entered by the user. The recording unit is configured to record, in response to a second operation entered by the user, operation information corresponding to the one or more operations. The determining unit is configured to determine, based on a third operation entered by the user, first text information corresponding to the operation information. The input unit is further configured to receive a first voice command. The execution unit is configured to perform, by the terminal, a corresponding operation based on the operation information when a text corresponding to the first voice command received by the input unit matches the first text information determined by the determining unit.

With reference to the second aspect, in a possible design manner, the first text information includes at least one first part and a second part. That the text corresponding to the first voice command matches the first text information includes: at least one third part in the text corresponding to the first voice command is the same as the at least one first part, and a location relationship between the at least one third part and a fourth part in the first voice command is the same as a location relationship between the at least one first part and the second part in the first text information.

With reference to the second aspect, in another possible design manner, the operation information includes a first application identifier, a first interface identifier, a first search word, and operation indication information; and the first application identifier is an identifier of an operation object application corresponding to the one or more operations, the first interface identifier is an identifier of an operation object interface corresponding to the one or more operations, and the operation indication information is used to indicate an operation performed in the operation object interface through the one or more operations. The at least one first part includes the first application identifier and/or the first interface identifier, and the second part includes the first search word.

With reference to the second aspect, in another possible design manner, that the display unit is configured to display prompt information in response to a first operation includes: the display unit is configured to display the prompt information in a first interface of a voice assistant in response to the first operation. The display unit is further configured to display a second interface. The second interface is used by the user to enter the one or more operations. That the input unit is configured to receive one or more operations entered by the user includes: the input unit is configured to receive the one or more operations entered by the user in the second interface displayed by the display unit.

With reference to the second aspect, in another possible design manner, the display unit is further configured to: before the determining unit determines, based on the third operation entered by the user, the text information corresponding to the operation information, display, by the terminal, a third interface in response to the second operation. The third interface includes at least two pieces of text information, and the at least two pieces of text information are a statement formed by connecting the first application identifier and/or the first interface identifier and the first search word based on a preset location relationship by using a connection word. The input unit is further configured to receive the third operation performed by the user on the first text information in the at least two pieces of text information in the third interface displayed by the display unit. The third operation is used to select the first text information from the at least two pieces of text information. That the determining unit is configured to determine, based on a third operation entered by the user, text information corresponding to the operation information includes: the determining unit is configured to determine, in response to the third operation received by the input unit, the first text information as the text information corresponding to the operation information.

With reference to the second aspect, in another possible design manner, the terminal may further include a generation unit. The generation unit is configured to: after the determining unit determines the first text information as the text information corresponding to the operation information, before the input unit receives the first voice command, generate a first template text. The first template text is generated by replacing the second part in the first text information with type information of the first search word. That the text of the first voice command matches the first text information may be specifically: the text of the first voice command matches the first template text. That the text of the first voice command matches the first template text includes: the at least one third part in the text corresponding to the first voice command is the same as the at least one first part, the location relationship between the at least one third part and the fourth part in the first voice command is the same as the location relationship between the at least one first part and the second part in the first text information, and the fourth part is a word of a type indicated by type information in the first template text.

With reference to the second aspect, in another possible design manner, the display unit is further configured to: after the generation unit generates the first template text, before the input unit receives the first voice command, display a fourth interface, where the fourth interface is used to prompt the user to send, through the voice assistant, the first voice command that matches the first template text, to trigger the terminal to perform a corresponding operation.

With reference to the second aspect, in another possible design, the display unit is further configured to display a fifth interface before displaying the fourth interface. The fifth interface includes an alias input box, the alias input box is used to receive second text information, and the second text information is an alias created by the user for the first text information. The input unit is further configured to: after the display unit displays the fifth interface, before the input unit receives a fifth operation performed by the user in the fifth interface, receive the second text information entered by the user in the alias input box. The display unit is further configured to display, in the alias input box, the second text information received by the input unit. The input unit is further configured to receive the fifth operation performed by the user in the fifth interface displayed by the display unit, where the fifth operation is used to trigger the terminal to end recording of text information. The display unit is further configured to display the fourth interface in response to the fifth operation.

The terminal may further include a storage unit. The storage unit is configured to store the second text information and a correspondence between the second text information and the operation information in response to the fifth operation received by the input unit. The fourth interface displayed by the display unit further includes the second text information.

With reference to the second aspect, in another possible design manner, the input unit is further configured to receive a second voice command entered by the user through the voice assistant. The execution unit is further configured to: when a text of the second voice command received by the input unit is the same as the second text information stored in the storage unit, perform, by the terminal based on the correspondence between the second text information and the operation information, an operation corresponding to the operation information.

According to a third aspect, an embodiment of this application provides a terminal. The terminal includes one or more processors, a memory, and a display. The memory and the display are coupled to the processor. The display is configured to display an image generated by the processor. The memory is configured to store computer program code and related information of a voice assistant. The computer program code includes a computer instruction. When the processor executes the computer instruction, the processor is configured to: control, in response to a first operation, the display to display prompt information, where the prompt information is used to prompt a user to enter a to-be-recorded operation; the processor is further configured to receive one or more operations entered by the user; and record, in response to a second operation entered by the user, operation information corresponding to the one or more operations, and store the operation information in the memory; and the processor is further configured to determine, based on a third operation entered by the user, first text information corresponding to the operation information; receive a first voice command; and perform a corresponding operation based on the operation information when a text corresponding to the first voice command matches the first text information.

With reference to the third aspect, in a possible design manner, the first text information determined by the processor includes at least one first part and a second part. The processor is further configured to: when at least one third part in the text corresponding to the first voice command is the same as the at least one first part, and a location relationship between the at least one third part and a fourth part in the first voice command is the same as a location relationship between the at least one first part and the second part in the first text information, determine that the text corresponding to the first voice command matches the first text information.

With reference to the third aspect, in another possible design manner, the operation information recorded by the processor includes a first application identifier, a first interface identifier, a first search word, and operation indication information; and the first application identifier is an identifier of an operation object application corresponding to the one or more operations, the first interface identifier is an identifier of an operation object interface corresponding to the one or more operations, and the operation indication information is used to indicate an operation performed in the operation object interface through the one or more operations. The at least one first part includes the first application identifier and/or the first interface identifier, and the second part includes the first search word.

With reference to the third aspect, in another possible design manner, that the processor is configured to control, in response to a first operation, the display to display prompt information includes: the processor is configured to control, in response to the first operation, the display to display the prompt information in a first interface of the voice assistant. That the processor is configured to receive one or more operations entered by the user includes: the processor is configured to: control, in response to a fourth operation performed by the user in the first interface displayed by the display, the display to display a second interface, where the second interface is used by the user to enter the one or more operations; and receive the one or more operations entered by the user in the second interface displayed by the display.

With reference to the third aspect, in another possible design manner, the processor is further configured to: before determining, based on the third operation entered by the user, the text information corresponding to the operation information, control, in response to the second operation, the display to display a third interface, where the third interface includes at least two pieces of text information, and the at least two pieces of text information are a statement formed by connecting the first application identifier and/or the first interface identifier and the first search word based on a preset location relationship by using a connection word. That the processor is configured to determine, based on a third operation entered by the user, text information corresponding to the operation information includes: the processor is configured to: receive the third operation performed by the user on the first text information in the at least two pieces of text information in the third interface displayed by the display; and determine, in response to the third operation, the first text information as the text information corresponding to the operation information. The third operation is used to select the first text information from the at least two pieces of text information.

With reference to the third aspect, in another possible design manner, the processor is further configured to: after determining, in response to the third operation, the first text information as the text information corresponding to the operation information, before receiving the first voice command, generate a first template text, where the first template text is generated by replacing the second part in the first text information with type information of the first search word. The processor is further configured to: when the text of the first voice command matches the first template text, determine that the text of the first voice command matches the first text information. That the text of the first voice command matches the first template text includes: the at least one third part in the text corresponding to the first voice command is the same as the at least one first part, the location relationship between the at least one third part and the fourth part in the first voice command is the same as the location relationship between the at least one first part and the second part in the first text information, and the fourth part is a word of a type indicated by type information in the first template text.

With reference to the third aspect, in another possible design manner, the processor is further configured to: after generating the first template text, before receiving the first voice command, control the display to display a fourth interface, where the fourth interface is used to prompt the user to send, through the voice assistant, the first voice command that matches the first template text, to trigger the terminal to perform a corresponding operation.

With reference to the third aspect, in another possible design manner, the processor is further configured to: before controlling the display to display the fourth interface, control the display to display a fifth interface, where the fifth interface includes an alias input box, the alias input box is used to receive second text information, and the second text information is an alias created by the user for the first text information. That the processor is configured to control the display to display a fourth interface includes: the processor is configured to receive a fifth operation performed by the user in the fifth interface displayed by the display, where the fifth operation is used to trigger the terminal to end recording of text information; and control, in response to the fifth operation, the display to display the fourth interface; and the processor is further configured to store the second text information and a correspondence between the second text information and the operation information in the memory in response to the fifth operation. The fourth interface displayed by the display further includes the second text information.

With reference to the third aspect, in another possible design manner, the processor is further configured to: receive a second voice command entered by the user through the voice assistant; and when a text of the second voice command is the same as the second text information, perform, based on the correspondence between the second text information and the operation information, an operation corresponding to the operation information.

According to a fourth aspect, an embodiment of this application provides a computer storage medium. The computer storage medium includes a computer instruction, and when the computer instruction is run on a terminal, the terminal is enabled to perform the voice control command generation method according to the first aspect and the possible design manners of the first aspect.

According to a fifth aspect, an embodiment of this application provides a computer program product. When the computer program product is run on a computer, the computer is enabled to perform the voice control command generation method according to the first aspect and the possible design manners of the first aspect.

In addition, for technical effects brought by the terminal according to any one of the second aspect or the third aspect and the design manners of the second aspect or the third aspect, technical effects brought by the computer storage medium according to the fourth aspect, and technical effects brought by the computer program product according to the fifth aspect, refer to the technical effects brought by the first aspect and the different design manners of the first aspect. Details are not described herein again.

DESCRIPTION OF EMBODIMENTS

To resolve a problem that flexibility of custom voice control is relatively poor because a terminal cannot perform voice generalization on a voice command sent by a user, the embodiments of this application provide a voice control command generation method. The voice control command generation method may be applied to a process in which the terminal records, through a voice assistant, a custom command and an operation corresponding to the custom voice command.

The terminal in the embodiments of this application may be a portable computer (for example, a mobile phone), a notebook computer, a personal computer (Personal Computer, PC), a wearable electronic device (for example, a smartwatch), a tablet computer, an augmented reality (augmented reality, AR) device/a virtual reality (virtual reality, VR) device, a vehicle-mounted computer, or the like. A specific form of the terminal is not specially limited in the following embodiments.

Figure 1:
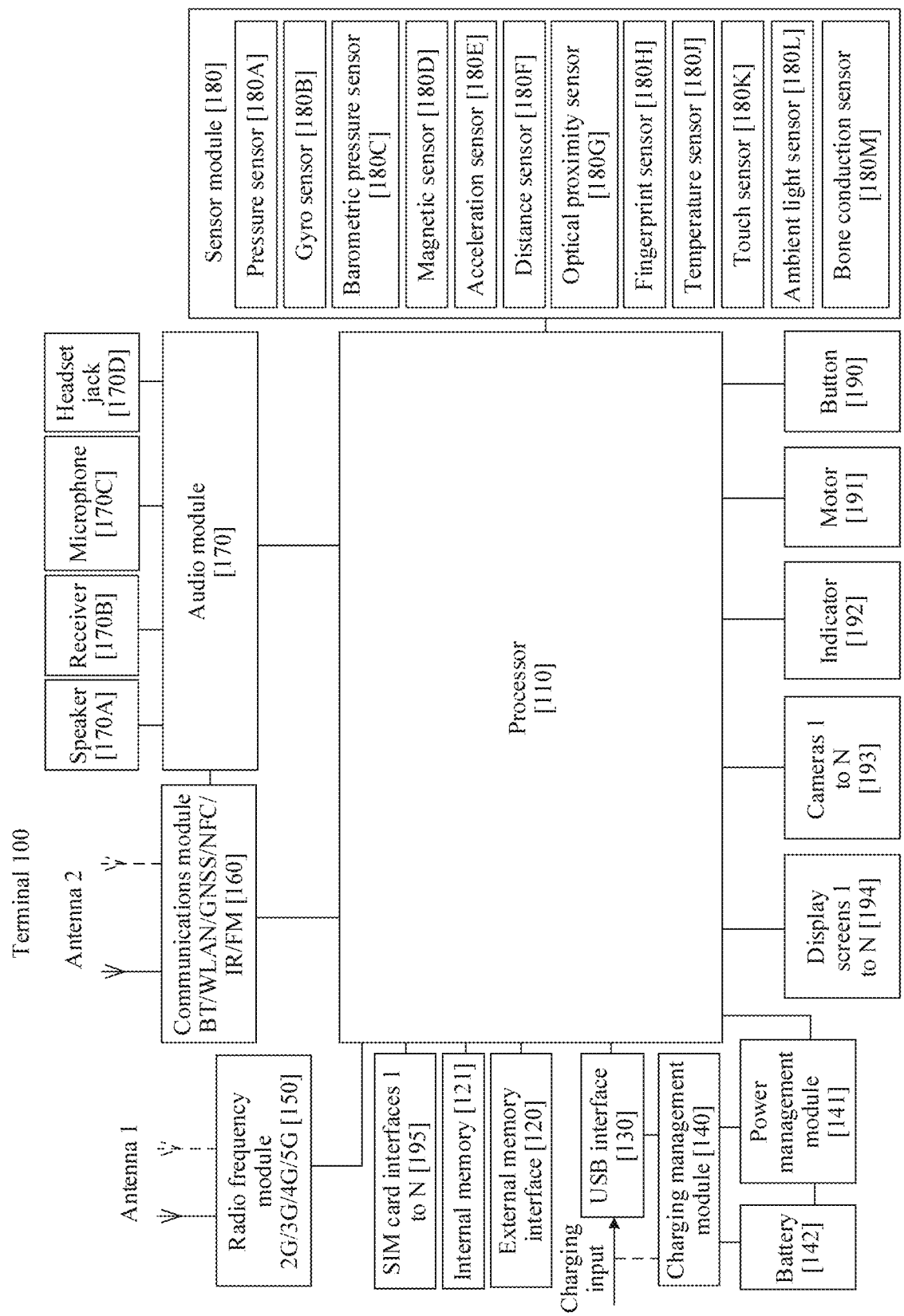
FIG. 1 is a schematic diagram of a hardware structure of a terminal according to an embodiment of this application.

FIG. 1 is a structural block diagram of a terminal 100 according to an embodiment of this application. The terminal 100 may include a processor 110, an external memory interface 120, an internal memory 121, a universal serial bus (Universal Serial Bus, USB) interface 130, a charging management module 140, a power management module 141, a battery 142, an antenna 1, an antenna 2, a radio frequency module 150, a communications module 160, an audio module 170, a speaker 170A, a receiver 170B, a microphone 170C, a headset jack 170D, a sensor module 180, a button 190, a motor 191, an indicator 192, a camera 193, a display screen 194, a subscriber identification module (Subscriber Identification Module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

A structure shown in this embodiment of this application does not constitute a limitation on the terminal 100. The terminal 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (Application Processor, AP), a modem processor, a graphics processing unit (Graphics Processing Unit, GPU), an image signal processor (Image Signal Processor, ISP), a controller, a memory, a video codec, a digital signal processor (Digital Signal Processor, DSP), a baseband processor, and/or a neural-network processing unit (Neural-network Processing Unit, NPU). Different processing units may be separate devices, or may be integrated into one or more processors.

The controller may be a decision maker that directs each component of the terminal 100 to coordinate work according to an instruction. The controller is a nerve center and a command center of the terminal 100. The controller generates an operation control signal based on an instruction operation code and a time sequence signal, to complete control of instruction fetching and instruction execution.

A memory may be further disposed in the processor 110 to store an instruction and data. In some embodiments, the memory in the processor 110 is a cache, and may store an instruction or data that is just used or cyclically used by the processor 110. If the processor 110 needs to use the instruction or the data again, the processor 110 may directly invoke the instruction or the data from the memory. This avoids repeated access and reduces a waiting time of the processor 110, thereby improving system efficiency.

In some embodiments, the processor 110 may include an interface. The interface may include an inter-integrated circuit (Inter-Integrated Circuit, I2C) interface, an inter-integrated circuit sound (Inter-Integrated Circuit Sound, I2S) interface, a pulse code modulation (Pulse Code Modulation, PCM) interface, a universal asynchronous receiver/transmitter (Universal Asynchronous Receiver/Transmitter, UART) interface, a mobile industry processor interface (Mobile Industry Processor Interface, MIPI), a general-purpose input/output (General-Purpose Input/output, GPIO) interface, a SIM interface, a USB interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal 100.

The I2S interface may be used for audio communication. In some embodiments, the processor 110 may include a plurality of groups of I2S buses. The processor 110 may be coupled to the audio module 170 by using an I2S bus, to implement communication between the processor 110 and the audio module 170. In some embodiments, the audio module 170 may transmit an audio signal to the communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the communications module 160 through a PCM bus interface. In some embodiments, the audio module 170 may also transmit an audio signal to the communications module 160 through the PCM interface, to implement a function of answering a call by using a Bluetooth headset. Both the I2S interface and the PCM interface may be used for audio communication, and sampling rates of the two interfaces are different.

The UART interface is a universal serial data bus, and is used for asynchronous communication. The bus is a two-way communications bus. The bus converts to-be-transmitted data between serial communication and parallel communication. In some embodiments, the UART interface is usually configured to connect the processor 110 and the communications module 160. For example, the processor 110 communicates with a Bluetooth module through the UART interface, to implement a Bluetooth function. In some embodiments, the audio module 170 may transmit an audio signal to the communications module 160 through the UART interface, to implement a function of playing music by using a Bluetooth headset.

The MIPI interface may be configured to connect the processor 110 and a peripheral device such as the display screen 194 or the camera 193. The MIPI interface includes a camera serial interface (Camera Serial Interface, CSI), a display serial interface (Display Serial Interface, DSI), and the like. In some embodiments, the processor 110 communicates with the camera 193 through the CSI interface, to implement a photographing function of the terminal 100. The processor 110 communicates with the display screen 194 through the DSI interface, to implement a display function of the terminal 100.

The GPIO interface may be configured by using software. The GPIO interface may be configured as a control signal, or may be configured as a data signal. In some embodiments, the GPIO interface may be configured to connect the processor 110 and the camera 193, the display screen 194, the communications module 160, the audio module 170, the sensor module 180, or the like. The GPIO interface may alternatively be configured as an I2C interface, an I2S interface, a UART interface, an MIPI interface, or the like.

The USB interface 130 may be a mini USB interface, a micro USB interface, a USB Type-C interface, or the like. The USB interface 130 may be configured to connect to the charger to charge the terminal 100, or may be configured to transmit data between the terminal 100 and a peripheral device, or may be configured to connect to a headset to play audio by using the headset. The USB interface 130 may alternatively be configured to connect to another electronic device, for example, an AR device.

An interface connection relationship between the modules shown in this embodiment of this application is merely an example for description, and does not constitute a limitation on the structure of the terminal 100. The terminal 100 may use different interface connection manners or a combination of a plurality of interface connection manners in this embodiment of this application.

The charging management module 140 is configured to receive a charging input from a charger. The charger may be a wireless charger, or may be a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the terminal 100. The charging management module 140 may further supply power to the terminal 100 by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the external memory interface 120, the display screen 194, the camera 193, the communications module 160, and the like. The power management module 141 may be further configured to monitor parameters such as a battery capacity, a battery cycle count, and a battery health status (electric leakage or impedance). In some embodiments, the power management module 141 may alternatively be disposed in the processor 110. In some embodiments, the power management module 141 and the charging management module 140 may alternatively be disposed in a same device.

A wireless communication function of the terminal 100 may be implemented by using the antenna 1, the antenna 2, the radio frequency module 150, the communications module 160, a modem, the baseband processor, and the like.

The antenna 1 and the antenna 2 are configured to: transmit and receive electromagnetic wave signals. Each antenna in the terminal 100 may be configured to cover one or more communications frequency bands. Different antennas may be further multiplexed to improve antenna utilization. For example, a cellular network antenna may be multiplexed as a wireless local area network diversity antenna. In some embodiments, an antenna may be used in combination with a tuning switch.

The radio frequency module 150 may provide a communications processor module that is applied to the terminal 100 and that includes a wireless communication solution such as 2G/3G/4G/5G. The radio frequency module 150 may include at least one filter, a switch, a power amplifier, a low noise amplifier (Low Noise Amplifier, LNA), and the like. The radio frequency module 150 receives an electromagnetic wave by using the antenna 1, performs processing such as filtering or amplification on the received electromagnetic wave, and transfer the electromagnetic wave to the modem for demodulation. The radio frequency module 150 may further amplify a signal modulated by the modem, and convert the signal into an electromagnetic wave for radiation by using the antenna 1. In some embodiments, at least some function modules in the radio frequency module 150 may be disposed in the processor 110. In some embodiments, at least some function modules in the radio frequency module 150 may be disposed in a same device as at least some modules in the processor 110.

The modem may include a modulator and a demodulator. The modulator is configured to modulate a to-be-sent low-frequency baseband signal into an intermediate-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video by using the display screen 194. In some embodiments, the modem may be an independent device. In some embodiments, the modem may be independent of the processor 110, and is disposed in a same device as the radio frequency module 150 or another function module.

The communications module 160 may provide a communications processor module that is applied to the terminal 100 and that includes a wireless communication solution such as a wireless local area network (WLAN) (for example, a WI-FI network), BLUETOOTH (BT), a global navigation satellite system (GNSS), frequency modulation (FM), a Near-Field Communication (NFC) technology, or an infrared (IR) technology. The communications module 160 may be one or more devices integrating at least one communications processor module. The communications module 160 receives an electromagnetic wave by using the antenna 2, performs frequency modulation and filtering processing on an electromagnetic wave signal, and sends a processed signal to the processor 110. The communications module 160 may further receive a to-be-sent signal from the processor 110, perform frequency modulation and amplification on the signal, and convert the signal into an electromagnetic wave for radiation by using the antenna 2.

In some embodiments, the antenna 1 and the radio frequency module 150 in the terminal 100 are coupled, and the antenna 2 and the communications module 160 in the terminal 100 are coupled, so that the terminal 100 can communicate with a network and another device by using a wireless communications technology. The wireless communications technology may include a Global System For Mobile Communications (GSM), a General Packet Radio Service (GPRS), code-division multiple access (CDMA), wideband CDMA (WCDMA), time-division synchronous CDMA (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a quasi-zenith satellite system (QZSS), and/or a satellite-based augmentation system (SBAS).

The terminal 100 implements the display function by using the GPU, the display screen 194, the application processor, and the like. The GPU is a microprocessor for image processing, and is connected to the display screen 194 and the application processor. The GPU is configured to perform mathematical and geometric calculation, and is used for graphics rendering. The processor 110 may include one or more CPUs that execute a program instruction to generate or change display information.

The display screen 194 is configured to display an image, a video, and the like. The display screen 194 includes a display panel. The display panel may be a liquid-crystal display (LCD), an organic light-emitting diode (OLED), an active-matrix OLED (AMOLED), a flexible light-emitting diode (FLED), a mini-LED, a micro-LED, a micro-OLED, a quantum dot light-emitting diode (QLED), or the like. In some embodiments, the terminal 100 may include one or N display screens 194, where N is a positive integer greater than 1.

The terminal 100 can implement the photographing function by using the ISP, the camera 193, the video codec, the GPU, the display screen, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image is generated for an object by using the lens, and the optical image is projected to the photosensitive element. The photosensitive element may be a charge coupled device (Charge Coupled Device, CCD) or a complementary metal-oxide-semiconductor (Complementary Metal-Oxide-Semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the terminal 100 may include one or N cameras 193, where N is a positive integer greater than 1.

The digital signal processor is configured to process a digital signal. In addition to a digital image signal, the digital signal processor may further process another digital signal. For example, when the terminal 100 selects a frequency, the digital signal processor is configured to perform Fourier transform on frequency energy and the like.

The video codec is configured to compress or decompress a digital video. The terminal 100 may support one or more video codecs. In this way, the terminal 100 can play or record videos in a plurality of coding formats, for example, moving picture experts group (Moving Picture Experts Group, MPEG)-1, MPEG-2, MPEG-3, and MPEG-4.

The NPU is a neural-network (Neural-Network, NN) computing processor, quickly processes input information by referring to a structure of a biological neural network, for example, by referring to a transfer mode between human brain neurons, and may further continuously perform self-learning. Applications such as intelligent cognition of the terminal 100 may be implemented by using the NPU, for example, image recognition, facial recognition, voice recognition, and text understanding.

The external memory interface 120 may be configured to connect to an external storage card, for example, a micro SD card, to extend a storage capability of the terminal 100. The external storage card communicates with the processor 110 through the external memory interface 120, to implement a data storage function. For example, files such as music and a video are stored in the external storage card.

The internal memory 121 may be configured to store computer executable program code, where the executable program code includes an instruction. The processor 110 performs various function applications of the terminal 100 and data processing by running the instruction stored in the internal memory 121. The memory 121 may include a program storage area and a data storage area. The program storage area may store an operating system, an application required by at least one function (for example, a sound playing function or an image playing function), and the like. The data storage area may store data (for example, audio data or a phone book) created during use of the terminal 100, and the like. In addition, the memory 121 may include a high-speed random access memory, and may further include a nonvolatile memory, for example, at least one magnetic disk storage device, a flash storage device, another volatile solid-state storage device, a universal flash storage (Universal Flash Storage, UFS), or the like.

The terminal 100 can implement an audio function such as music playback or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The terminal 100 may be used to listen to music or answer a call in a hands-free mode over the speaker 170A.

The receiver 170B, also referred to as an "earpiece", is configured to convert an audio electrical signal into a sound signal. When a call is answered or voice information is listened to by using the terminal 100, the receiver 170B may be put close to a human ear to listen to a voice.

The microphone 170C, also referred to as a "mike" or a "microphone", is configured to convert a sound signal into an electrical signal. When making a call or sending voice information, a user may move a mouth close to the microphone 170C and make a sound, to input a sound signal into the microphone 170C. At least one microphone 170C may be disposed in the terminal 100. In some embodiments, two microphones 170C may be disposed in the terminal 100, to collect a sound signal and further implement a noise reduction function. In some embodiments, three, four, or more microphones 170C may alternatively be disposed in the terminal 100, to collect a sound signal, reduce noise, further identify a sound source, implement a directional recording function, and the like.

The headset jack 170D is configured to connect to a wired headset. The headset jack 170D may be a USB interface 130, a 3.5 mm open mobile terminal platform (Open Mobile Terminal Platform, OMTP) standard interface, or cellular telecommunications industry association of the USA (Cellular Telecommunications Industry Association of the USA, CTIA) standard interface.

The pressure sensor 180A is configured to sense a pressure signal, and may convert the pressure signal into an electrical signal. In some embodiments, the pressure sensor 180A may be disposed in the display screen 194. There are many types of pressure sensors 180A, for example, a resistive pressure sensor, an inductive pressure sensor, and a capacitive pressure sensor. The capacitive pressure sensor may include at least two parallel plates that have conductive materials. Capacitance between electrodes changes when force is applied to the pressure sensor. The terminal 100 determines pressure intensity based on a change in the capacitance. When a touch operation is performed on the display screen 194, the terminal 100 detects intensity of the touch operation by using the pressure sensor 180A. The terminal 100 may further calculate a touch location based on a detection signal of the pressure sensor 180A. In some embodiments, touch operations that are performed at a same touch location but have different touch operation intensity may correspond to different operation instructions. For example, when a touch operation whose touch operation strength is less than a first pressure threshold is performed on a Messages icon, an instruction for viewing an SMS message is executed; or when a touch operation whose touch operation strength is greater than or equal to a first pressure threshold is performed on a Messages icon, an instruction for creating an SMS message is executed.

The gyro sensor 180B may be configured to determine a movement posture of the terminal 100. In some embodiments, an angular velocity of the terminal 100 around three axes (namely, axes x, y, and z) may be determined by using the gyro sensor 180B. The gyroscope sensor 180B may be used for image stabilization during photographing. For example, when the shutter is pressed, the gyro sensor 180B detects an angle at which the terminal 100 jitters, calculates, based on the angle, a distance for which a lens module needs to compensate, and allows the lens to cancel the jitter of the terminal 100 through reverse motion, to implement image stabilization. The gyroscope sensor 180B may be further used in navigation and motion sensing game scenarios.

The barometric pressure sensor 180C is configured to measure barometric pressure. In some embodiments, the terminal 100 calculates an altitude by using a value of the barometric pressure measured by the barometric pressure sensor 180C, to assist in positioning and navigation.

The magnetic sensor 180D includes a Hall sensor. The terminal 100 may detect opening and closing of a flip leather case by using the magnetic sensor 180D. In some embodiments, when the terminal 100 is a clamshell phone, the terminal 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect values of accelerations in various directions (usually three axes) of the terminal 100, and may detect magnitude and a direction of the gravity when the terminal 100 is still. The acceleration sensor 180E may be further configured to identify a posture of the terminal, and is applied to an application such as switching between a landscape mode and a portrait mode or a pedometer.

The distance sensor 180F is configured to measure a distance. The terminal 100 may measure the distance in an infrared or a laser manner. In some embodiments, in a photographing scenario, the terminal 100 may measure the distance by using the distance sensor 180F to implement quick focusing.

For example, the optical proximity sensor 180G may include a light-emitting diode (LED) and an optical detector, for example, a photodiode. The light-emitting diode may be an infrared light-emitting diode. The light-emitting diode is configured to emit infrared light. The photodiode is configured to detect infrared reflected light from a nearby object. When sufficient reflected light is detected, it may be determined that there is an object near the terminal 100. When insufficient reflected light is detected, it may be determined that there is no object near the terminal 100. The terminal 100 may detect, by using the optical proximity sensor 180G, that the user holds the terminal 100 close to an ear to make a call, to automatically perform screen-off for power saving. The optical proximity sensor 180G may also be used for automatic screen locking or unlocking in a leather case mode or a pocket mode.

The ambient light sensor 180L is configured to sense luminance of ambient light. The terminal 100 may adaptively adjust brightness of the display screen based on the sensed ambient light brightness. The ambient light sensor 180L may also be configured to automatically adjust a white balance during photographing. The ambient light sensor 180L may further cooperate with the optical proximity sensor 180G to detect whether the terminal 100 is in a pocket, to avoid an accidental touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect temperature. In some embodiments, the terminal 100 executes a temperature processing policy by using the temperature detected by the temperature sensor 180J. For example, when the temperature reported by the temperature sensor 180J exceeds a threshold, the terminal 100 lowers performance of a processor near the temperature sensor 180J, to reduce power consumption for thermal protection.

The touch sensor 180K is also referred to as a "touch panel", and may be disposed on the display screen 194. The touch sensor 180K is configured to detect a touch operation performed on or near the touch sensor 180K. The touch sensor 180K may transfer the detected touch operation to the application processor, to determine a type of the touch event, and to provide corresponding visual output by using the display screen 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may also be disposed in the headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 receives an input of the button 190, and generates a button signal input related to a user setting and function control of the terminal 100.

The motor 191 may generate a vibration prompt. The motor 191 may be used for an incoming call vibration prompt, or may be used for a touch vibration feedback. For example, touch operations performed on different applications (for example, a photographing application and an audio playing application) may correspond to different vibration feedback effects. Touch operations performed on different areas of the display screen 194 may also correspond to different vibration feedback effects. Different application scenarios (for example, a time reminder, information receiving, an alarm clock, a game, and the like) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be simultaneously inserted in a same SIM card interface 195. The plurality of cards may be of a same type, or may be of different types. The SIM card interface 195 may also be compatible with different types of SIM cards. The SIM card interface 195 may also be compatible with an external storage card. The terminal 100 interacts with a network by using the SIM card, to implement functions such as conversation and data communication. In some embodiments, the terminal 100 uses an eSIM, namely, an embedded SIM card. The eSIM card may be embedded into the terminal 100, and cannot be separated from the terminal 100.

The wakeup keyword update method provided in the embodiments of this application may be implemented in the terminal 100.

An embodiment of this application provides a voice control command generation method. The terminal 100 may display, in response to a first operation, prompt information used to prompt a user to enter a to-be-recorded operation. The terminal 100 receives one or more operations entered by the user. The terminal 100 records, in response to a second operation entered by the user, operation information corresponding to the one or more operations. The terminal 100 determines, based on a third operation entered by the user, first text information corresponding to the operation information. The terminal 100 receives a first voice command. The terminal 100 performs a corresponding operation based on the operation information when a text of the first voice command matches the first text information.

The operation information may include a first application identifier, a first interface identifier, a first search word, and operation indication information that correspond to the one or more operations. The first application identifier is an identifier of an operation object application (for example, a first application) of the one or more operations. The first interface identifier is an identifier of an operation object interface corresponding to the one or more operations. The user may perform an operation in different interfaces of the first application. The first interface identifier may include identifiers of one or more interfaces of the first application on which the one or more operations are performed. The operation indication information is used to indicate an operation performed in the operation object interface through the one or more operations.

After recording the operation information of the one or more operations, the terminal 100 may determine, based on the third operation entered by the user, the first text information corresponding to the operation information. The first text information is text information that is selected by the user by using the third operation and that corresponds to the one or more operations.

In this embodiment of this application, the first text information includes at least one first part and a second part. The at least one first part includes the first application identifier and/or the first interface identifier, and the second part includes the first search word. The first voice command includes at least one third part and a fourth part. That the text of the first voice command matches the first text information may be specifically: the at least one third part in the text corresponding to the first voice command is the same as the at least one first part, and a location relationship between the at least one third part and the fourth part in the first voice command is the same as a location relationship between the at least one first part and the second part in the first text information.

In other words, when the location relationship between the at least one third part and the fourth part in the first voice command is the same as the location relationship between the at least one first part and the second part in the first text information, and the at least one third part in the first voice command is completely the same as the at least one first part (namely, the first application identifier and/or the first interface identifier) in the first text information, the terminal 100 may determine that the text corresponding to the first voice command matches the first text information.

According to the voice control command generation method provided in this embodiment of this application, the terminal 100 may first obtain the operation information corresponding to the one or more operations, and then determine, based on the third operation of the user, the first text information corresponding to the operation information, namely, text information corresponding to the one or more operations. The first text information is a command that is selected by the user and that conforms to a language habit of the user. After the terminal 100 receives the first voice command, the terminal 100 may perform the corresponding operation based on the operation information provided that the text of the first voice command matches the first text information, instead of performing the corresponding operation only when the user speaks a voice command corresponding to the text information word by word. According to this solution, flexibility of custom voice control can be improved and user experience can be improved.

Figure 2:
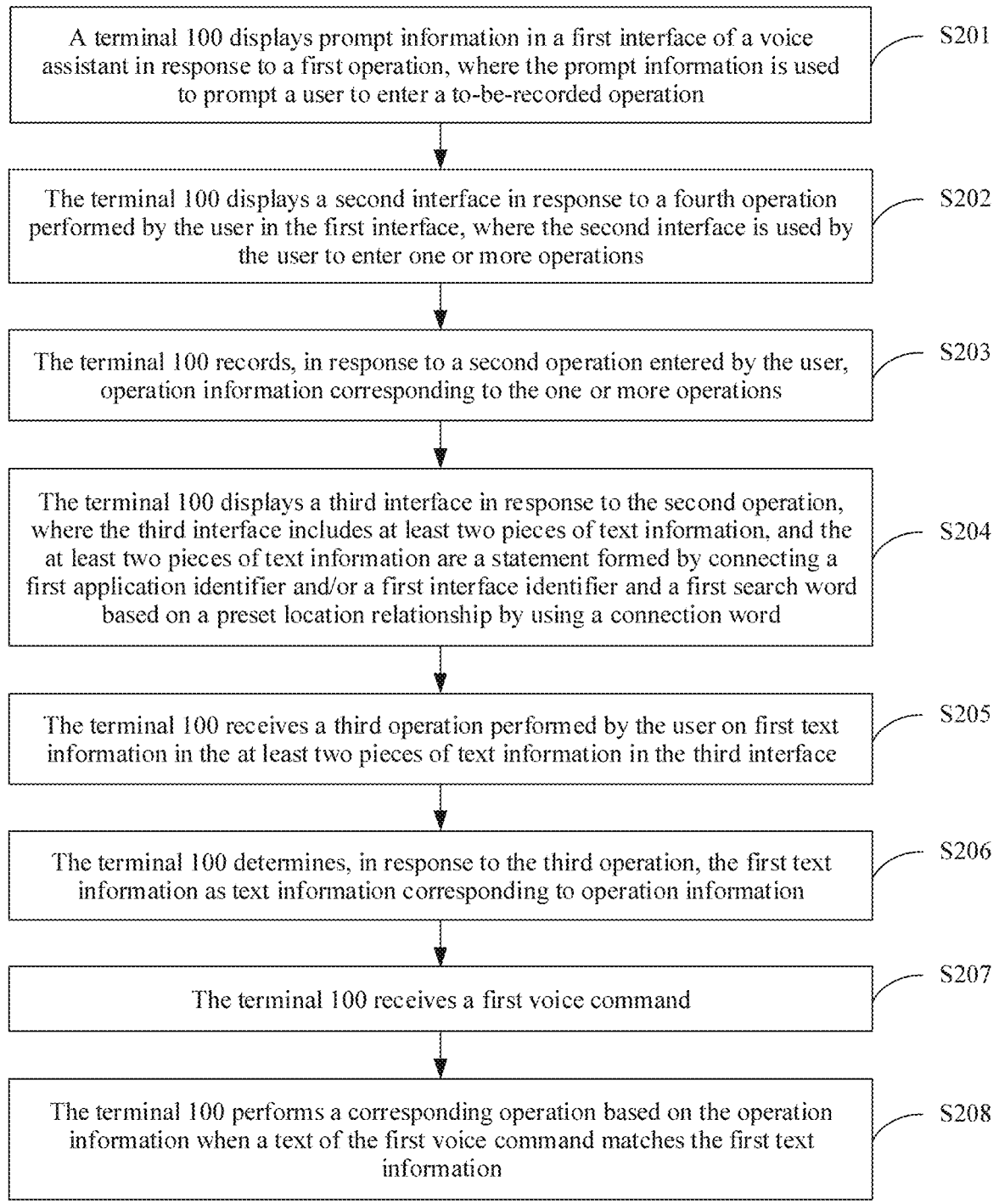
FIG. 2 is a flowchart 1 of a voice control command generation method according to an embodiment of this application.

An embodiment of this application provides a voice control command generation method. As shown in FIG. 2, the voice control command generation method may include S201 to S206.

S201: A terminal 100 displays prompt information in a first interface of a voice assistant in response to a first operation, where the prompt information is used to prompt a user to enter a to-be-recorded operation.

The voice assistant may be an application (Application, APP) installed in the terminal 100, or may be a system function integrated in an operating system of the terminal 100. The voice assistant may be an embedded application (namely, a system application of the terminal) or a downloadable application in the terminal 100. The embedded application is an application provided as a part of the terminal 100 (for example, a mobile phone). For example, the embedded application may be a "Settings" application, a "Messages" application, a "Camera" application, or the like. The downloadable application is an application that may provide an internet protocol multimedia subsystem (Internet Protocol Multimedia Subsystem, IMS) connection of the downloadable application. The downloadable application may be an application preinstalled in the terminal or may be a third-party application that may be downloaded by the user and installed in the terminal. For example, the downloadable application may be a "WeChat" application, an "Alipay" application, an "Email" application, or the like.

After being started, the voice assistant may receive a voice command (namely, a voice control command) entered by the user, to trigger the terminal 100 to perform an operation corresponding to the voice command. For example, the terminal 100 is a mobile phone 300 shown in FIG. 3(a), FIG. 3(b), FIG. 3(c), and FIG. 3(d). The voice assistant may be a "Voice assistant" application in the mobile phone 300. The first interface may be an interface that is in display interfaces of the voice assistant (for example, a "Voice assistant" application) and that is used to add a "custom command". In the first interface, the user may trigger the terminal 100 to start to record the to-be-recorded operation.

For example, the terminal 100 is the mobile phone 300 shown in FIG. 3(a), FIG. 3(b), FIG. 3(c), and FIG. 3(d), and the voice assistant is the "Voice assistant" application in the mobile phone 300. The mobile phone 300 may receive a tap operation (for example, a single tap operation) performed by the user on a "Voice assistant" application icon 302 on a home screen 301 of the mobile phone 300. The mobile phone 300 may display, in response to the tap operation performed by the user on the "Voice assistant" application icon 302, a voice control interface 303 shown in FIG. 3(b). The voice control interface 303 includes a "Record" button 304 and a "Settings" option 306. The mobile phone 300 may receive, in response to a tap operation (for example, a touch and hold operation) performed by the user on the "Record" button 304, a voice command sent by the user, to trigger the mobile phone 300 to perform an operation corresponding to the voice command. The "Settings" option 306 is used to set various functions and parameters of the "Voice assistant" application. The mobile phone 300 may receive a tap operation performed by the user on the "Settings" option 306 in the voice control interface 303. The mobile phone 300 may display, in response to the tap operation performed by the user on the "Settings" option 306, a "Voice assistant" interface 307 shown in FIG. 3(d). Optionally, the voice control interface 303 may further include prompt information 305. The prompt information 305 is used to indicate a frequently-used function of the "Voice assistant" application to the user.

Optionally, the mobile phone 300 may further receive a tap operation (for example, a single tap operation) performed by the user on a "Settings" application icon. The mobile phone 300 may display, in response to the tap operation performed by the user on the "Settings" application icon, a setting interface 310 shown in FIG. 3(c). The setting interface 110 may include an "Airplane model" option, a "WLAN" option, a "BLUETOOTH" option, a "Mobile network" option, a "Voice assistant" option 311, and the like. For specific functions of the "Airplane model" option, the "WLAN" option, the "BLUETOOTH" option, and the "Mobile network" option, refer to specific descriptions in a conventional technology. Details are not described herein in this embodiment of this application. The mobile phone 300 may receive a tap operation (for example, a single tap operation) performed by the user on the "Voice assistant" option 311. The mobile phone 100 may display, in response to the tap operation performed by the user on the "Voice assistant" option 311, the "Voice assistant" interface 307 shown in FIG. 3(d).

The "Voice assistant" interface 307 includes a "Voice wakeup" option 308 and a "Custom voice control" option 309. The "Voice wakeup" option 308 is used to set a wakeup keyword of the mobile phone 300, and the wakeup keyword is used to wake up the "Voice assistant" application. When receiving voice data that is sent by the user and that matches the wakeup keyword, the mobile phone 300 may display the voice control interface 303 shown in FIG. 3(b). The "Custom voice control" option 309 is used to set a custom command (namely, text information in this embodiment of this application). Specifically, the mobile phone 300 may display, in response to a tap operation (for example, a single tap operation) performed by the user on the "Custom voice control" option 309, a "Custom voice control" interface 401 shown in FIG. 4(a).

The "Custom voice control" interface 401 includes: a "Custom voice control" button 402, custom commands (for example, a "Custom command 1" 404 and a "Custom command 2" 405) added to the mobile phone 300, an "Adding a custom command" option 406, and the like. The "Custom voice control" button 402 is used to enable a custom voice control function. Only after the custom voice control function is enabled, the mobile phone 300 can perform a corresponding event in response to the "Custom command 1" 404 or the "Custom command 2" 405. In addition, only after the custom voice control function is enabled, the user can trigger, by using a first preset gesture (for example, an S-shaped gesture), the mobile phone 300 to display an "Adding a custom command" interface 407. For example, the "Custom voice control" interface 401 may further include prompt information 403, for example, "After a function is enabled, a user may trigger, by using an S-shaped gesture, the mobile phone to display an interface used to add a 'custom command'".

Figure 3A:
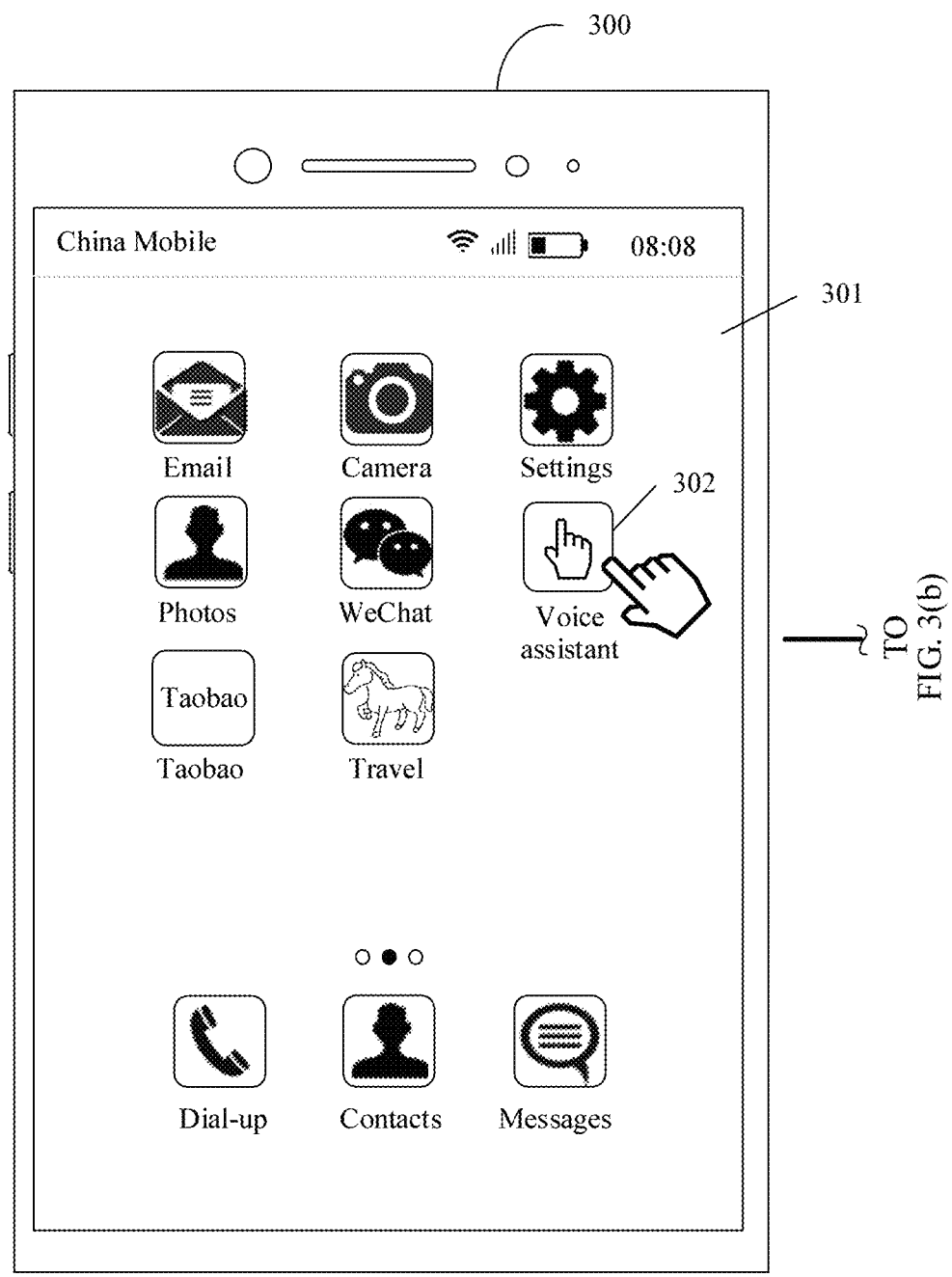
FIG. 3(a), FIG. 3(b), FIG. 3(c), and FIG. 3(d) are a schematic diagram 1 of an instance of a display interface of a terminal according to an embodiment of this application.
Figure 3B:
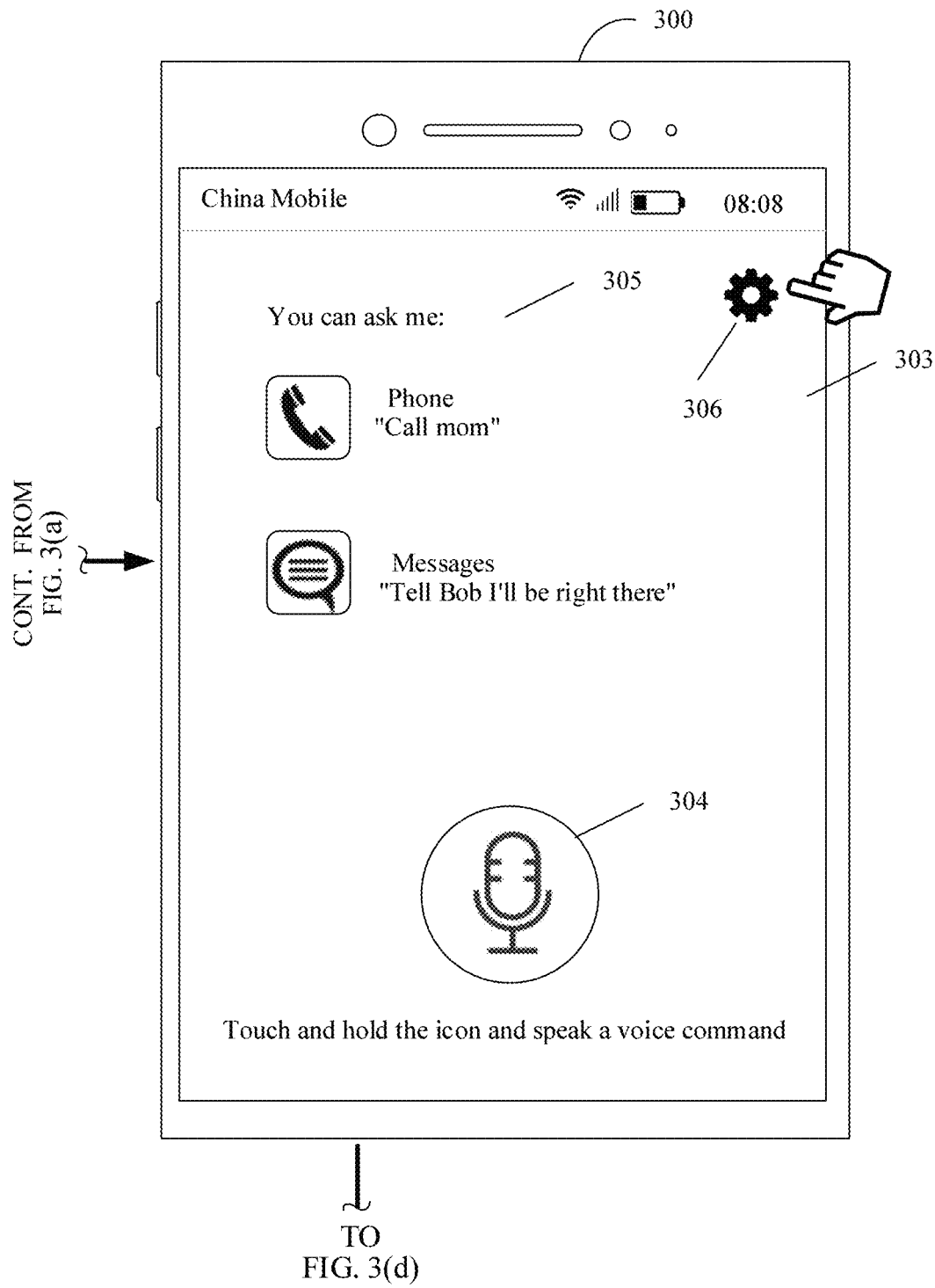
Figure 3C:
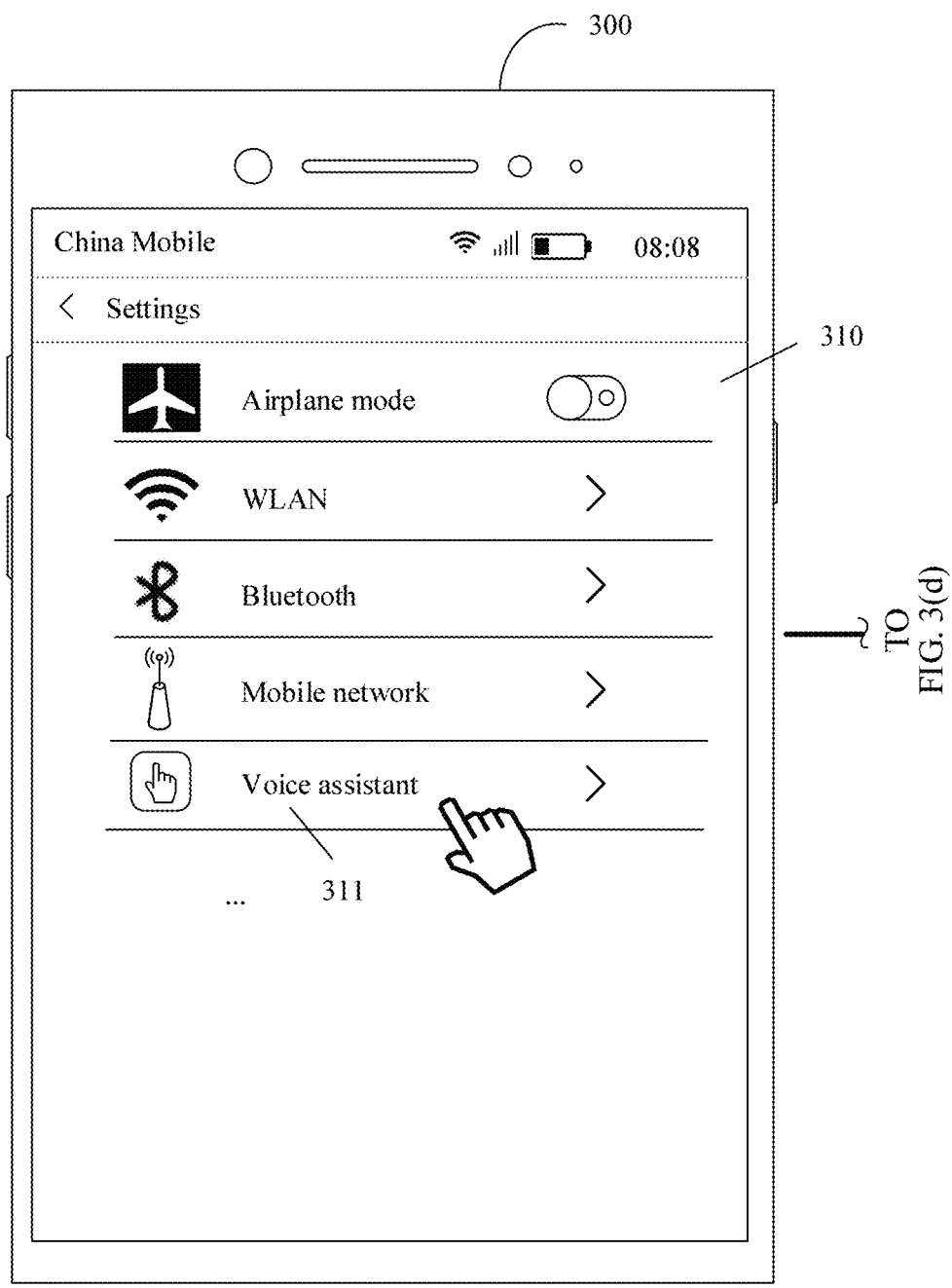
Figure 3D:
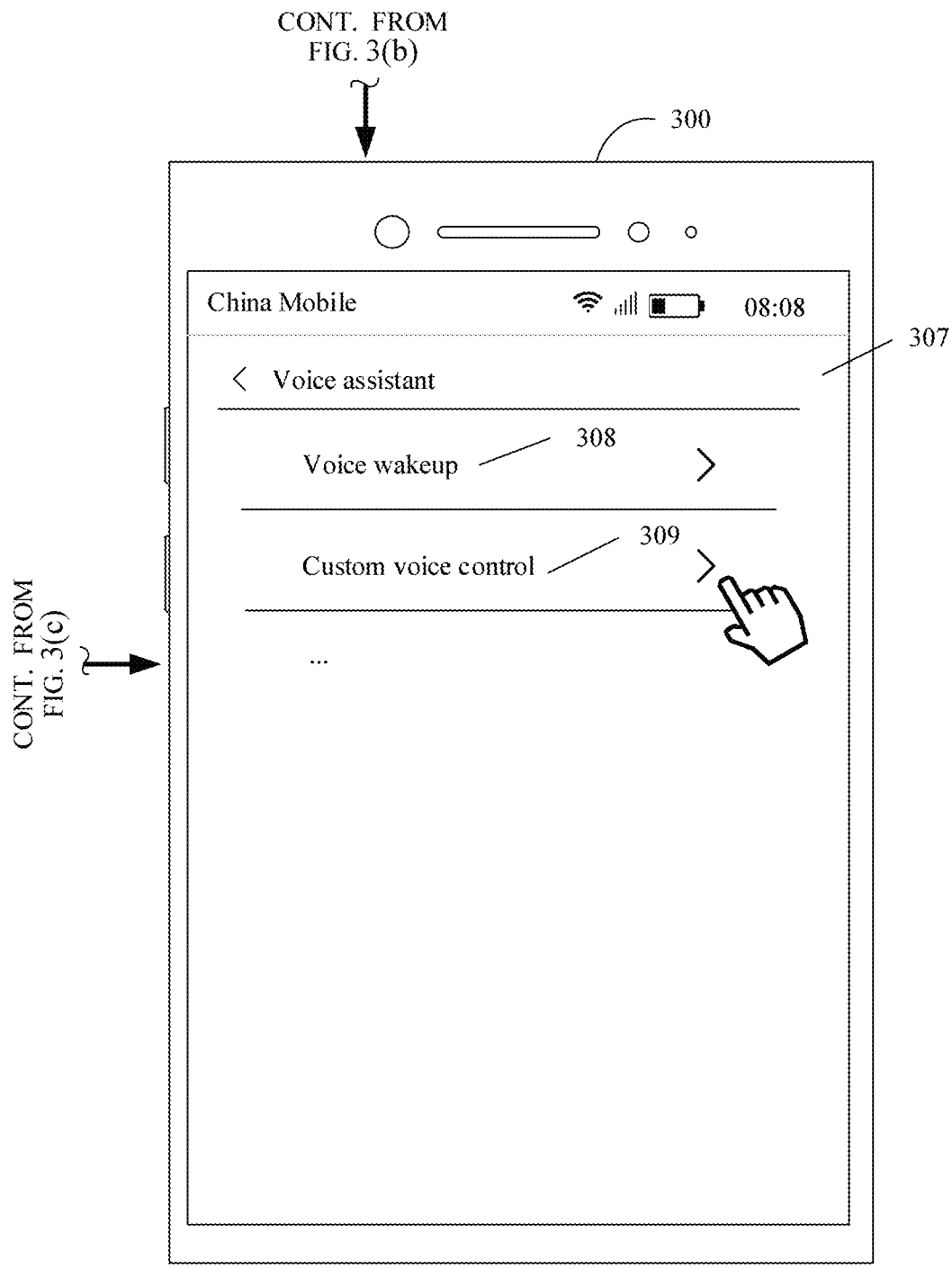
Figure 4A:
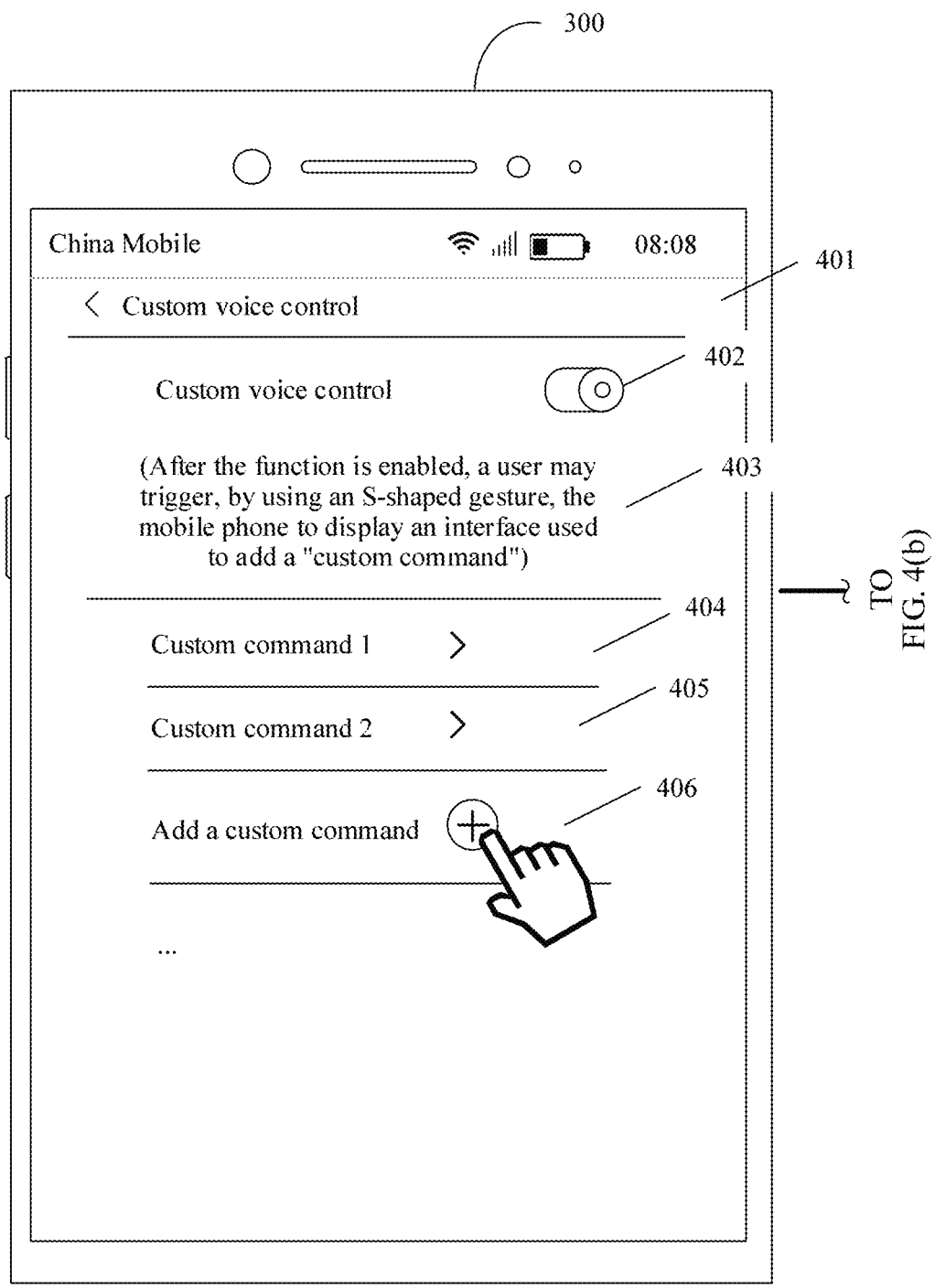
FIG. 4(a), FIG. 4(b), and FIG. 4(c) are a schematic diagram 2 of an instance of a display interface of a terminal according to an embodiment of this application.
Figure 4B:
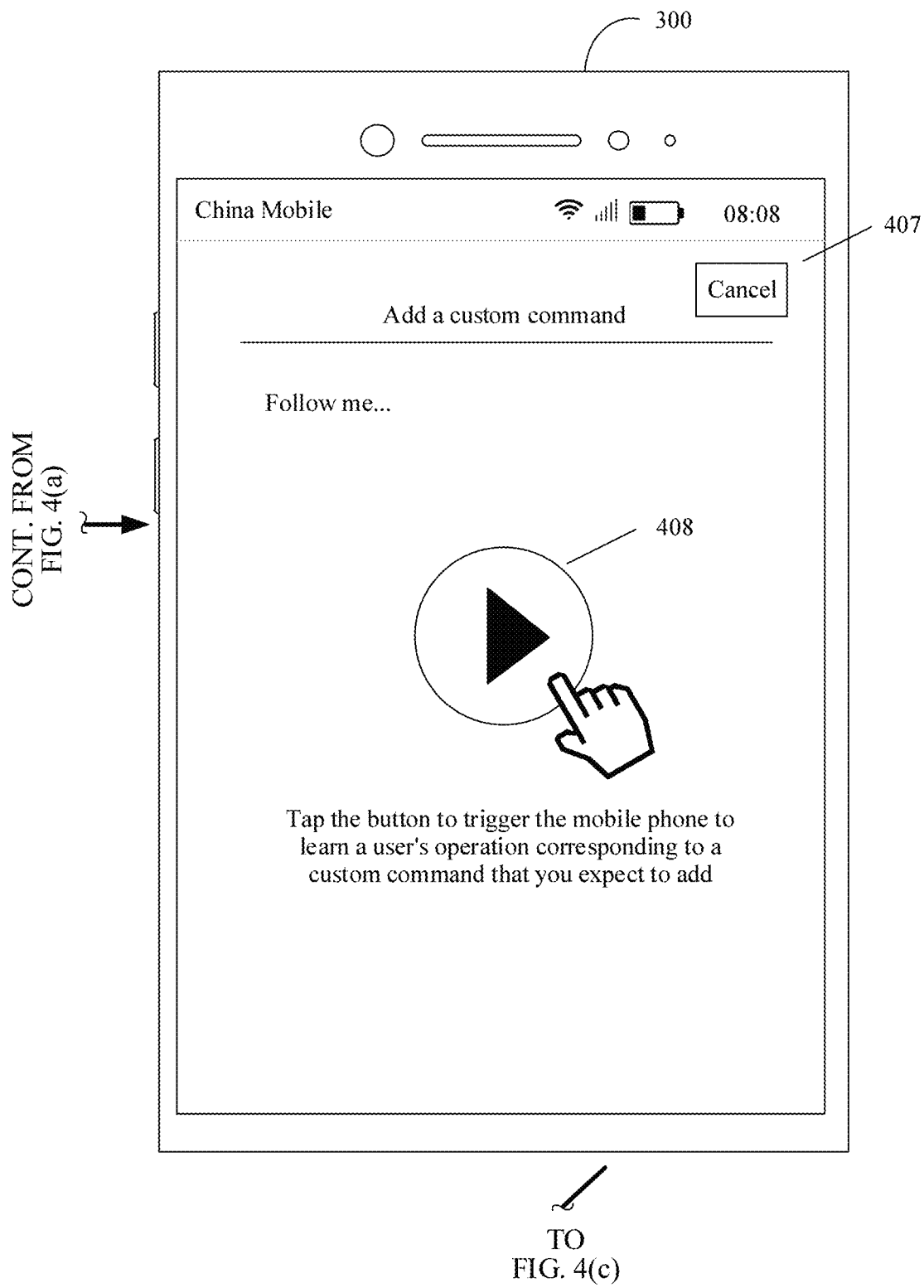

The first operation may be a tap operation (for example, a single tap operation) performed by the user on the "Adding a custom command" option 406 in the "Custom voice control" interface 401 shown in FIG. 4(a). Alternatively, the first operation may include an operation performed by the user on the mobile phone 300 shown in FIG. 3(a), FIG. 3(b), FIG. 3(c), and FIG. 3(d) and a tap operation performed by the user on the "Adding a custom command" option 406. The mobile phone 300 may display, in response to the tap operation performed by the user on the "Adding a custom command" option 406, the "Adding a custom command" interface 407 (namely, the first interface) shown in FIG. 4(b). The first interface is used to prompt the user to enter the to-be-recorded operation. For example, the "Adding a custom command" interface 407 includes a "Start learning" button 408. The "Start learning" button 408 is used to trigger the mobile phone 300 to learn the to-be-recorded operation. The first interface 407 may further include prompt information used to prompt the user to enter the to-be-recorded operation. For example, the first interface 407 may further include prompt information used to prompt the user to tap the "Start learning" button 408, for example, "Tap the button to trigger the mobile phone to learn an operation corresponding to a custom command that you expect to add".

Optionally, the first operation may alternatively be entering a preset voice command by the user in the voice control interface 303 shown in FIG. 3(b). For example, the preset voice command may be "Follow me". The mobile phone 300 may display, in response to receiving the voice command "Follow me" entered by the user in the voice control interface 303, the "Adding a custom command" interface 407 (namely, the first interface) shown in FIG. 4(b).

S202: The terminal 100 displays a second interface in response to a fourth operation performed by the user in the first interface, where the second interface is used by the user to enter one or more operations.

The fourth operation may be a second preset gesture entered by the user in the first interface, for example, any gesture such as a tick "√" gesture, a slide-up gesture, a slide-down gesture, or a circular gesture. Alternatively, the first interface includes a "Start learning" button used to trigger the terminal 100 to learn the to-be-recorded operation. The fourth operation may be a tap operation (for example, a single tap operation) performed by the user on the "Start learning" button in the first interface. For example, the "Adding text information" interface 407 includes a "Start learning" button 408. The fourth operation may be a single tap operation performed by the user on the "Start learning" button 408.

S203: The terminal 100 records, in response to a second operation entered by the user, operation information corresponding to the one or more operations.

It may be understood that an operation that needs to be recorded by the terminal 100 may include the one or more operations performed by the user on the terminal 100. If the terminal 100 needs to record a plurality of operations, the plurality of operations may be operations performed by the user in different interfaces. In other words, in response to the fourth operation, the second interface displayed by the terminal 100 is a general term for a plurality of interfaces used to receive the plurality of operations. In this embodiment of this application, the interfaces used to receive the plurality of operations are respectively referred to as sub-interfaces (for example, a first sub-interface and a second sub-interface). One or more sub-interfaces used to receive the one or more operations entered by the user may be collectively referred to as the second interface. In this embodiment of this application, the one or more operations may be a general term for sub-operations performed by the user in different sub-interfaces (for example, the first sub-interface and the second sub-interface). For example, an operation performed by the user in the first sub-interface is referred to as a first sub-operation, and an operation performed by the user in the second sub-interface is referred to as a second sub-operation.

Usually, the terminal 100 may first display the first sub-interface in response to the fourth operation. The first sub-interface includes a home screen of the terminal 100 and first prompt information. The home screen of the terminal 100 includes a home screen icon of the terminal 100. The first prompt information is used to prompt the user to tap the home screen icon to enter an application corresponding to the to-be-recorded operation. For example, the mobile phone 300 may display, in response to the tap operation (namely, the fourth operation) performed by the user on the "Start learning" button 408 shown in FIG. 4(b), a first sub-interface 409 shown in FIG. 4(c). The first sub-interface 409 includes a home screen 411 of the mobile phone 300. The home screen 411 includes home screen icons, for example, an "Email" application icon, a "Camera" application icon, a "Settings" application icon, and a "Taobao" application icon. The first sub-interface 409 may further include first prompt information 410, for example, "Tap a home screen icon to enter an app corresponding to a custom command that you expect to add". Pages may be flipped left or right on the home screen 411 in the first sub-interface 409 to display another home screen of the mobile phone 300. Optionally, the first sub-interface 409 may further include prompt information 413, for example, "Slide left or right on the home screen to flip pages".

Then, the terminal 100 may receive a tap operation (namely, the first sub-operation, for example, a single tap operation) performed by the user on any application icon in the first sub-interface. The terminal 100 may display the second sub-interface in response to the tap operation performed by the user on the any application icon. The second sub-interface includes an application home page (a home page of an application corresponding to an application icon tapped by the user) and second prompt information. The second prompt information is used to prompt the user to enter, on the application home page, one or more operations corresponding to text information. The terminal 100 may further receive the second sub-operation performed by the user in the second sub-interface, and display a third sub-interface until the terminal 100 receives the second operation used to trigger the terminal 100 to end recording of the one or more operations.

Figure 5A:
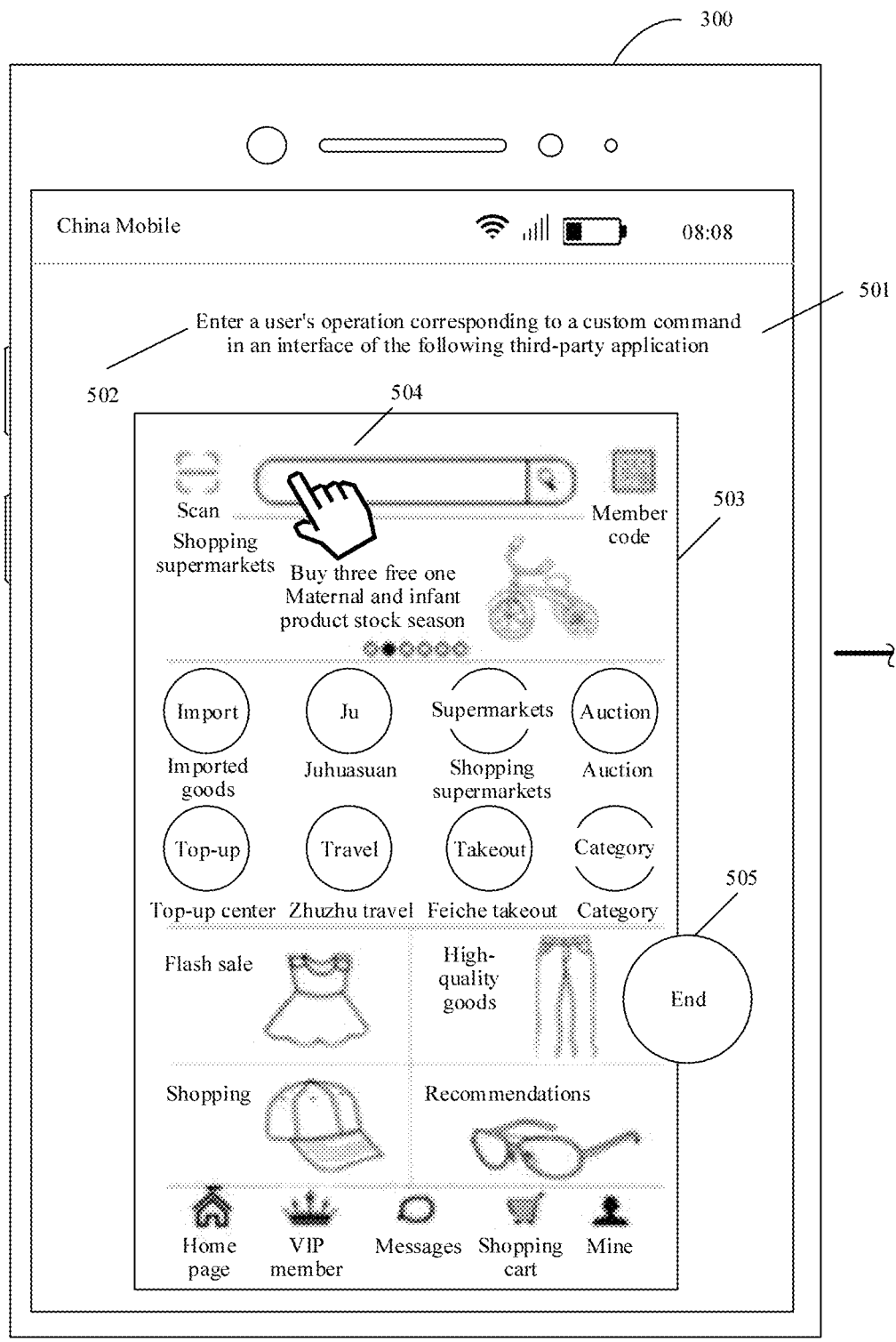
FIG. 5(a), FIG. 5(b), and FIG. 5(c) are a schematic diagram 3 of an instance of a display interface of a terminal according to an embodiment of this application.
Figure 5B:
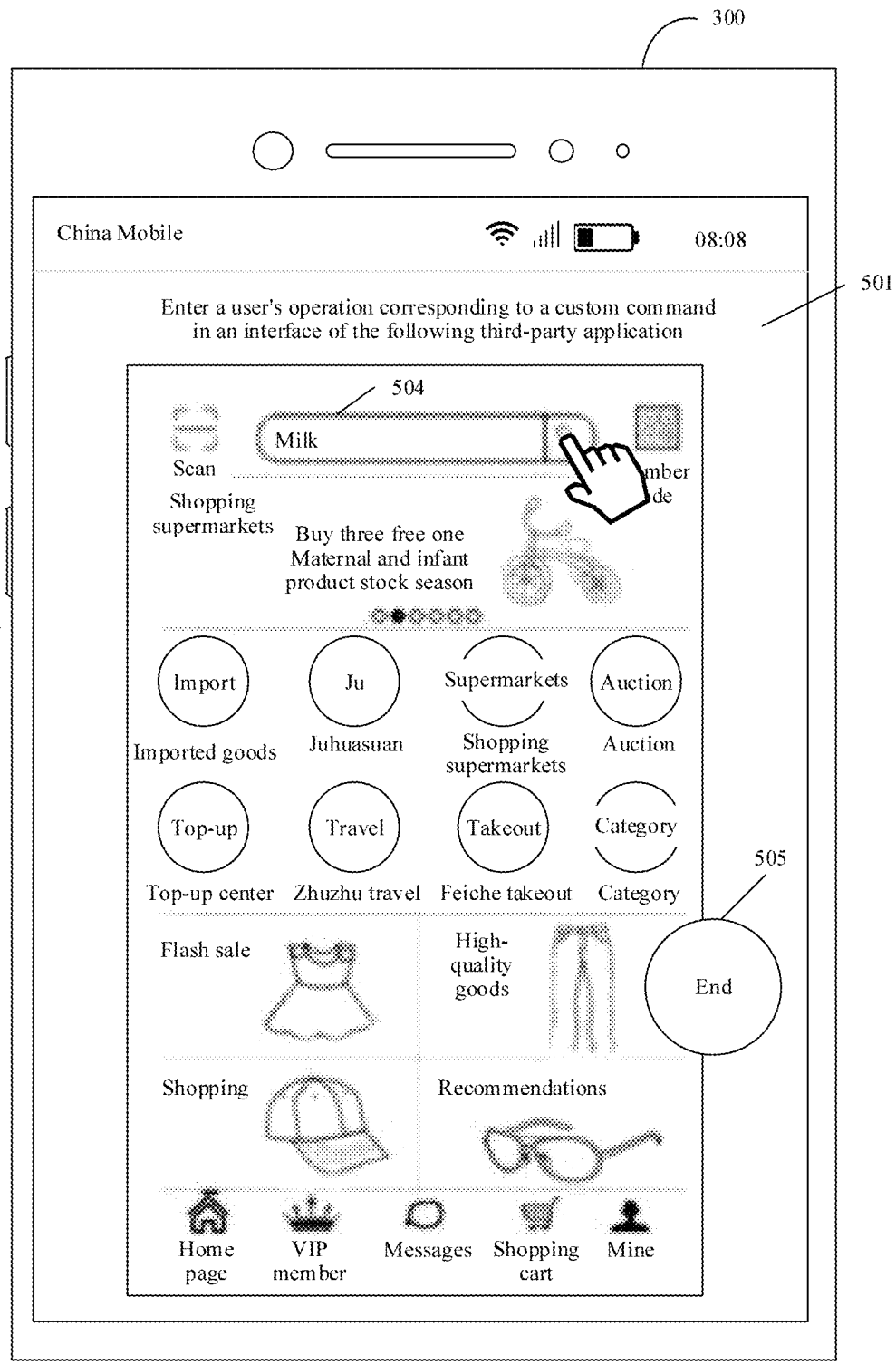

For example, it is assumed that the user taps the "Taobao" application icon in the first sub-interface 409. The mobile phone 300 may display, in response to a tap operation (namely, the first sub-operation) performed by the user on the "Taobao" application icon in the first sub-interface 409, a second sub-interface 501 shown in FIG. 5(a). The second sub-interface 501 includes second prompt information 502 and a "Taobao" home page 503. For example, the second prompt information 502 is "Enter an operation corresponding to a custom command in an interface of the following third-party application". As shown in FIG. 5(b), the user may enter a search word "Milk" in a search box 504 in the second sub-interface 501. The mobile phone 300 may display, in response to a tap operation (for example, a single tap operation) performed by the user on a search button in the search box 504, a third sub-interface 506 shown in FIG. 5(c). The operation of entering the search word "Milk" by the user in the search box 504 and the tap operation performed by the user on the search button in the search box 504 may be referred to as the second sub-operation. The third sub-interface 506 includes the second prompt information and a display interface 507 corresponding to the second sub-operation. The one or more operations may include the tap operation performed by the user on the "Taobao" application icon in the first sub-interface 409, the operation of entering the search word "Milk" in the search box 504 in the second sub-interface 501, and the tap operation performed by the user on the search button in the search box 504.

It may be understood that the terminal 100 may obtain, in response to the operations performed by the user on the sub-interfaces (for example, the first sub-interface and the second sub-interface), the operation information corresponding to the one or more operations. The operation information includes a first application identifier, a first interface identifier, a first search word, and operation indication information that correspond to the one or more operations. The operation indication information is used to indicate an operation performed by the user in a corresponding interface.

For example, the terminal 100 may obtain an application identifier of a "Taobao" application and an interface identifier of the "Taobao" home page 503 in response to the tap operation performed by the user on the "Taobao" application icon in the first sub-interface 409. The terminal 100 may obtain, in response to the operation of entering the search word "Milk" by the user in the search box 504 in the second sub-interface 501, operation indication information a used to indicate that the user enters the search word in the search box 504 on the "Taobao" home page 503 and the search word "Milk". The terminal 100 may obtain, in response to the tap operation performed by the user on the search button in the search box 504, operation indication information b used to indicate that the user taps the search button in the search box 504 and an interface identifier of the display interface 507 shown in FIG. 5(c).

Figure 12A:
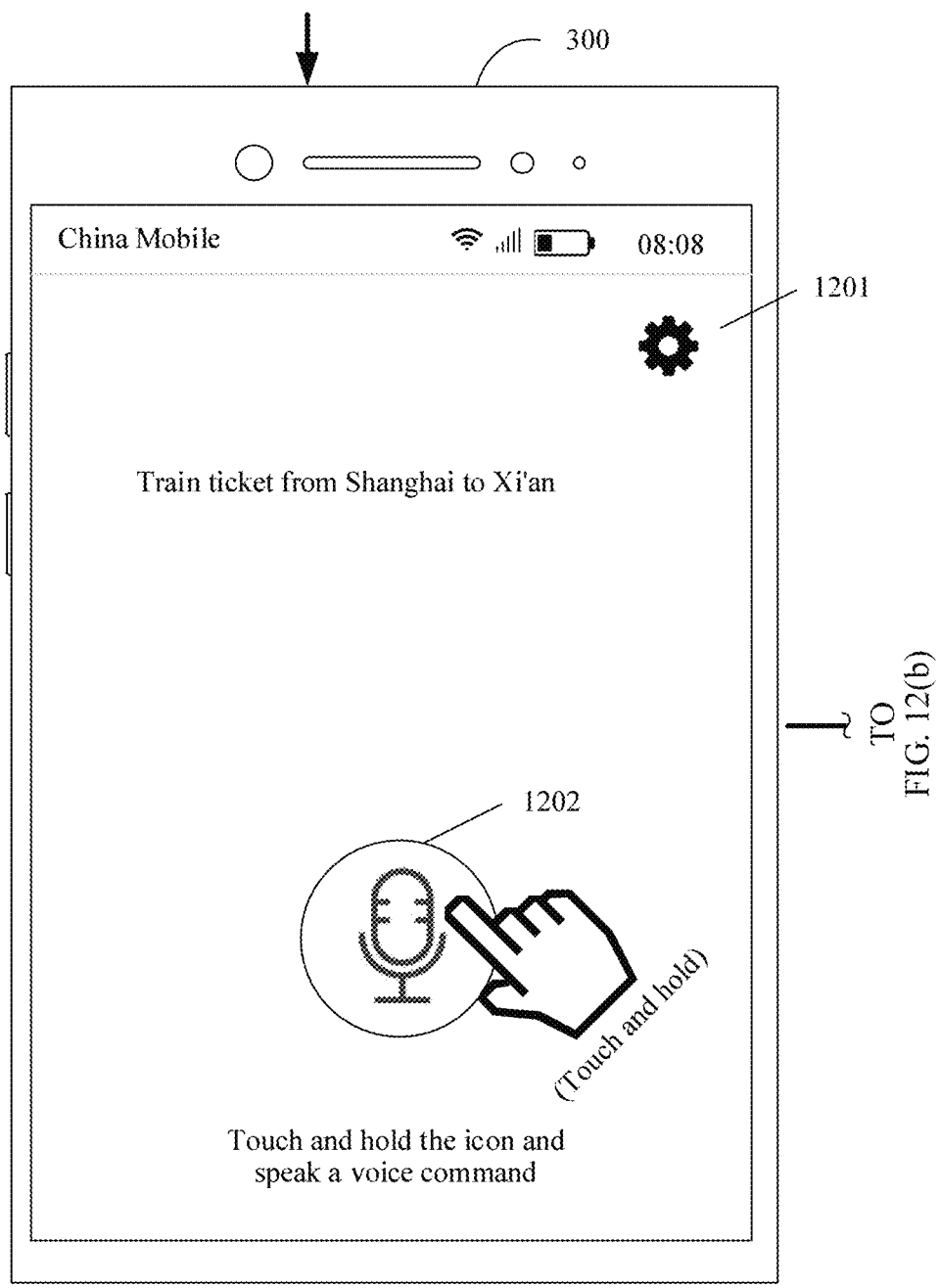
FIG. 12(a), FIG. 12(b), FIG. 12(c), and FIG. 12(d) are a schematic diagram 9 of an instance of a display interface of a terminal according to an embodiment of this application.
Figure 12B:
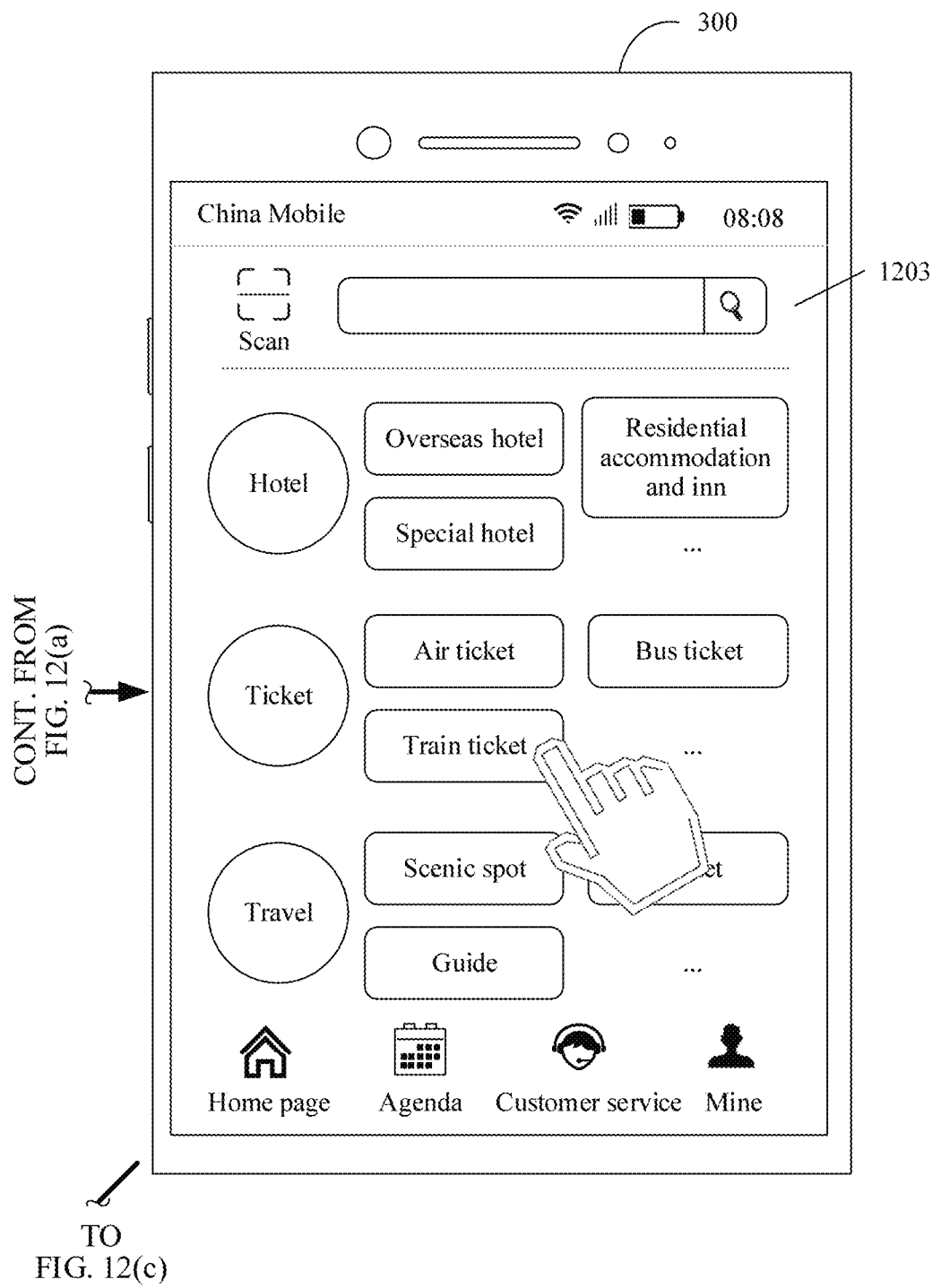
Figure 12C:
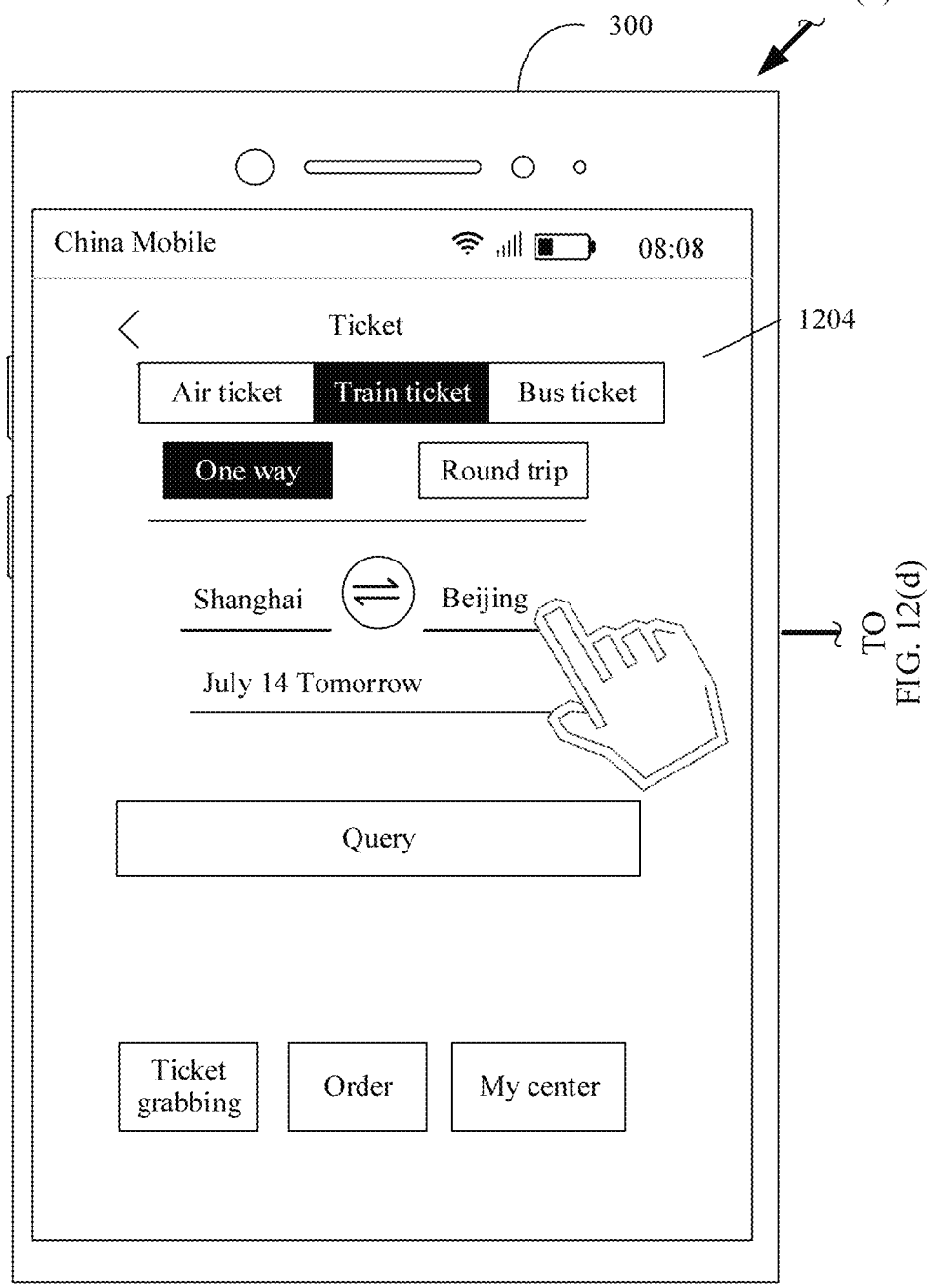
Figure 12D:
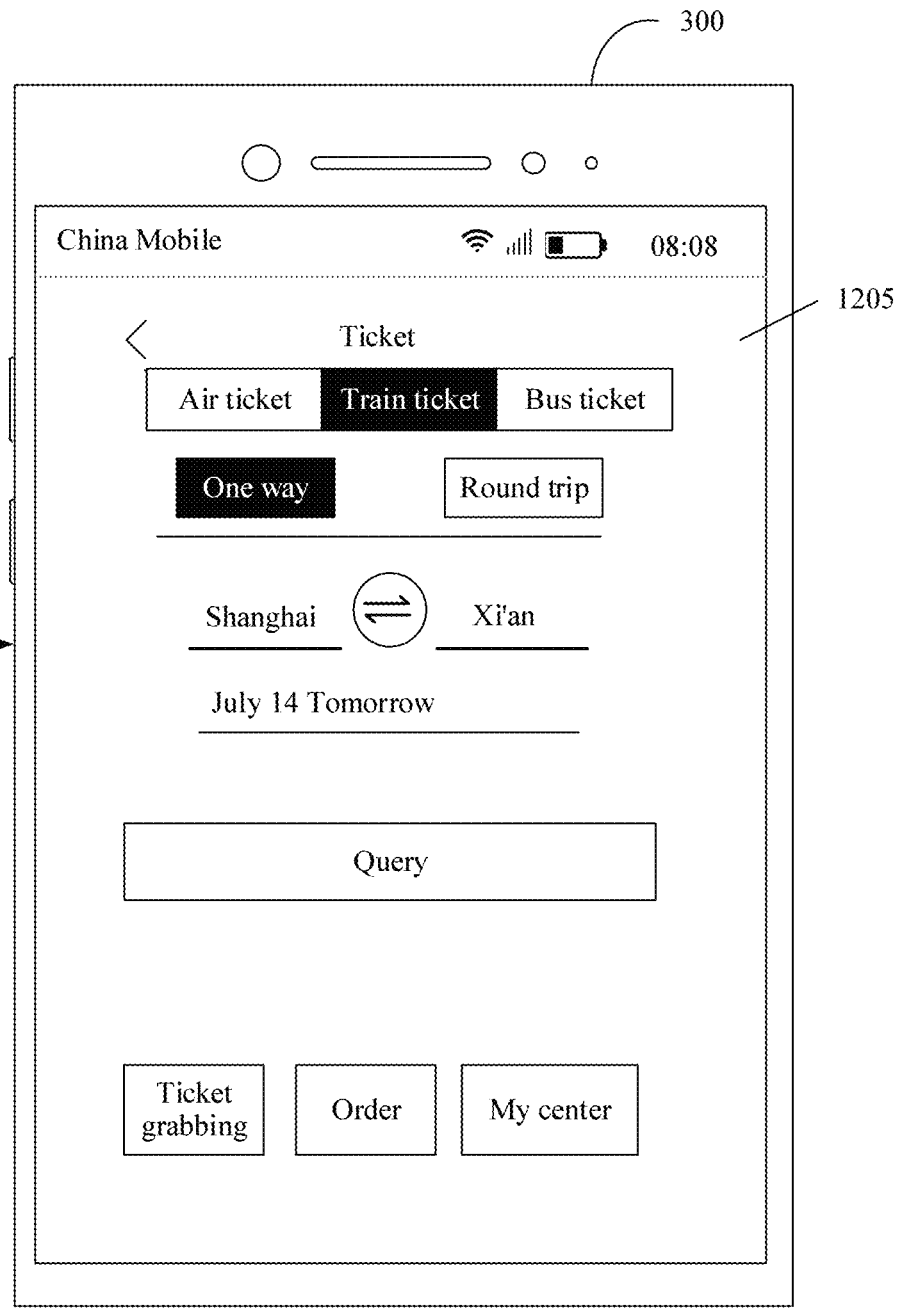
Figure 13A:
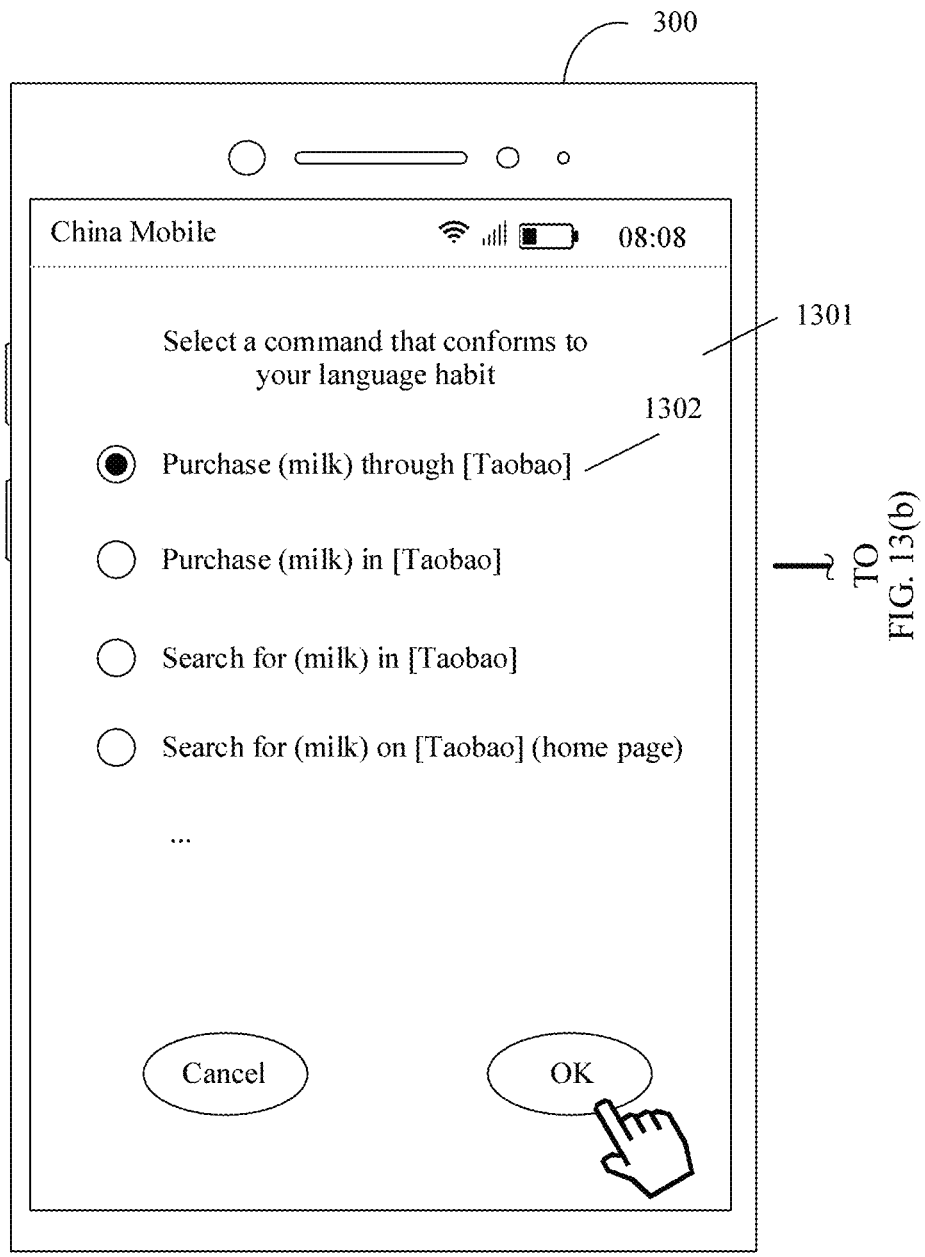
FIG. 13(a), FIG. 13(b), FIG. 13(c), and FIG. 13(d) are a schematic diagram 10 of an instance of a display interface of a terminal according to an embodiment of this application.
Figure 13B:
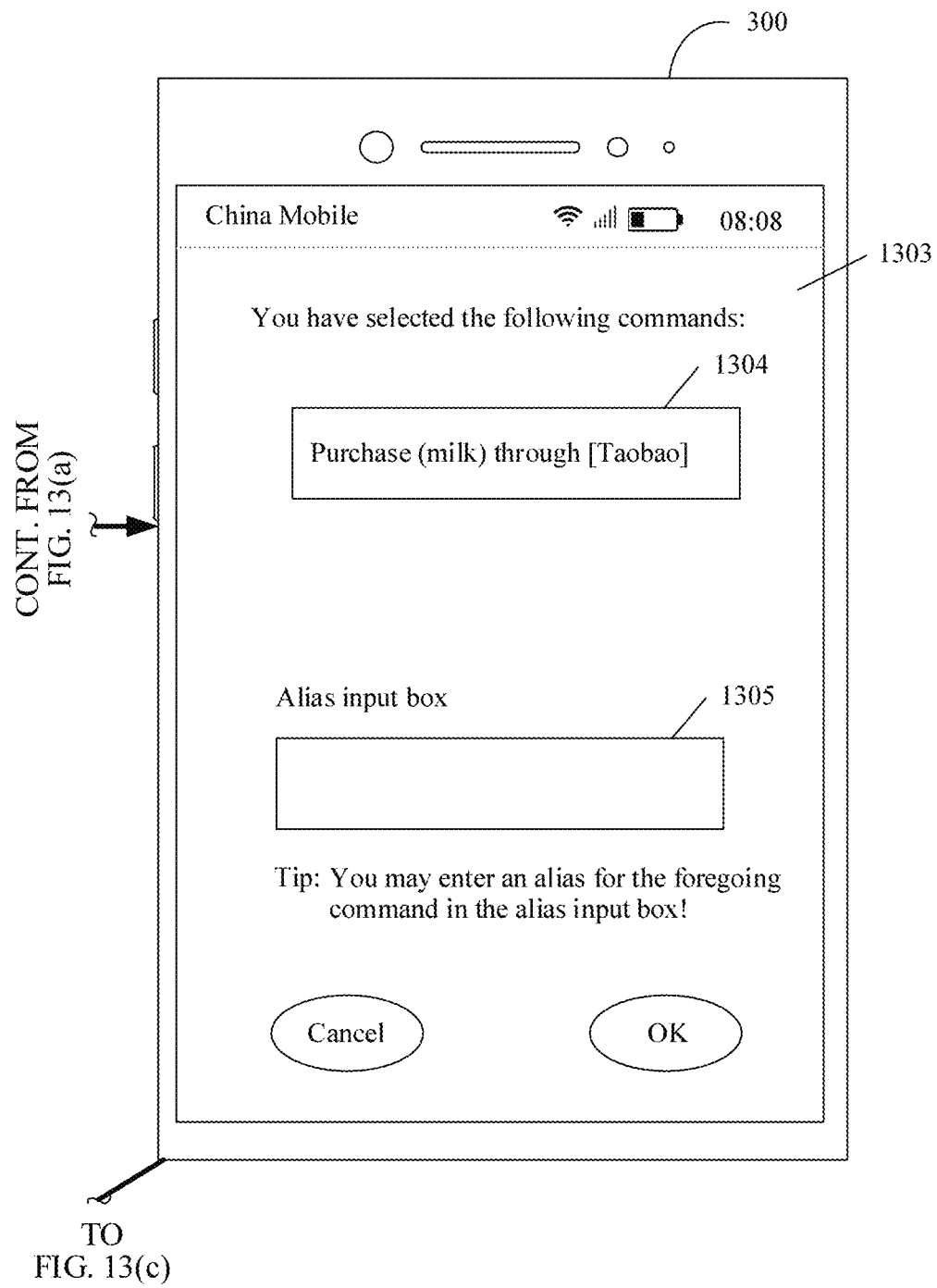
Figure 13C:
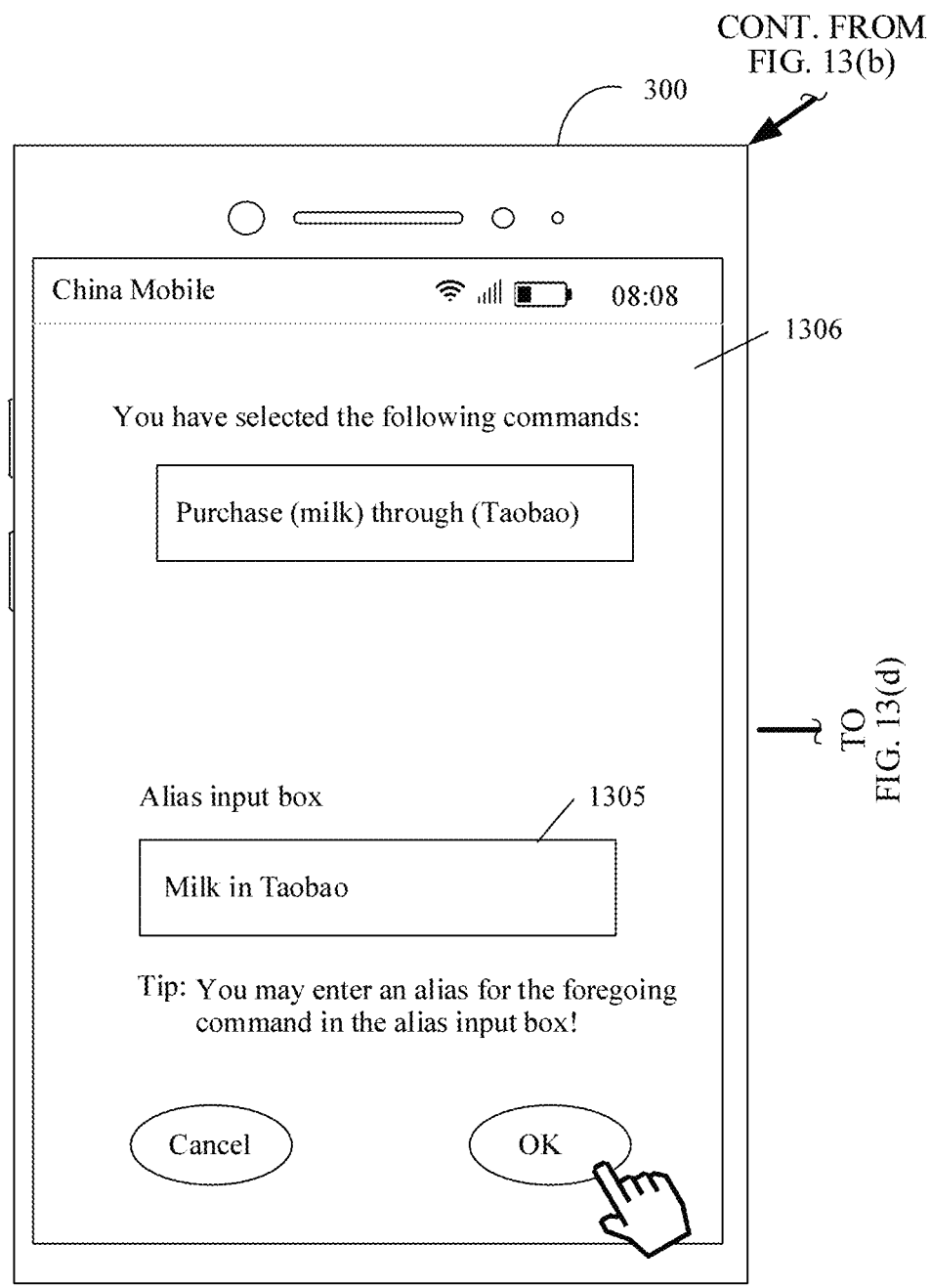
Figure 13D:
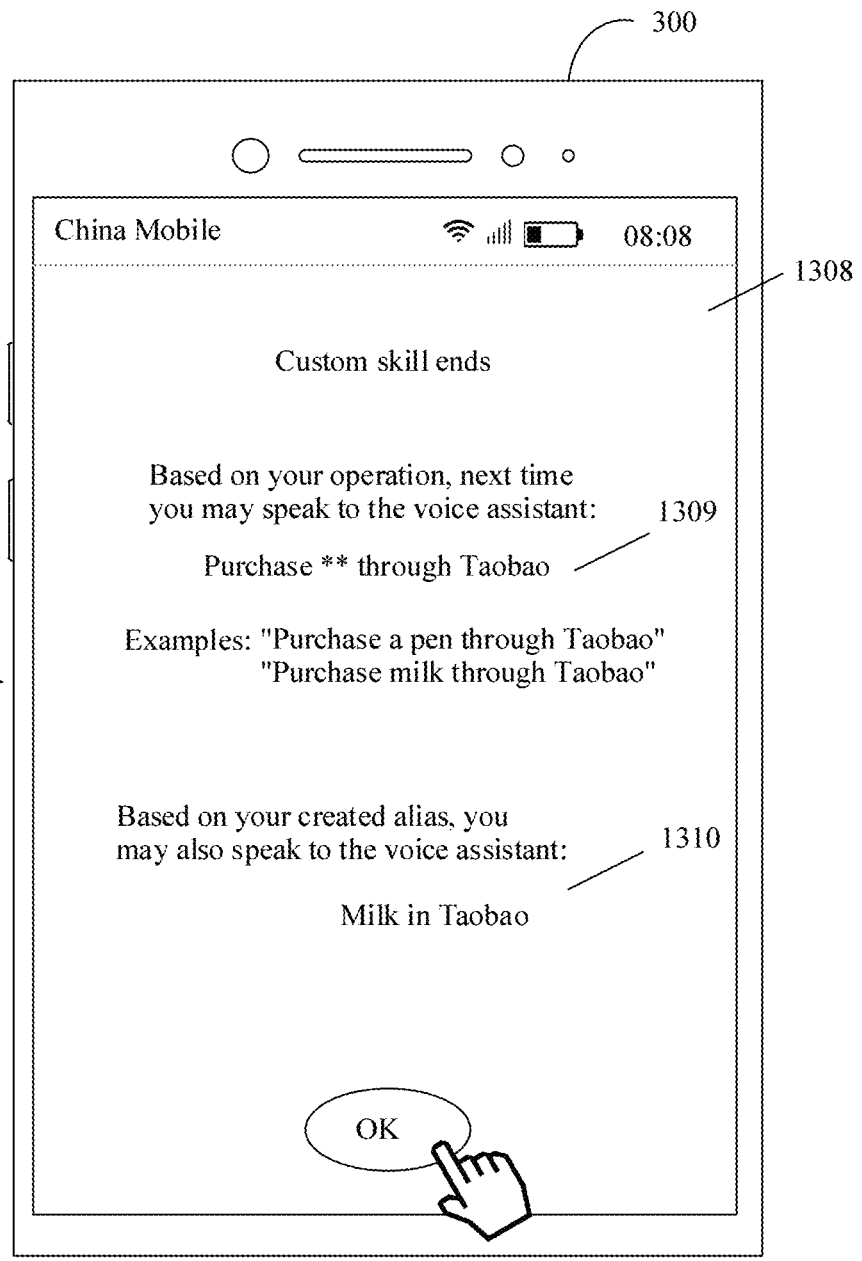

The application identifier in this embodiment of this application may be a name of an application. For example, the application identifier of the "Taobao" application may be "Taobao". The interface identifier (for example, the first interface identifier) in this embodiment of this application may be a name of an interface in an application. The name of the interface may be a name of the interface in the application by the user, instead of an address link of the interface. For example, in this embodiment of this application, FIG. 12(c) shows an interface 1204 that is in a "Travel" application and that is used to book a train ticket. In this embodiment of this application, an interface identifier of the interface 1204 used to book the train ticket may be determined as "Train ticket".

The terminal 100 may display a corresponding interface based on the interface identifier. Specifically, the terminal 100 may store a correspondence between an interface identifier of each interface in each application and an address link of a corresponding interface. The terminal may search, based on the interface identifier, for an address link corresponding to the interface identifier, and then display a corresponding interface based on the found address link.

The sub-interfaces (for example, the first sub-interface and the second sub-interface) each include a button used to trigger the terminal 100 to end recording of the to-be-recorded operation, for example, an end button. The second operation may be a tap operation (for example, a single tap operation, a double tap operation, or a touch and hold operation) performed by the user on the end button. The terminal 100 may record, in response to a tap operation performed by the user on an end button in any sub-interface, the operation information corresponding to the one or more operations.

Figure 4C:
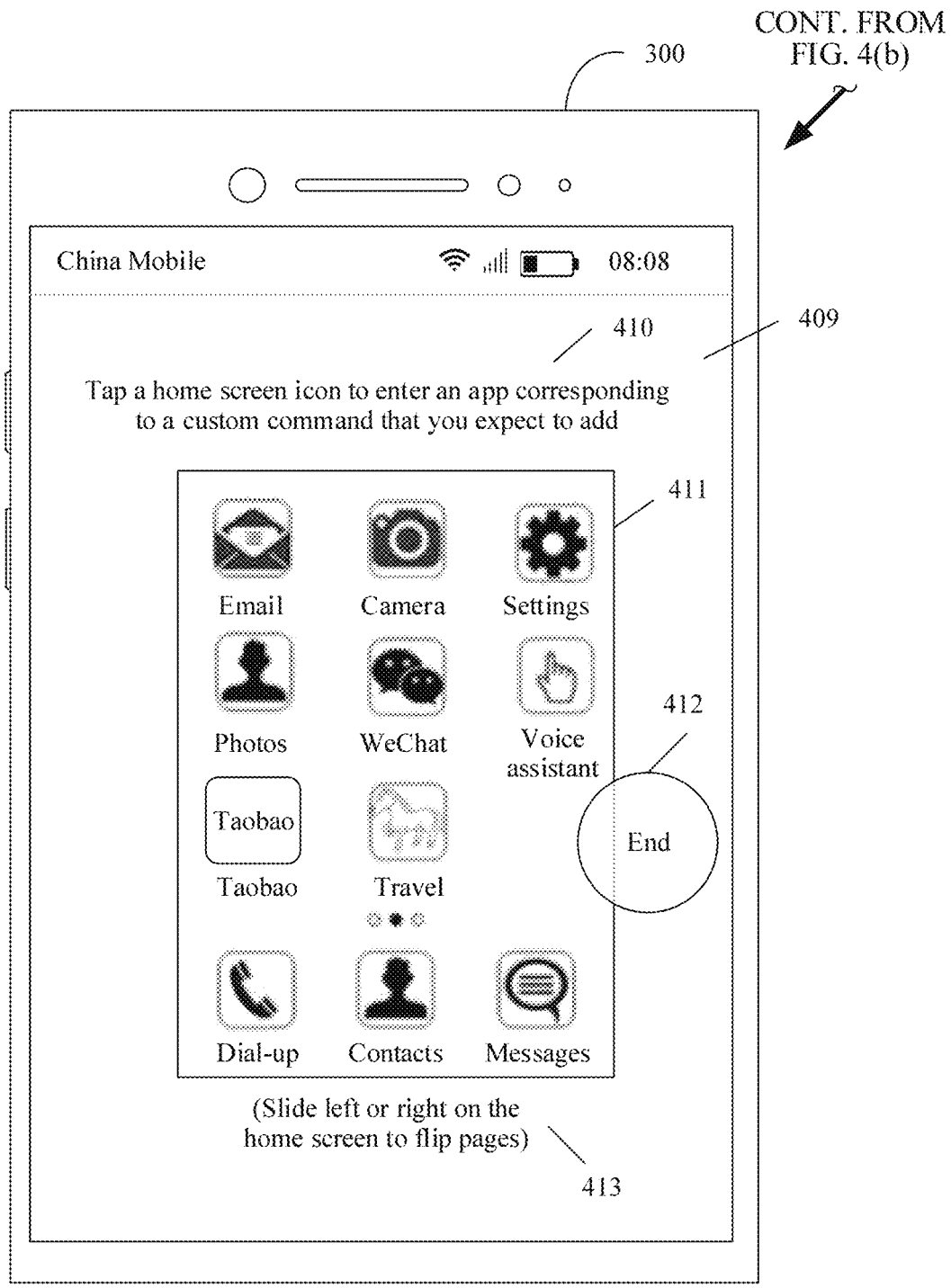

For example, the first sub-interface 409 shown in FIG. 4(c) includes an end button 412. The second sub-interface shown in FIG. 5(a) includes an end button 505. The third sub-interface shown in FIG. 5(b) includes the end button 505. The fourth sub-interface shown in FIG. 5(c) includes the end button 505. For example, the mobile phone 300 may record, in response to a tap operation performed by the user on the end button 505 in the fourth sub-interface 507 shown in FIG. 5(c), the operation information corresponding to the one or more operations.

Alternatively, the second operation may be a third preset gesture entered by the user in any sub-interface. For example, the third preset gesture may be any one of an S-shaped gesture, a slide-up gesture, a slide-down gesture, or the like. The terminal 100 may record, in response to the third preset gesture entered by the user in the any sub-interface, the operation information corresponding to the one or more operations.

S204: The terminal 100 displays a third interface in response to the second operation, where the third interface includes at least two pieces of text information, and the at least two pieces of text information are a statement formed by connecting the first application identifier and/or the first interface identifier and the first search word based on a preset location relationship by using a connection word.

Different connection words correspond to different user statement templates. The at least two pieces of text information are obtained by filling the first application identifier and/or the first interface identifier in a first filling item in the user statement template, and filling the first search word in a second filling item in the user statement template. The terminal 100 stores a plurality of user statement templates. Specifically, the terminal 100 may separately configure a plurality of user statement templates for different types of applications, so that the terminal 100 can, in response to the second operation, fill the operation information in a user statement template corresponding to an application indicated by the first application identifier, to obtain the at least two pieces of text information.

The plurality of user statement templates are determined by collecting statistics about a statement habit when the user uses the different types of applications. Applications in this embodiment of this application may include a shopping application, a travel application, a video application, and the like. For example, the shopping application may include a "Taobao" application, a "Jingdong" application, and the like. The travel application may include a "Ctrip" application and a "Qunar" application. The video application may include an "iQIYI" application, a "Youku" application, and the like.

The shopping application "Taobao" is used as an example. When using "Taobao" to purchase things (for example, milk), the user usually speaks "Purchase milk in Taobao", "Purchase milk through Taobao", "Search for milk in Taobao", and the like. Therefore, for the shopping application, the following plurality of user statement templates may be configured in the terminal 100: "Purchase [search word] through (application identifier), "Purchase [search word] in (application identifier), "Search for [search word] in (application identifier)" "Search for [search word] in (interface identifier) of (application identifier)", and the like. A connection word in the user statement template "Purchase [search word] through (application identifier)" is "Purchase . . . through . . . ". A connection word in the user statement template "Purchase [search word] in (application identifier)" is "Purchase . . . in . . . ". A connection word in the user statement template "Search for [search word] in (application identifier)" is "Search for . . . in . . . ".

At least one first part in the first text information not only includes the first application identifier and/or the first interface identifier, but also includes the connection word in the first text information. For example, the first text information "Purchase milk through Taobao" includes both the first application identifier "Taobao" and the connection word "Purchase".

The travel application "Ctrip" is used as an example. When using "Ctrip" to book a train ticket, the user usually speaks "Book a train ticket from place A to place B in Ctrip", "Purchase a train ticket from place A to place B", "Train ticket from place A to place B", and the like. In this case, for the travel application, the following plurality of user statement templates may be configured in the terminal 100: "Purchase (interface identifier) from [search word 1] to [search word 2] through (application identifier)", "Purchase (interface identifier) from [search word 1] to [search word 2]", "(interface identifier) from [search word 1] to [search word 2]", "(interface identifier) to [search word 2]", and the like. A connection word in the user statement template "Purchase (interface identifier) from [search word 1] to [search word 2] through (application identifier)" is "Purchase . . . from . . . to . . . through . . . ".

The user statement template in this embodiment of this application may include a first filling item and a second filling item. The first filling item is used to fill the application identifier and/or the interface identifier obtained by the terminal 100. The second filling item is used to fill the search word obtained by the terminal 100. The first filling item corresponds to the at least one first part in the first text information, and the second filling item corresponds to the second part in the first text information. In the foregoing user statement template, "( )" is the first filling item, and "[ ]" is the second filling item. The first filling item "( )" is used to fill the application identifier and/or the interface identifier obtained by the terminal 100. The second filling item "[ ]" is used to fill the search word obtained by the terminal 100.

For example, it is assumed that the operation information includes an application identifier "Taobao", an interface identifier "Taobao home page", and a search word "Milk". The terminal 100 fills the operation information in the user statement template of the shopping application, to obtain the following text information: "Purchase [milk] through (Taobao)", "Purchase [milk] in (Taobao)", "Search for [milk] in (Taobao)", "Search for [milk] on (Taobao) (home page)", and the like.

It is assumed that the operation information includes an application identifier "Travel", an interface identifier "Train ticket", a search word 1 "Xi'an", and a search word 2 "Shenzhen". The terminal 100 fills the operation information in the user statement template of the travel application, to obtain the following text information: "Purchase (train ticket) from [Xi'an] to [Shenzhen] through (travel)", "Purchase (train ticket) from [Xi'an] to [Shenzhen]", "(Train ticket) from [Xi'an] to [Shenzhen]", and the like.

Figure 5C:
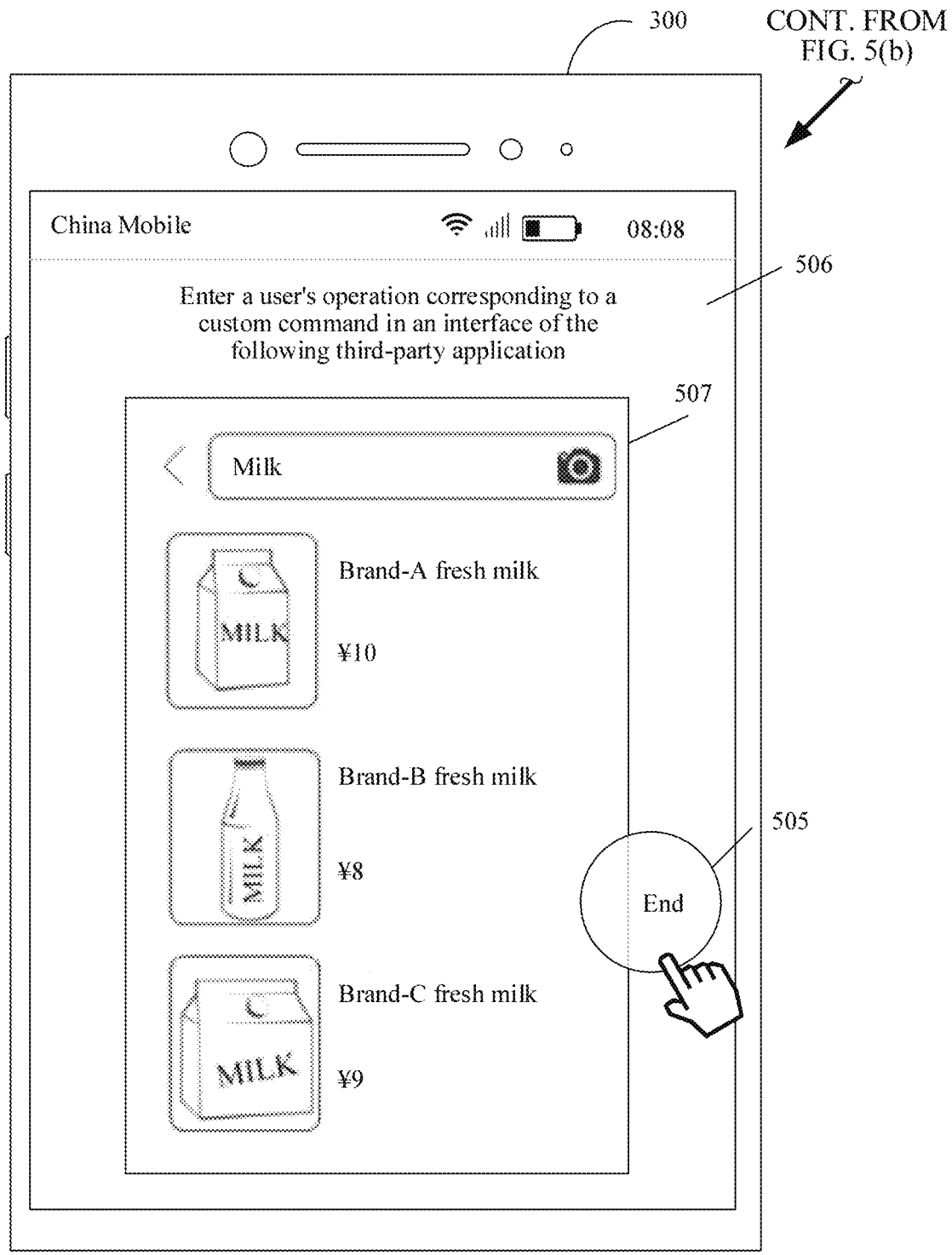
Figure 6A:
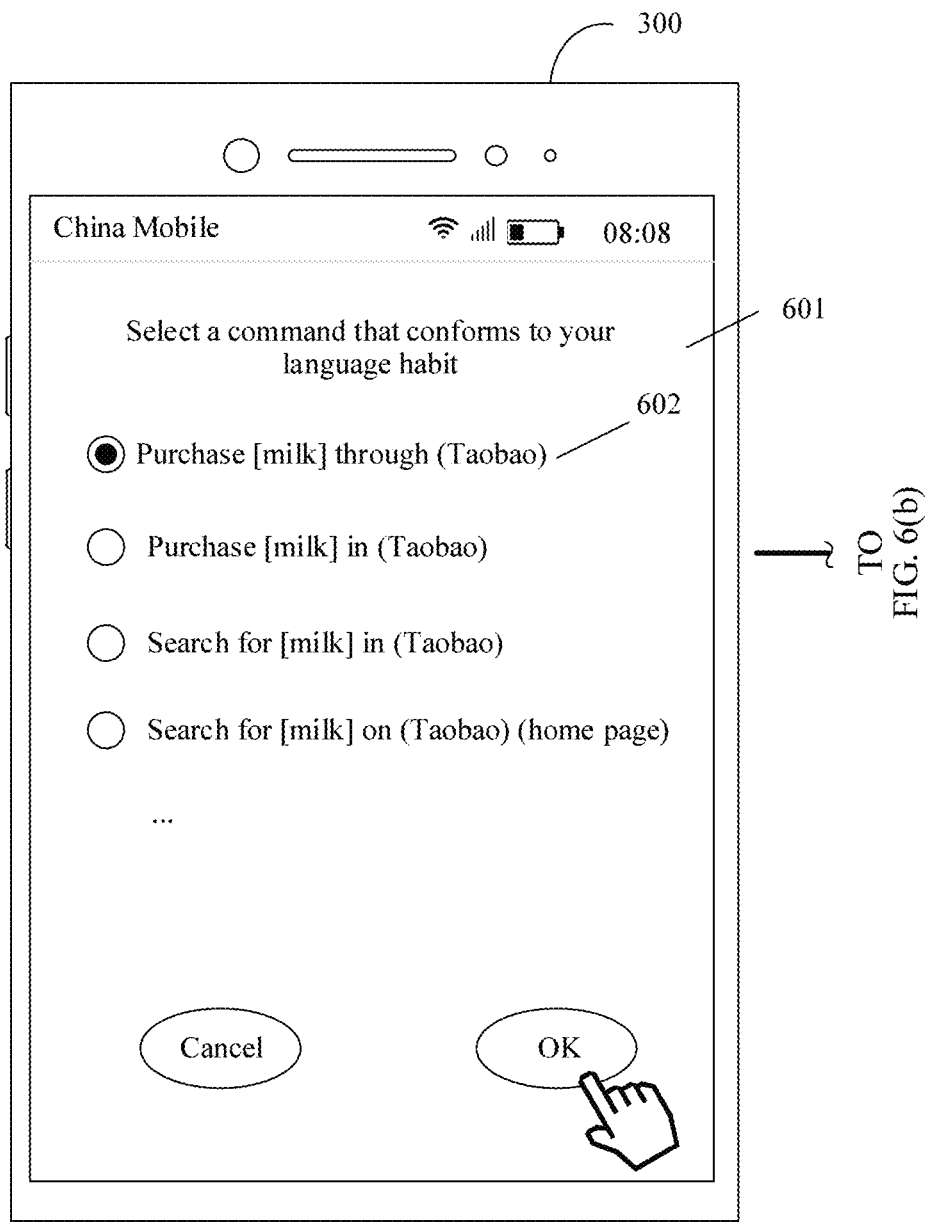
FIG. 6(a) and FIG. 6(b) are a schematic diagram 4 of an instance of a display interface of a terminal according to an embodiment of this application.
Figure 6B:
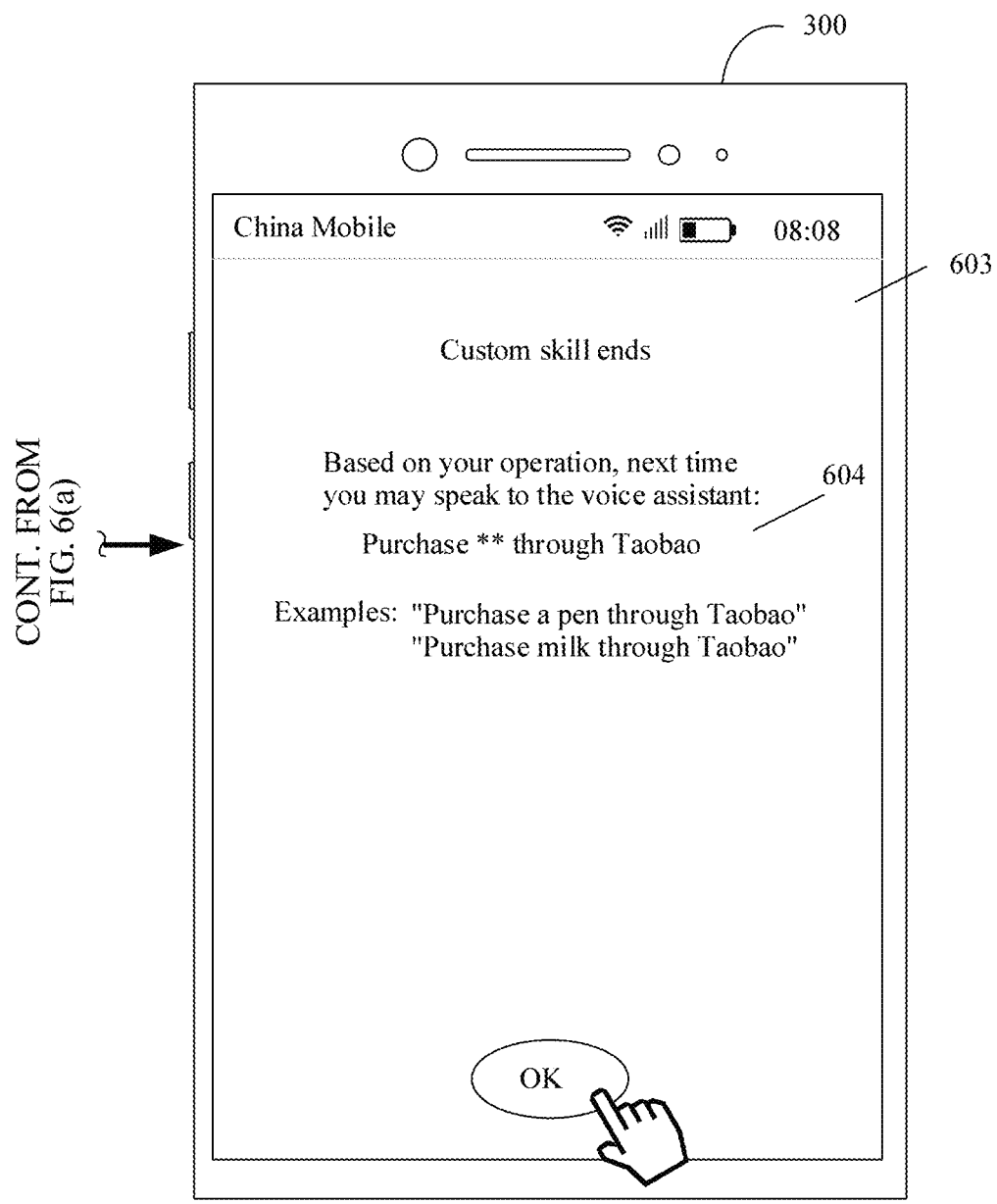

For example, the mobile phone 300 may display, in response to the tap operation performed by the user on the end button 505 shown in FIG. 5(c), a third interface 601 shown in FIG. 6(a). The third interface 601 includes a plurality of pieces of text information, for example, "Purchase [milk] through (Taobao)" 602, "Purchase [milk] in (Taobao)", "Search for [milk] in (Taobao)", and "Search for [milk] on (Taobao) (home page)".

After S204, the terminal 100 may determine, based on a third operation entered by the user in the third interface, the first text information corresponding to the operation information. Specifically, after S204, the method in this embodiment of this application may further include S205 and S206.

S205: The terminal 100 receives the third operation performed by the user on the first text information in the at least two pieces of text information in the third interface.

The third operation is used to select the first text information from the at least two pieces of text information. The terminal 100 may receive a selection operation, namely, the third operation, performed by the user on one or more pieces of text information in the at least two pieces of text information. For example, as shown in FIG. 6(a), the mobile phone 300 may receive a selection operation performed by the user on "Purchase [milk] through (Taobao)" 602 shown in FIG. 6(a).

S206: The terminal 100 determines, in response to the third operation, the first text information as text information corresponding to the operation information.

The first text information is generated through filling in a first user statement template. Specifically, the first text information is generated by filling the first application identifier and/or the first interface identifier in a first filling item in the first user statement template, and filling the first search word in a second filling item in the first user statement template.

For example, it is assumed that the user selects the command option "Purchase [milk] through (Taobao)" 602 in the third interface 601 shown in FIG. 6(a). The mobile phone 300 may determine, in response to a tap operation performed by the user on an "OK" button in the third interface 601 shown in FIG. 6(a), that "Purchase [milk] through (Taobao)" is a text corresponding to the foregoing operation information. Subsequently, if the terminal 100 receives a voice command whose text matches the first text information, the terminal 100 may automatically perform a corresponding operation based on the operation information.

Figure 7A:
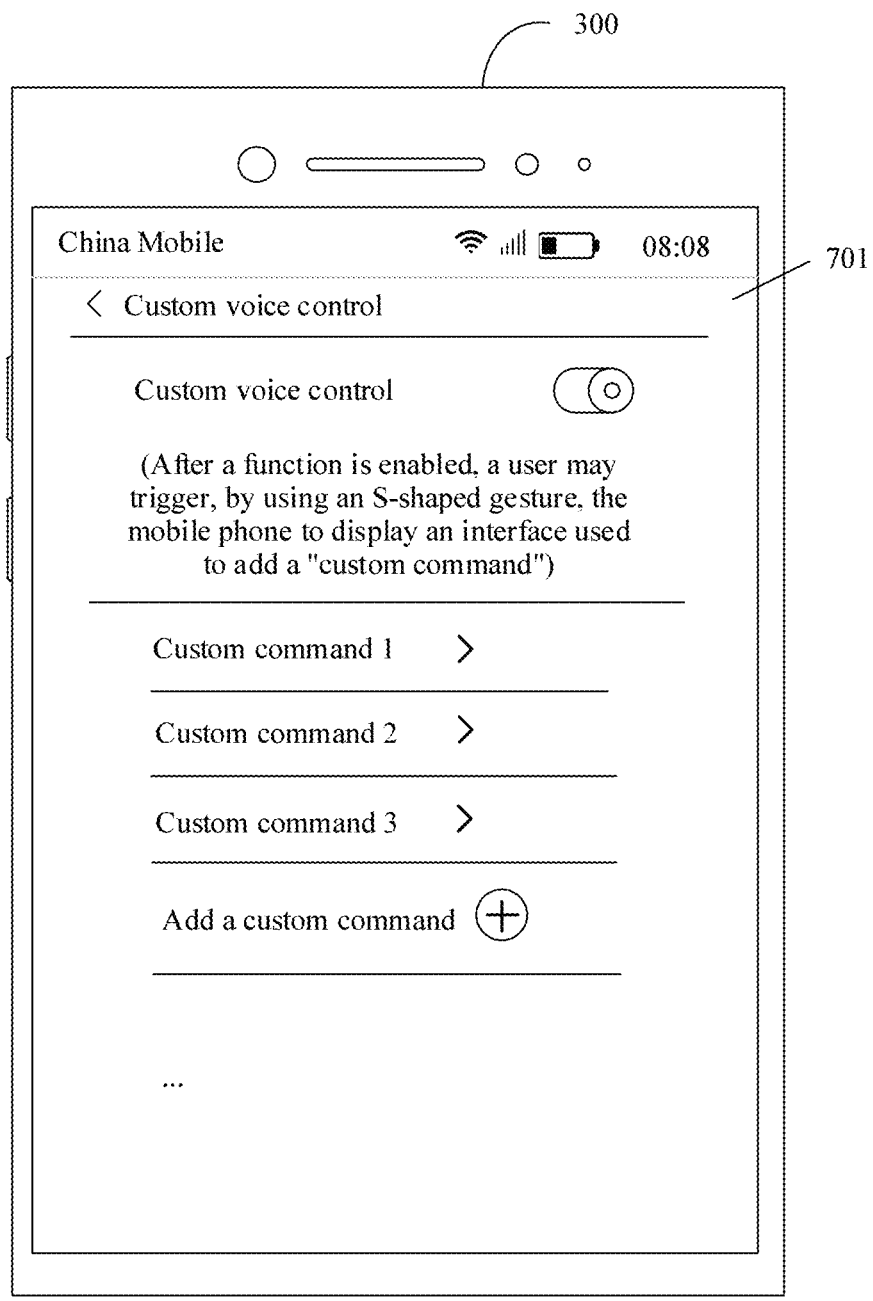
FIG. 7(a) and FIG. 7(b) are a schematic diagram 5 of an instance of a display interface of a terminal according to an embodiment of this application.

After generating the first text information, the terminal 100 may store the first text information. The mobile phone 300 is used as an example. After the mobile phone 300 stores the first text information, as shown in FIG. 7(a), a "Custom command 3" is added to a "Custom voice control" interface 701 displayed by the mobile phone 300 compared with the "Custom voice control" interface 401 shown in FIG. 4(a).

S207: The terminal 100 receives a first voice command.

For example, the terminal 100 is the mobile phone 300 shown in FIG. 3(a), FIG. 3(b), FIG. 3(c), and FIG. 3(d). The mobile phone 100 may display the voice control interface 303 that is of the voice assistant and that is shown in FIG. 3(b). The mobile phone 300 may receive, in response to a touch and hold operation performed by the user on the "Record" button 304, the first voice command entered by the user.

S208: The terminal 100 performs a corresponding operation based on the operation information when a text of the first voice command matches the first text information.

That the text of the first voice command matches the first text information includes: at least one third part in the text corresponding to the first voice command is the same as the at least one first part, and a location relationship between the at least one third part and a fourth part in the first voice command is the same as a location relationship between the at least one first part and the second part in the first text information.

With reference to the foregoing instance, it is assumed that the first text information is "Purchase [milk] through (Taobao)", the first application identifier is "Taobao", and the first search word is "Milk". To be specific, the at least one first part in the first text information is "Taobao", and the second part in the first text information is "Milk". If the first voice command is "Purchase a windbreaker through Taobao", the terminal 100 may determine that the at least one third part in the first voice command is "Taobao", and the fourth part in the first voice command is "Windbreaker". The at least one first part "Taobao" in the first text information is the same as the at least one third part "Taobao" in the first voice command, and a location relationship between the at least one third part "Taobao" and the fourth part "Windbreaker" in the first voice command "Purchase a windbreaker through Taobao" is the same as a location relationship between the at least one first part "Taobao" and the second part "Milk" in the first text information "Purchase milk through Taobao". Therefore, the terminal 100 may determine that the first voice command "Purchase a windbreaker through Taobao" matches the first text information "Purchase milk through Taobao".

The at least one first part includes the first application identifier and/or the first interface identifier, and the second part includes the first search word. In other words, when the third part in the first voice command is the first application identifier and/or the first interface identifier, and the location relationship between the fourth part and the third part in the first voice command is the same as the location relationship between the first part and the second part in the first text information, the terminal 100 may determine that the first voice command matches the first text information.

The method in which the terminal 100 performs the corresponding operation based on the operation information may include: The terminal 100 performs an operation corresponding to the first application identifier, the first interface identifier, the operation indication information, and the fourth part (for example, a second search word). For example, with reference to the foregoing instance, the mobile phone 300 may receive, in response to a touch and hold operation performed by the user on a "Record" button 802 in a voice control interface 801 shown in FIG. 8(a), the first voice command entered by the user, for example, "Purchase a windbreaker through Taobao". The mobile phone 300 may determine that the first voice command "Purchase a windbreaker through Taobao" matches the first text information "Purchase [milk] through (Taobao)".

Figure 8A:
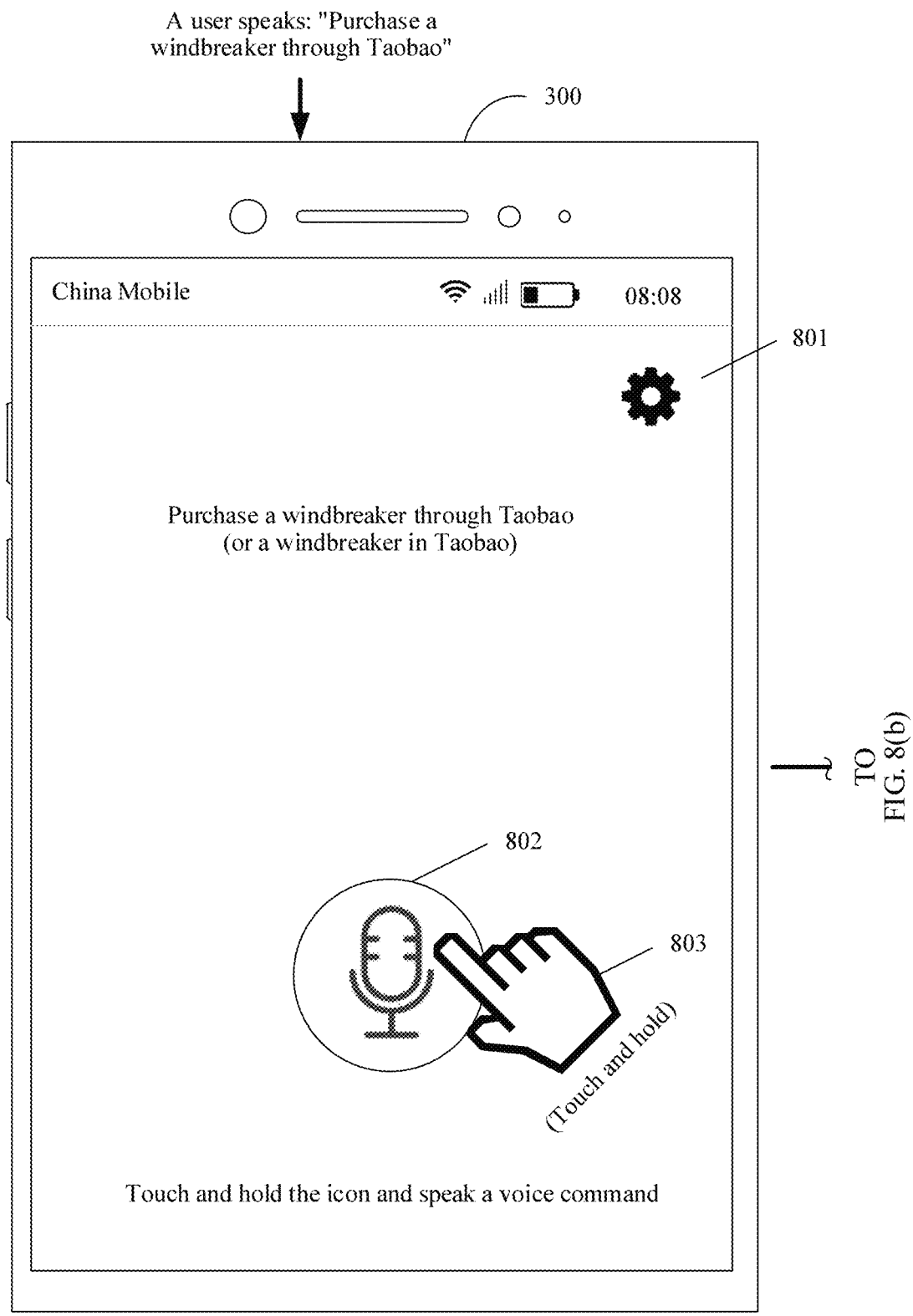
FIG. 8(a), FIG. 8(b), FIG. 8(c), and FIG. 8(d) are a schematic diagram 6 of an instance of a display interface of a terminal according to an embodiment of this application.
Figure 8B:
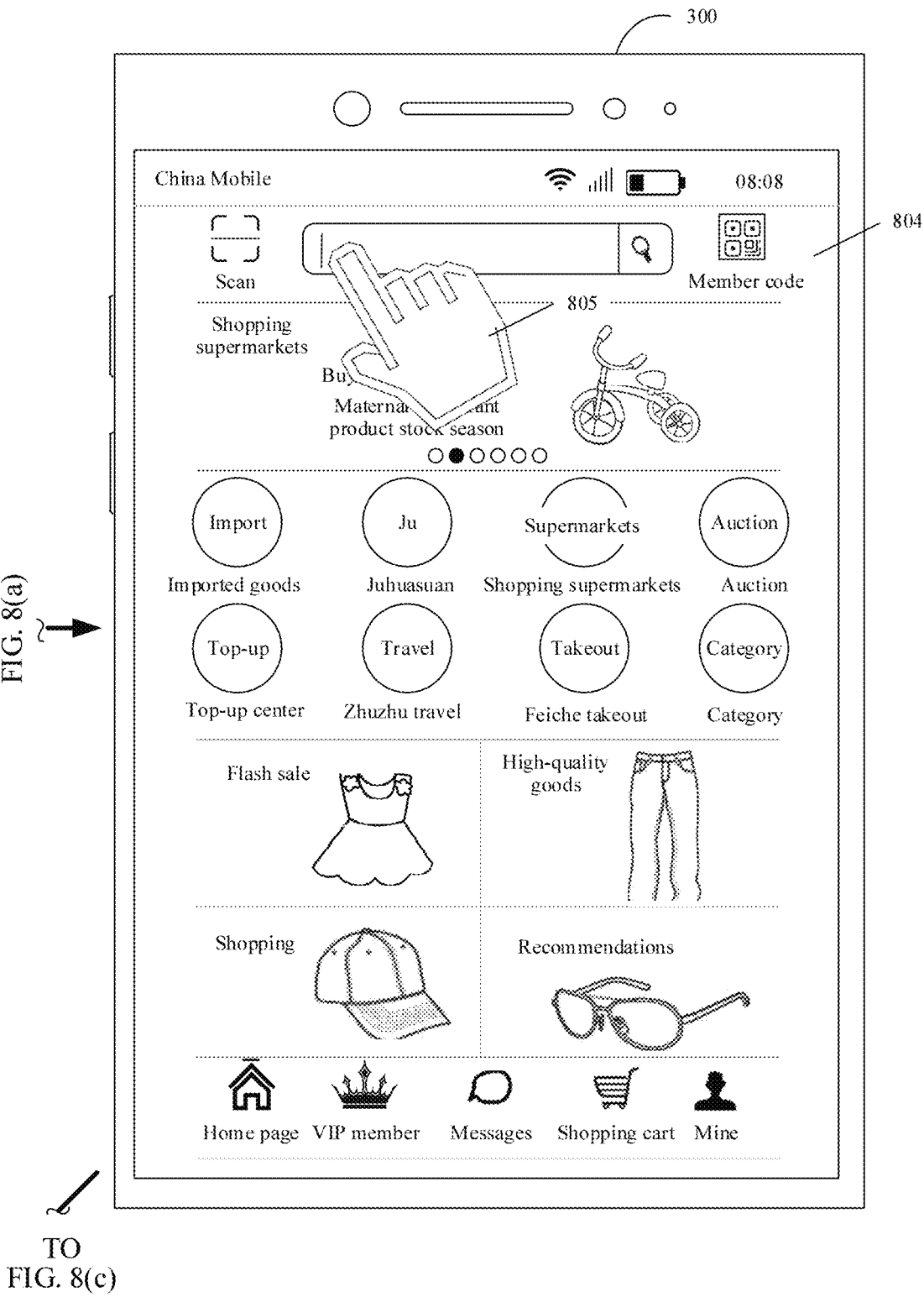
Figure 8C:
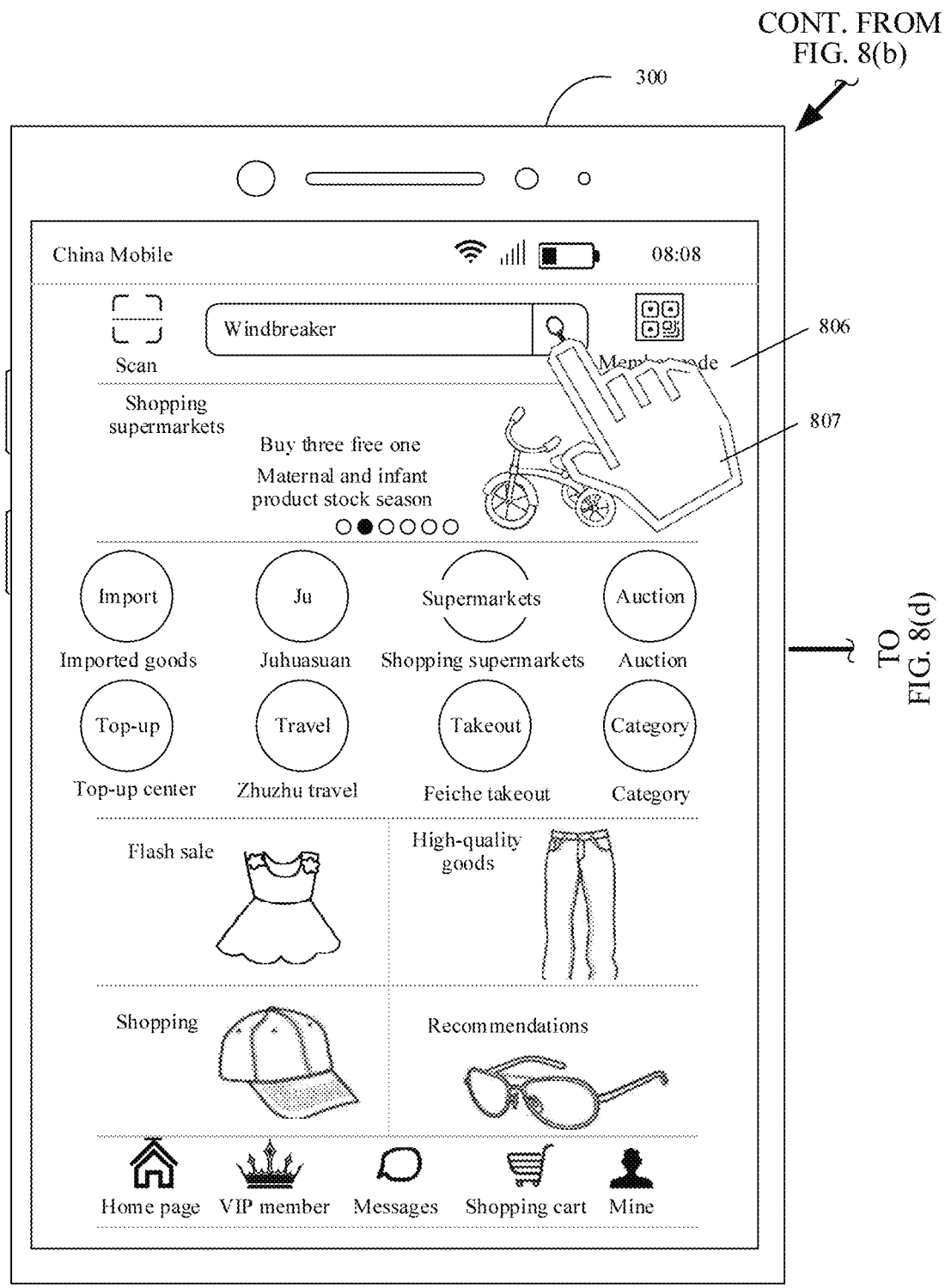
Figure 8D:
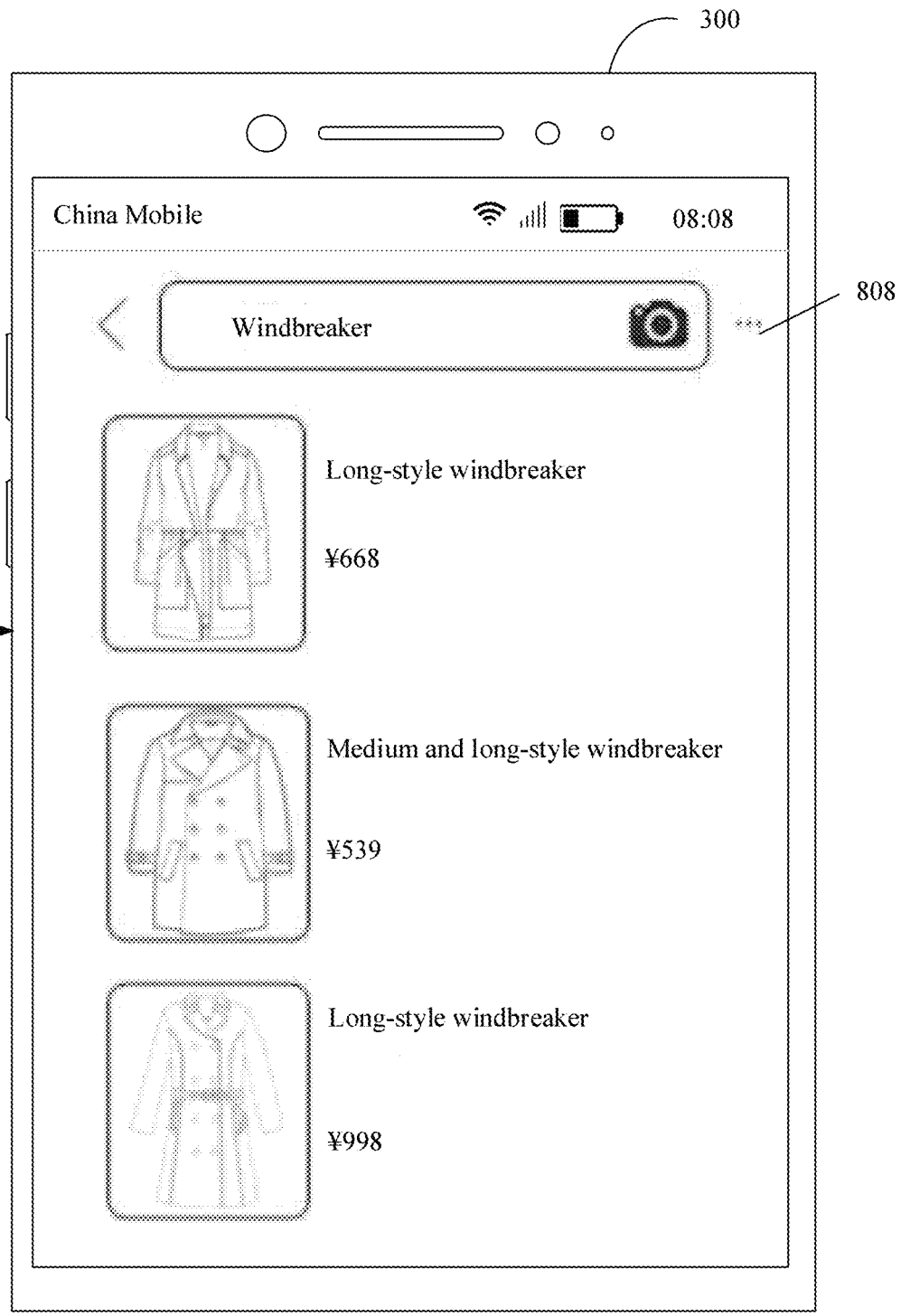

Therefore, the mobile phone 300 may sequentially display operation interfaces shown in FIG. 8(b) to FIG. 8(d). Specifically, the mobile phone 300 may start a "Taobao" application based on an application identifier "Taobao", and display a Taobao home page 804 shown in FIG. 8(b). The mobile phone 300 may simulate, based on the operation indication information a and the search word "Windbreaker", an operation that the user taps a search box on the Taobao home page 804, display, on the Taobao home page 804 shown in FIG. 8(b), an interface in which a finger of the user taps the search box, simulate an operation that the user enters a search word in the search box on the Taobao home page 804, and display, on the Taobao home page 804, the search word "Windbreaker" that is in second operation information and that is entered by the user. The mobile phone 300 may simulate, based on the operation indication information b (indication information used to indicate that the user taps a search button in the search box), the user to tap the search button in the search box, to display a display interface 806 shown in FIG. 8(c). Subsequently, the mobile phone 300 may display, in response to a tap operation performed by the user on the search button in the search box shown in FIG. 8(c), a search result interface 808 shown in FIG. 8(d).

As shown in FIG. 5(a), FIG. 5(b), and FIG. 5(c) and FIG. 6(a) and FIG. 6(b), although the first text information recorded by the mobile phone 300 is "Purchase milk through Taobao", after receiving the voice command that matches the first text information, the mobile phone 300 may perform the corresponding operation based on the operation information that corresponds to the first text information and that is recorded by the terminal 100. In this way, regardless of any voice command that matches "Purchase milk through Taobao" received by the voice assistant of the mobile phone 300, for example, "Purchase a windbreaker through Taobao" shown in FIG. 8(a), the mobile phone 300 may simulate the user to trigger the mobile phone 300 to perform an operation corresponding to "Purchase a windbreaker through Taobao", to display operation interfaces corresponding to FIG. 8(b) to FIG. 8(d).

In this embodiment of this application, a finger icon 805 shown in FIG. 8(b) and a finger icon 807 shown in FIG. 8(c) each are used to represent a finger that is of the user and that is displayed when the mobile phone 300 simulates an operation of the user. A finger icon 803 shown in FIG. 8(a) is used to represent a finger that is of the user and that is displayed when the mobile phone 300 receives an actual operation of the user. The finger icon 805 shown in FIG. 8(b) is different from the finger icon 803 shown in FIG. 8(a).

Optionally, after determining that the first voice command matches the first text information, the terminal 100 may directly display an operation result interface corresponding to the first voice command. For example, after receiving the voice command "Purchase a windbreaker through Taobao" entered by the user in the voice control interface 801 shown in FIG. 8(a), the mobile phone 300 may directly display an interface 808 shown in FIG. 8(d).

According to the voice control command generation method provided in this embodiment of this application. The terminal 100 may first obtain the operation information corresponding to the one or more operations, then connect the first application identifier and/or the first interface identifier and the first search word based on a preset location relationship by using the connection word to form a statement, so as to obtain the plurality of pieces of text information, and display the third interface including the plurality of pieces of text information, so that the user selects, from the plurality of pieces of text information, the first text information that conforms to a language habit of the user. The first text information is a command that is selected by the user and that conforms to the language habit of the user. After the terminal 100 receives the first voice command, the terminal 100 may perform the corresponding operation based on the operation information provided that the text of the first voice command matches the first text information, instead of performing the corresponding operation only when the user speaks a voice command corresponding to the text information word by word. According to this solution, flexibility of custom voice control can be improved and user experience can be improved.

Figure 9:
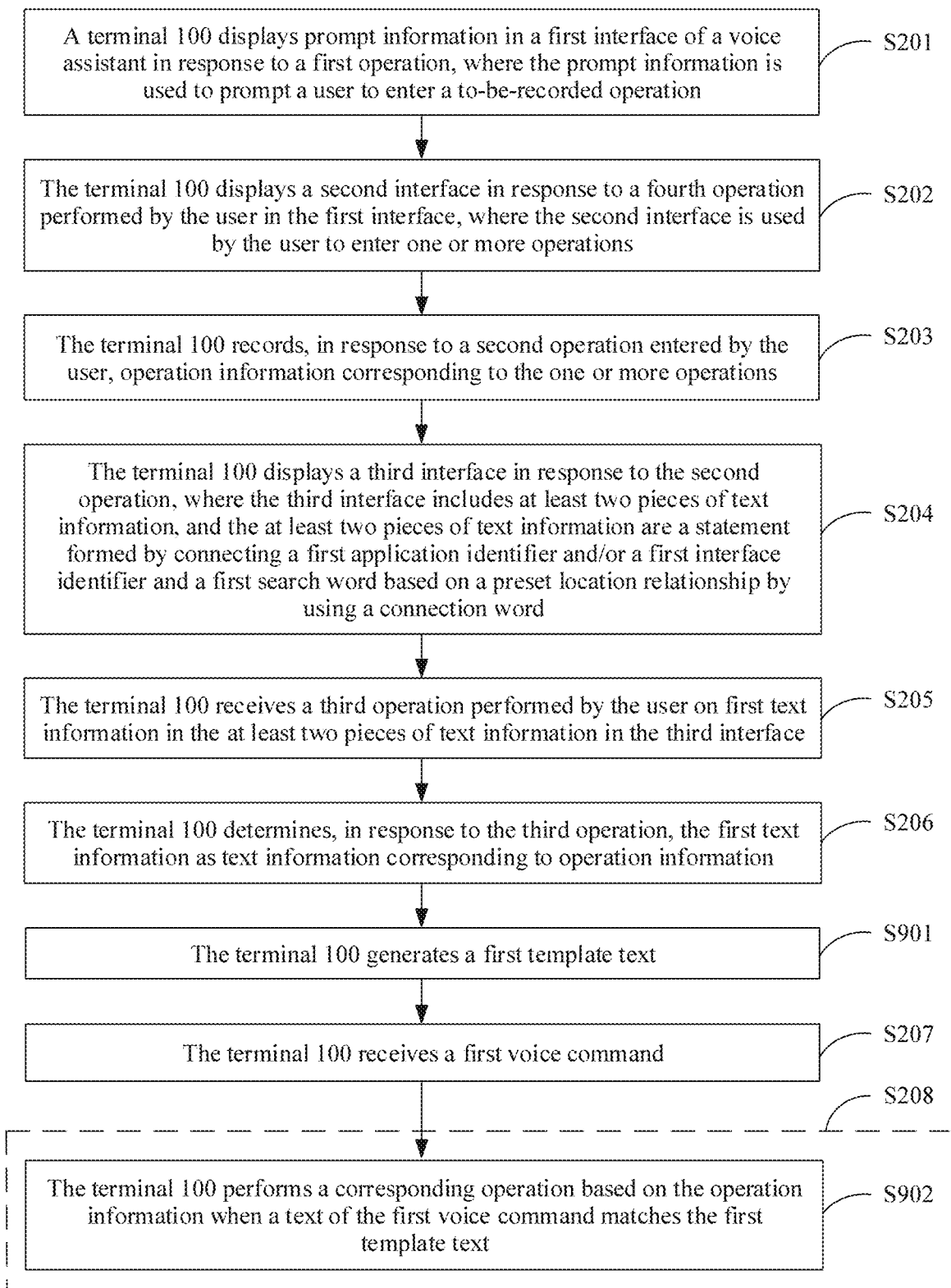
FIG. 9 is a flowchart 2 of a voice control command generation method according to an embodiment of this application.

Further, after the terminal 100 determines the first text information as the text information corresponding to the operation information (namely, S206), before the terminal 100 receives the first voice command (namely, S207), the method in this embodiment of this application may include S901, so that after receiving the first voice command, the terminal 100 can more quickly and accurately identify that the first voice command is a voice command that matches the first text information, and then perform the corresponding operation based on the operation information. As shown in FIG. 9, after S206 shown in FIG. 2, before S207, the method in this embodiment of this application may further include S901.

S901: The terminal 100 generates a first template text.

The first template text is generated by replacing the second part in the first text information with type information of the first search word. In other words, if the first text information is generated through filling in the first user statement template, the first template text is generated by filling the first application identifier and/or the first interface identifier in the first filling item in the first user statement template, and filling the type information of the first search word in the second filling item in the first user statement template.

The terminal 100 may obtain the type information of the first search word; and replace the first search word in the first text information with the type information of the first search word, to obtain a first template command. Alternatively, the terminal 100 may obtain the type information of the first search word; and fill the first application identifier and/or the first interface identifier in the first filling item in the first user statement template, and fill the type information of the first search word in the second filling item in the first user statement template, to obtain the first template text.

For example, with reference to the foregoing instance, it is assumed that the first text information is "Purchase [milk] through (Taobao)". The mobile phone 300 may learn that the type information of the first search word "Milk" is "Commodity". Then, the mobile phone 300 may replace "Milk" in "Purchase [milk] through (Taobao)" with "Commodity", to obtain the first template text "Purchase [commodity] through (Taobao)". Alternatively, assuming that the first text information is "Purchase [milk] through (Taobao)", and the first user statement template is "Purchase [search word] through (application identifier)", the first search word is "Milk", and the first application identifier is "Taobao". The mobile phone 300 may learn that the type information of the first search word "Milk" is "Commodity". Then, the mobile phone 300 may fill the first application identifier "Taobao" in the first filling item "( )", and fill the first search word "Milk" in the second filling item "[ ]", to obtain the first template text "Purchase [commodity] through (Taobao)".

That the text of the first voice command matches the first text information may be specifically: the text of the first voice command matches the first template text. As shown in FIG. 9, S208 shown in FIG. 2 may include S902.

S902: The terminal 100 performs the corresponding operation based on the operation information when the text of the first voice command matches the first template text.

That the text of the first voice command matches the first template text may include: the at least one third part in the text corresponding to the first voice command is the same as the at least one first part, the location relationship between the at least one third part and the fourth part in the first voice command is the same as the location relationship between the at least one first part and the second part in the first text information, and the fourth part is a word of a type indicated by type information in the first template text.

With reference to the foregoing instance, it is assumed that the first template text is "Purchase [commodity] through Taobao". If the first voice command is "Purchase a windbreaker through Taobao", the terminal 100 may determine that the at least one third part "Taobao" in the first voice command "Purchase a windbreaker through Taobao" is the same as the at least one first part "Taobao" in the first template text, a location relationship between the at least one third part "Taobao" and the fourth part "Windbreaker" in the first voice command "Purchase a windbreaker through Taobao" is the same as a location relationship between the at least one first part "Taobao" and the second part "Milk" in the first text information "Purchase milk through Taobao", and the fourth part "Windbreaker" is a word of a commodity type indicated by "Commodity" in the first template text "Purchase [commodity] through Taobao". Therefore, the terminal 100 may determine that the first voice command "Purchase a windbreaker through Taobao" matches the first text information "Purchase milk through Taobao".

Alternatively, assuming that the first user statement template is "Purchase [search word] through (application identifier)", and the first text information is "Purchase [milk] through (Taobao)", the first application identifier is "Taobao", the first search word is "Milk", and the type information of the first search word "Milk" is "Commodity". The terminal 100 may generate the first template text "Purchase [commodity] through Taobao".

If the first voice command is "Purchase a windbreaker through Taobao", the terminal 100 may determine that the first voice command "Purchase a windbreaker through Taobao" conforms to the first user statement template "Purchase [search word] through (application identifier)". The first voice command "Purchase a windbreaker through Taobao" includes the first application identifier "Taobao", and the second search word "Windbreaker" included in the first voice command "Purchase a windbreaker through Taobao" is the word of the commodity type. Therefore, the terminal 100 may determine that the first voice command "Purchase a windbreaker through Taobao" matches the first template text "Purchase [commodity] through Taobao".

After obtaining the operation information, the terminal 100 may store the operation information (referred to as first operation information). The terminal 100 may further store a correspondence between the first template text and the operation information after generating the first template text. In this way, after determining that the first voice command matches the first template text, the terminal 100 may find the first operation information corresponding to the first template text. The first operation information includes the first application identifier, the first interface identifier, the first search word, and the operation indication information, the first voice command includes the second search word. Therefore, the terminal 100 may obtain the second operation information that includes the first application identifier, the first interface identifier, the second search word, and the operation indication information. The terminal 100 may perform an operation corresponding to the first application identifier, the first interface identifier, the operation indication information, and the second search word (namely, the second operation information).

For example, with reference to the foregoing instance, assuming that the first template text is "Purchase [commodity] in Taobao", and the first voice command is "Purchase [windbreaker] in Taobao", the second operation information may include an application identifier "Taobao", an interface identifier "Taobao home page", and a search word "Windbreaker". The mobile phone 300 may receive, in response to a touch and hold operation performed by the user on a "Record" button 802 in a voice control interface 801 shown in FIG. 8(*a*), the first voice command entered by the user, for example, "Purchase a windbreaker through Taobao". The mobile phone 300 may determine that the first voice command "Purchase a windbreaker through Taobao" matches the first template text "Purchase [commodity] in Taobao". Therefore, the mobile phone 300 may sequentially display operation interfaces shown in FIG. 8(*b*) to FIG. 8(*d*). Specifically, the mobile phone 300 may start a "Taobao" application based on an application identifier "Taobao" in the second operation information, and display a Taobao home page 804 shown in FIG. 8(*b*). The mobile phone 300 may simulate, based on the operation indication information a and the search word "Windbreaker", an operation that the user taps a search box on the Taobao home page 804, display, on the Taobao home page 804 shown in FIG. 8(*b*), an interface 804 in which a finger of the user taps the search box, simulate an operation that the user enters a search word in the search box on the Taobao home page 804, and display, on the Taobao home page 804, the search word "Windbreaker" that is in the second operation information and that is entered by the user. The mobile phone 300 may simulate, based on the operation indication information b (indication information used to indicate that the user taps a search button in the search box), the user to tap the search button in the search box, to display a display interface shown in FIG. 8(*c*). Subsequently, the mobile phone 300 may display, in response to a tap operation performed by the user on the search button in the search box shown in FIG. 8(*c*), a search result interface 808 shown in FIG. 8(*d*).

As shown in FIG. 5(*a*), FIG. 5(*b*), and FIG. 5(*c*) and FIG. 6(*a*) and FIG. 6(*b*), although the first text information recorded by the mobile phone 300 is "Purchase milk through Taobao", the mobile phone 300 may generate the first template text "Purchase a commodity through Taobao" of the first text information. In this way, regardless of any voice command that matches "Purchase a commodity through Taobao" received by the voice assistant of the mobile phone 300, for example, "Purchase a windbreaker through Taobao" shown in FIG. 8(*a*), the mobile phone 300 may simulate an operation performed when the user triggers the mobile phone 300 to perform an event corresponding to "Purchase a windbreaker through Taobao", to display operation interfaces corresponding to FIG. 8(*b*) to FIG. 8(*d*).

In this embodiment of this application, a finger icon 805 shown in FIG. 8(*b*) and a finger icon 807 shown in FIG. 8(*c*) each are used to represent a finger that is of the user and that is displayed when the mobile phone 300 simulates an operation of the user. A finger icon 803 shown in FIG. 8(*a*) is used to represent a finger that is of the user and that is displayed when the mobile phone 300 receives an actual operation of the user. The finger icon 805 shown in FIG. 8(*b*) is different from the finger icon 803 shown in FIG. 8(*a*).

Optionally, after determining that the first voice command matches the first template text, the terminal 100 may directly display an operation result interface corresponding to the second operation information. For example, after receiving the voice command "Purchase a windbreaker through Taobao" entered by the user in the voice control interface 801 shown in FIG. 8(*a*), the mobile phone 300 may directly display, based on the second operation information, an interface 808 shown in FIG. 8(*d*).

Figure 7B:
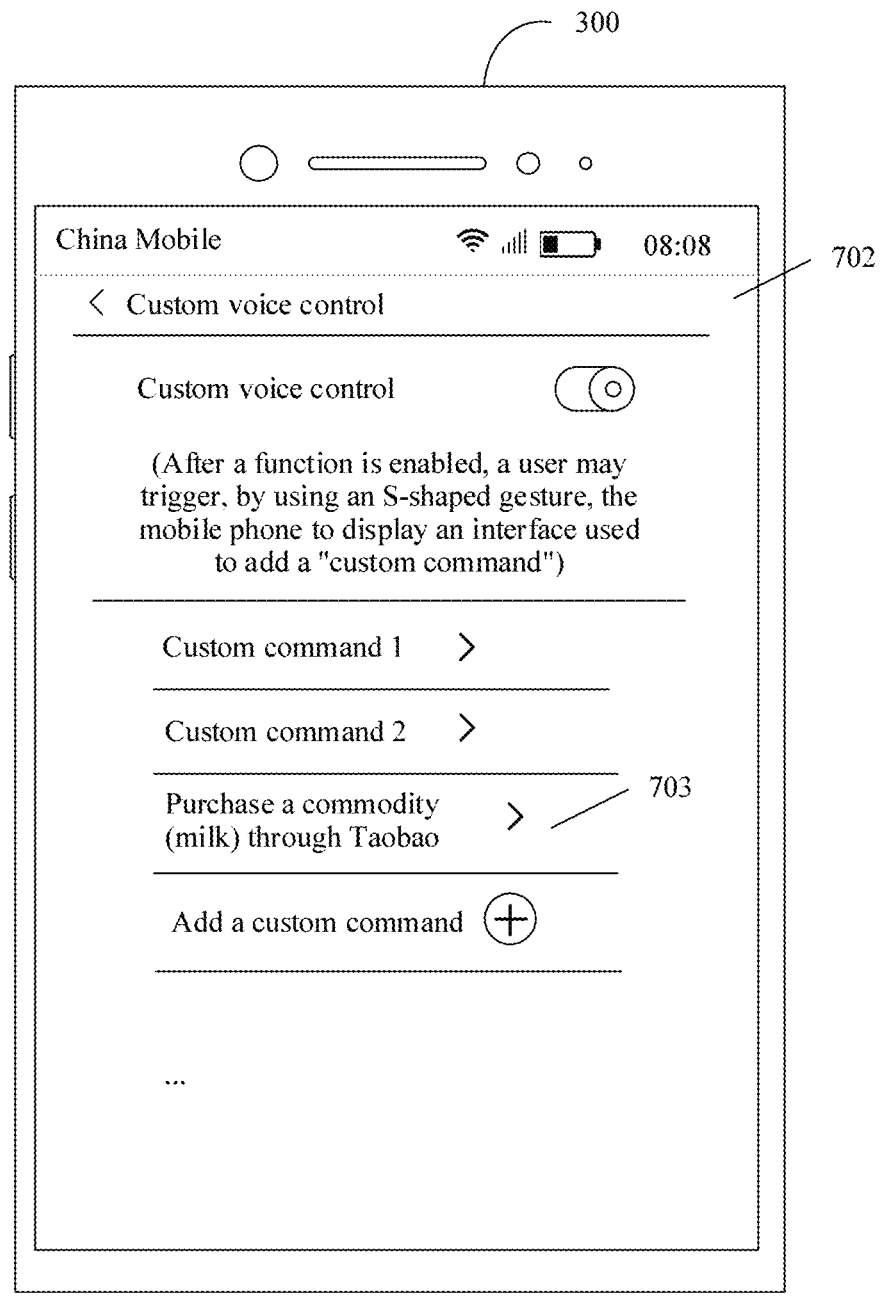

After generating the first template text, the terminal 100 may store the first template text. The mobile phone 300 is used as an example. After the mobile phone 300 stores the first template text, as shown in FIG. 7(*b*), one piece of text information 703, for example, "Purchase a commodity (milk) through Taobao" is added to a "Custom voice control" interface 702 displayed by the mobile phone 300 compared with the "Custom voice control" interface 401 shown in FIG. 4(*a*).

Optionally, after generating the first template text, the terminal 100 may further display a fourth interface. The fourth interface is used to prompt the user to send, through the voice assistant, the first voice command that matches the first template text, to trigger the terminal 100 to perform a corresponding operation.

For example, it is assumed that the user selects the command option "Purchase [milk] through (Taobao)" 602 in the third interface 601 shown in FIG. 6(*a*). In response to a tap operation performed by the user on the "OK" button in the third interface 601 shown in FIG. 6(*a*), the mobile phone 300 may generate the first template text "Purchase [commodity] through (Taobao)", and display a fourth interface 603 shown in FIG. 6(*b*). The fourth interface 603 may include third prompt information "Based on your operation, next time you may speak to the voice assistant: Purchase  through Taobao" 604. Optionally, as shown in FIG. 6**(*b*), the fourth interface 603 may further include statement instances of the first template text "Purchase ** through Taobao", for example, "Purchase a pen through Taobao" and "Purchase milk through Taobao".

In this embodiment of this application, the terminal 100 may first obtain the operation information corresponding to the one or more operations, and then display the third interface including the plurality of pieces of text information, so that the user selects, from the plurality of pieces of text information, the first text information that conforms to a voice habit of the user. The plurality of pieces of text information are generated by filling the operation information in the user statement template stored in the terminal 100. The terminal 100 may fill the first application identifier and/or the first interface identifier in the first filling item in the first user statement template, and fill the type information of the first search word in the second filling item in the first user statement template, to generate the first template text. If the terminal 100 receives, next time, a voice command that matches the template text, even if an operation corresponding to the voice command is not recorded in the terminal 100, the terminal 100 may also simulate the user to trigger the terminal 100 to perform the operation corresponding to the voice command, and display a corresponding operation interface. In this way, flexibility of custom voice control can be improved and user experience can be improved.

In this embodiment of this application, an example in which the terminal records one or more operations performed by the user on the "Travel" application is used herein to describe the method in this embodiment of this application.

The terminal 100 may display the second interface in response to the fourth operation performed by the user in the first interface. The second interface is a general term for a plurality of interfaces used to receive the one or more operations. Usually, the terminal 100 may first display a first sub-interface in response to the fourth operation. For example, the terminal 100 is the mobile phone 300. The mobile phone 300 may display a first sub-interface 409 shown in FIG. 4(*c*).

Figure 10A:
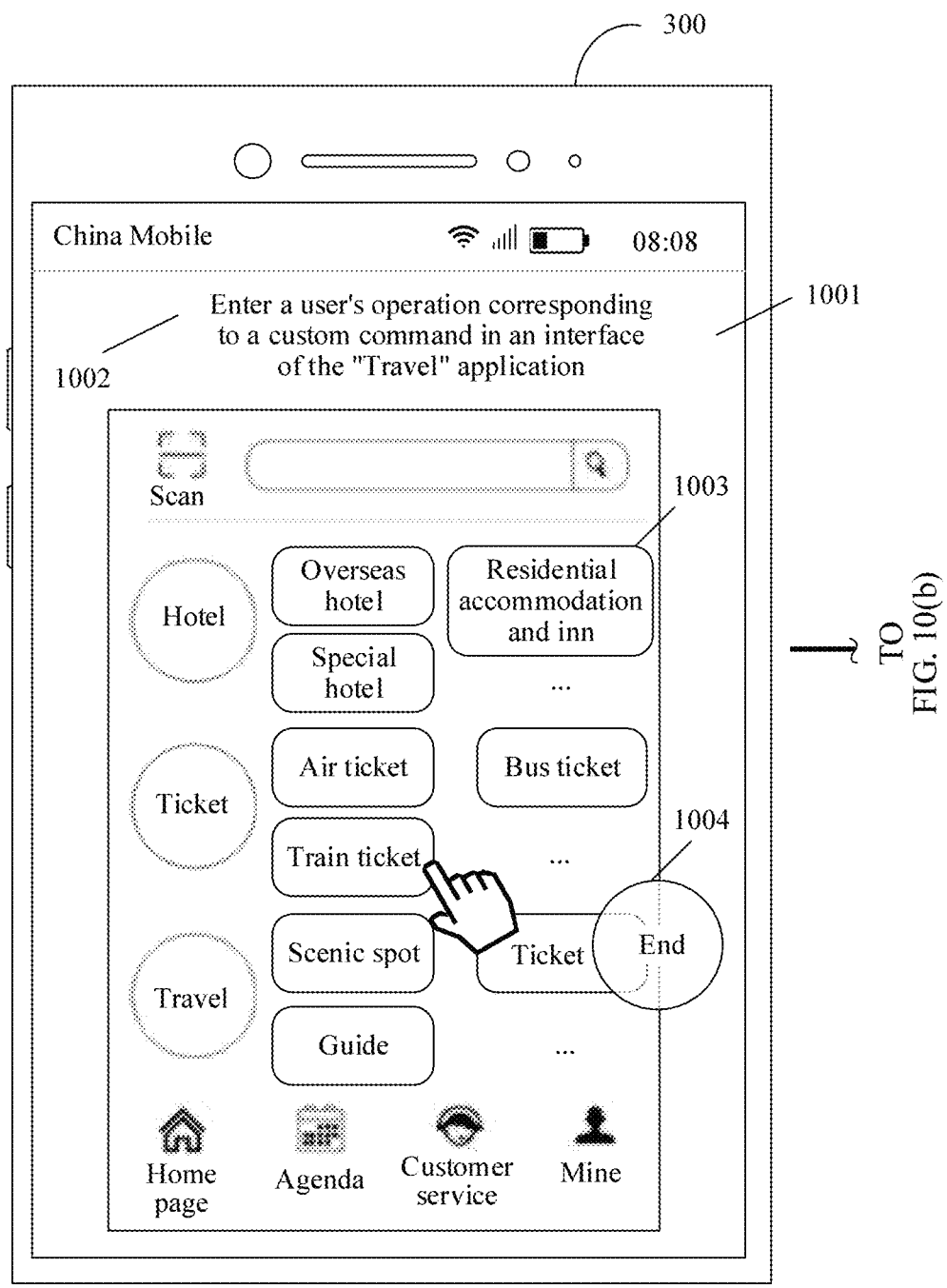
FIG. 10(a), FIG. 10(b), and FIG. 10(c) are a schematic diagram 7 of an instance of a display interface of a terminal according to an embodiment of this application.
Figure 10B:
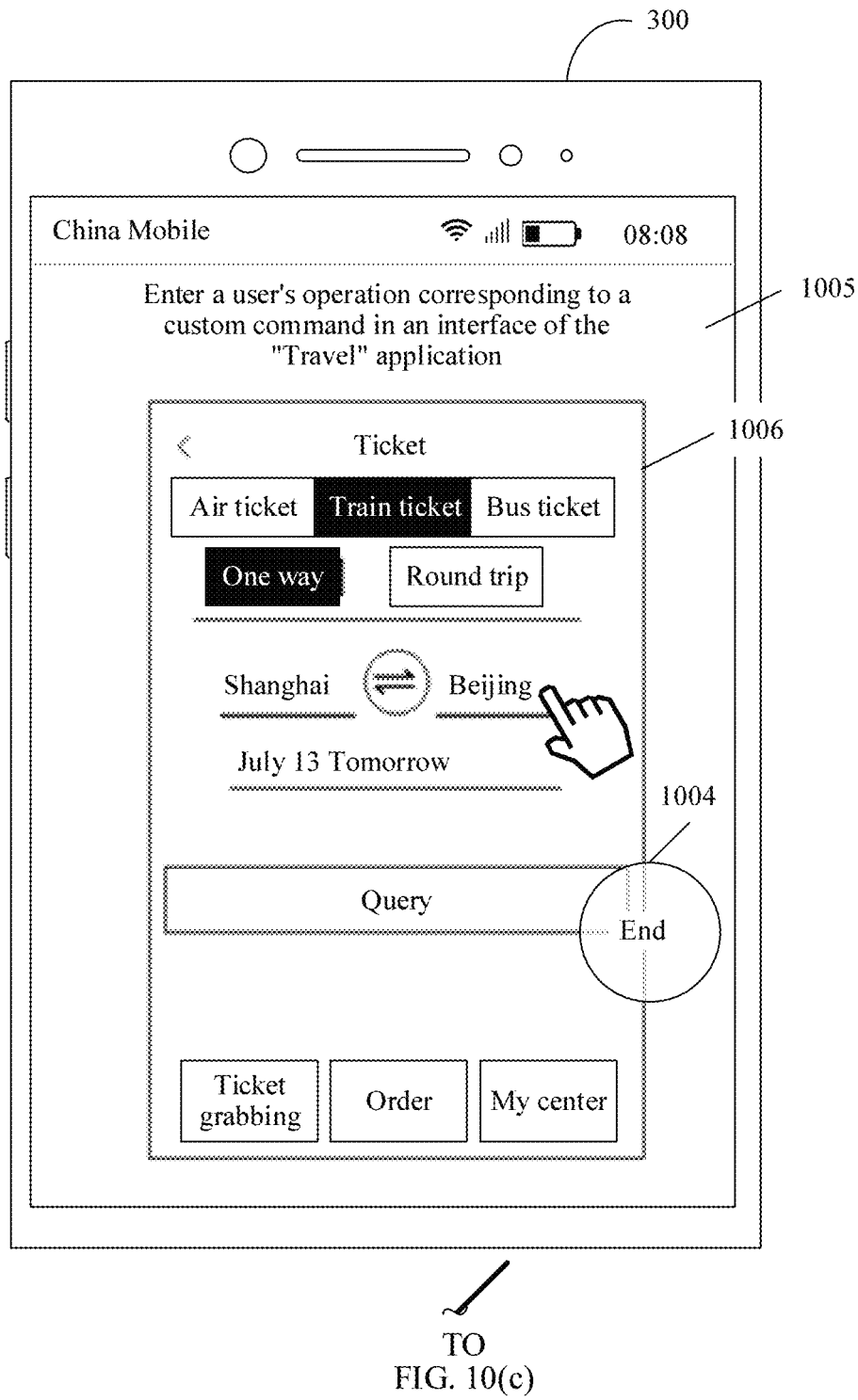
Figure 10C:
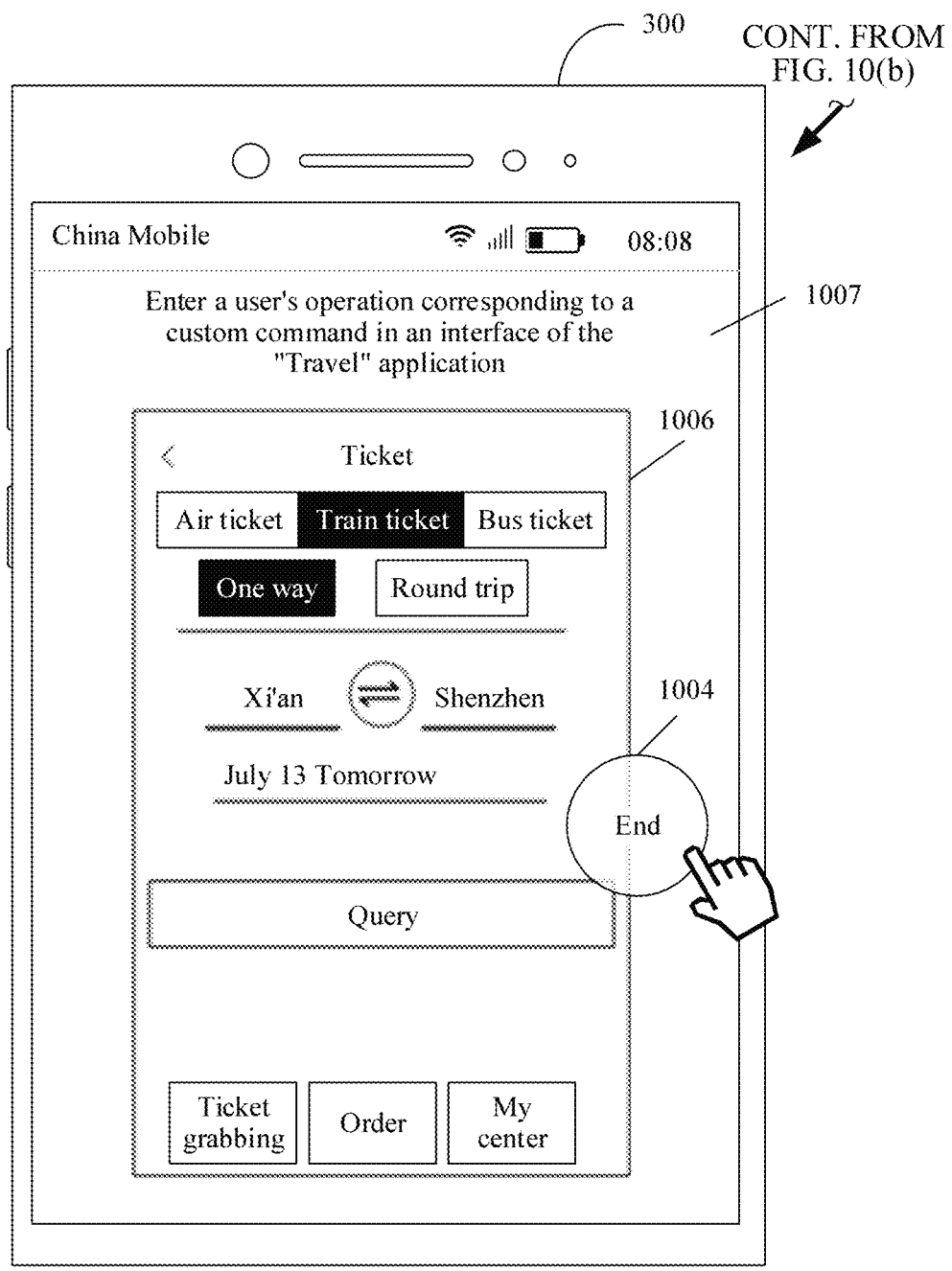

It is assumed that the user taps a "Travel" application icon in the first sub-interface 409. In response to a tap operation (namely, a first sub-operation) performed by the user on the "Travel" application icon in the first sub-interface 409, the mobile phone 300 may display a second sub-interface 1001 shown in FIG. 10(*a*), and obtain a first application identifier "Travel". The second sub-interface 1001 includes second prompt information 1002 and a "Travel" home page 1003. For example, the second prompt information 1003 is "Enter one or more operations corresponding to text information in an interface of the 'Travel' application". The mobile phone 300 may receive a tap operation performed by the user on a "Train ticket" option in the second sub-interface 1001. The mobile phone 300 may display, in response to a tap operation performed by the user on the "Train ticket" option, a third sub-interface 1005 shown in FIG. 10(*b*). The third sub-interface 1005 includes the second prompt information and a train ticket interface 1006. The mobile phone 300 may obtain, in response to the tap operation performed by the user on the "Train ticket" option, operation indication information c used to indicate that the user taps the "Train ticket" option and an interface identifier of the train ticket interface 1006. The user may tap a "Departure place" option in the train ticket interface 1006 to modify a departure place. As shown in FIG. 10(*b*), a departure place currently displayed in the "Departure place" option is Shanghai. The user may further tap a "Destination" option in the train ticket interface 1006 to modify a destination. As shown in FIG. 10(*b*), a destination currently displayed in the "Destination" option is Beijing. For example, the user modifies the destination. As shown in FIG. 10(*b*), it is assumed that the user operates the "Destination" option to modify the destination to Shenzhen. The mobile phone 300 may display, in response to an operation performed by the user on the "Destination" option, a fourth sub-interface 1007 shown in FIG. 10(*c*). The third sub-interface 1005 includes the second prompt information and the train ticket interface 1006. A destination currently displayed in a "Destination" option in a train ticket interface 1008 is Shenzhen. The mobile phone 300 may obtain, in response to operations performed by the user on the "Departure place" option and the "Destination" option, operation indication information d used to indicate that the user modifies the "Departure place" option and the "Destination" option, a search word "Xi'an" entered by the user in the "Departure place" option, and a search word "Shenzhen" entered by the user in in the "Destination" option.

In conclusion, the operation information obtained by the mobile phone 300 may include an application identifier of the "Travel" application, a home page identifier of the "Travel" application, the operation indication information c, an interface identifier of the train ticket interface 1006, the operation indication information d, the search word "Xi'an" entered in the "Departure place" option, and the search word "Shenzhen" entered in the "Destination" option.

FIG. 10(*a*) to FIG. 10(*c*) each include an end button 1004. For example, in response to a tap operation (namely, a second operation) performed by the user on the end button 1004 shown in FIG. 10(*c*), the mobile phone 300 may end recording of one or more operations, and display a third interface.

For the travel application, the following plurality of user statement templates may be configured in the terminal 100: "Purchase (interface identifier) from [search word 1] to [search word 2] in (application identifier)", "Purchase (interface identifier) from [search word 1] to [search word 2]", "(interface identifier) from [search word 1] to [search word 2]", "(interface identifier) to [search word 2]", and the like. It is assumed that the operation information includes an application identifier "Travel", an interface identifier of the train ticket interface 1006, a search word "Xi'an" entered in the "Departure place" option, a search word "Shenzhen" entered in the "Destination" option, and an interface identifier of the train ticket interface 1008. The mobile 300 fills the operation information in the user statement template of the travel application, to obtain the following text information: "Purchase (train ticket) from [Xi'an] to [Shenzhen] in (travel)", "Purchase (train ticket) from [Xi'an] to [Shenzhen]", "(Train ticket) from [Xi'an] to [Shenzhen]", and the like.

Figure 11A:
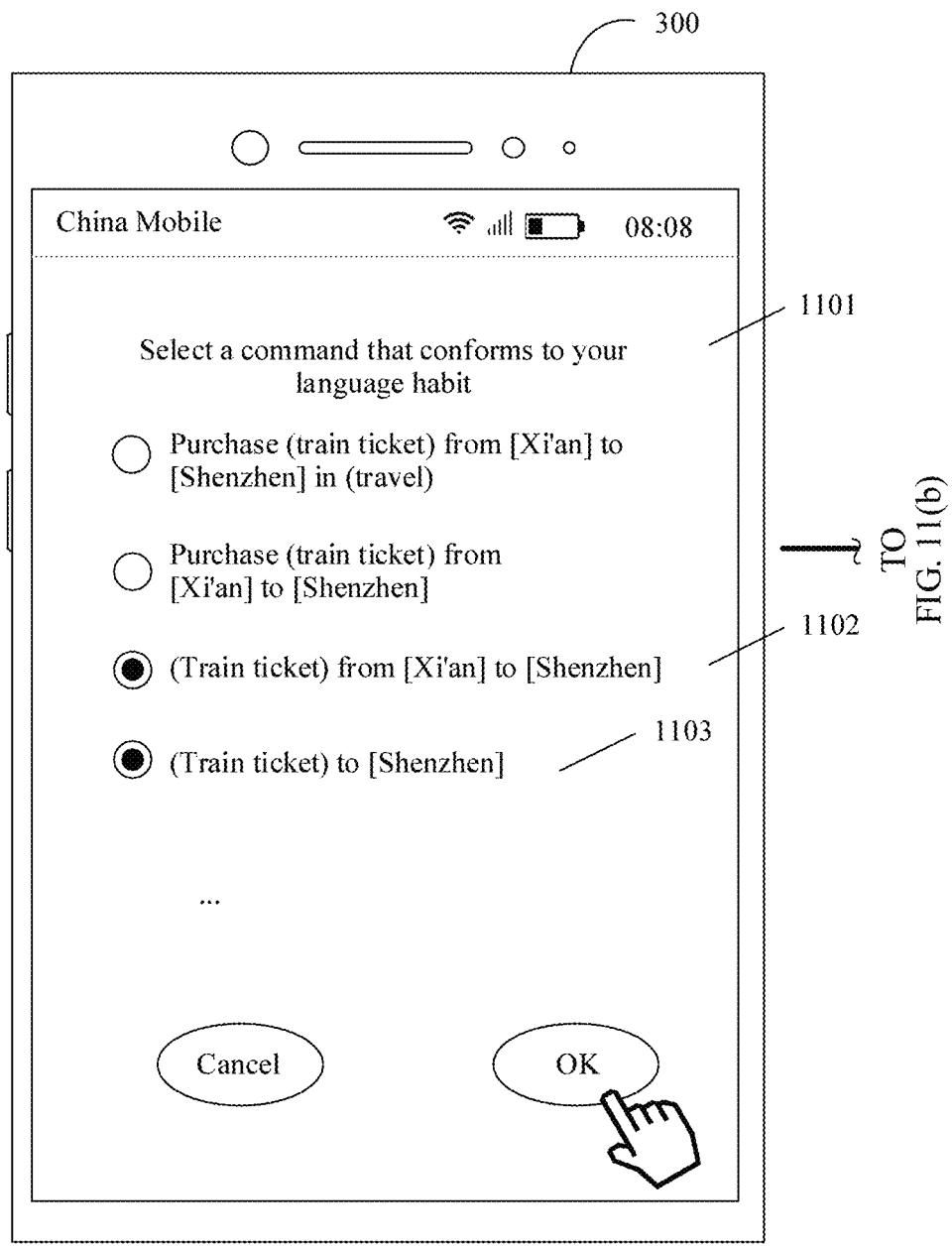
FIG. 11(a), FIG. 11(b), and FIG. 11(c) are a schematic diagram 8 of an instance of a display interface of a terminal according to an embodiment of this application.
Figure 11B:
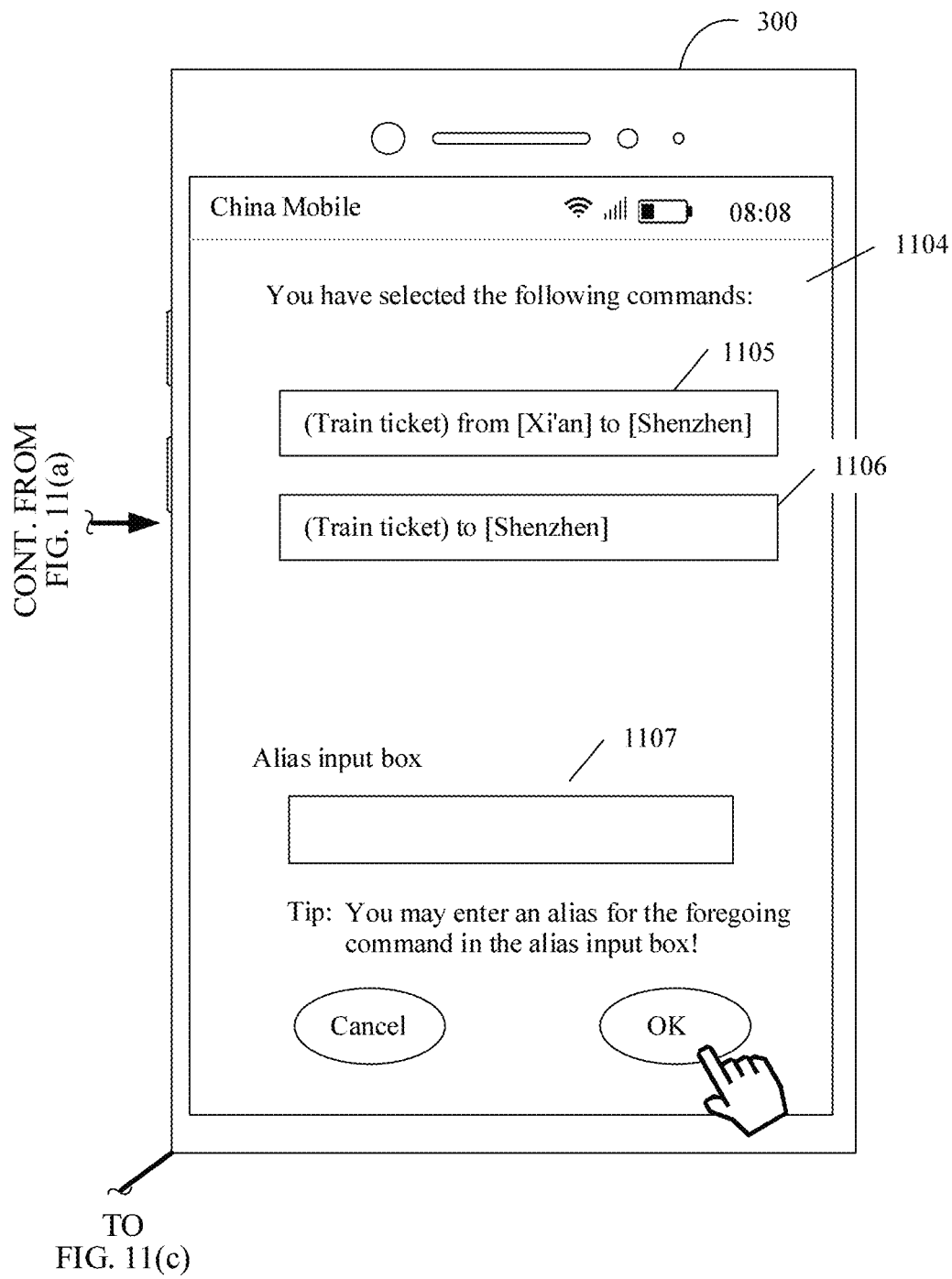
Figure 11C:
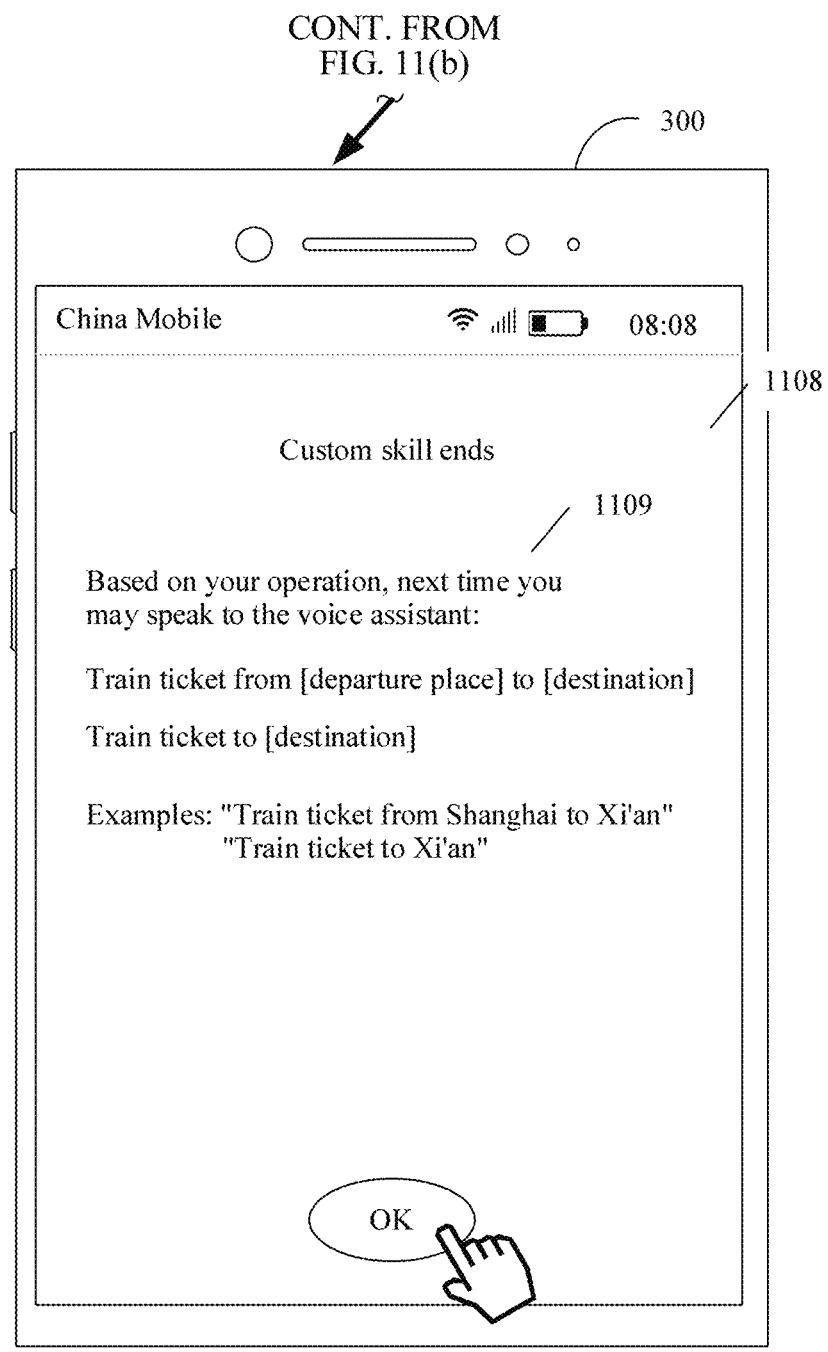

For example, the mobile phone 300 may display, in response to the tap operation performed by the user on the end button 1004 shown in FIG. 10(*c*), a third interface 1101 shown in FIG. 11(*a*). The third interface 1101 includes a plurality of pieces of text information, for example, "Purchase (train ticket) from [Xi'an] to [Shenzhen] in (travel)", "Purchase (train ticket) from [Xi'an] to [Shenzhen]", "(Train ticket) from [Xi'an] to [Shenzhen]" 1102, and "(Train ticket) to [Shenzhen]" 1103.

The terminal 100 may receive a selection operation performed by the user on one or more pieces of text information in the third interface. For example, the mobile phone 300 may receive a selection operation performed by the user on the text information "(Train ticket) from [Xi'an] to [Shenzhen]" 1102 and "(Train ticket) to [Shenzhen]" 1103 in the third interface 1101. The mobile phone 300 may generate, in response to a selection operation performed by the user on the text information "(Train ticket) from [Xi'an] to [Shenzhen]" 1102 displayed in the third interface 1101, a first template text "(Train ticket) from [departure place] to [destination]" by using a first user statement template "(interface identifier) from [departure place] to [destination]". The mobile phone 300 may generate, in response to a selection operation performed by the user on the text information "(Train ticket) to [Shenzhen]" 1103 displayed in the third interface 1101, a first template text "(Train ticket) to [destination]" by using a first user statement template "(interface identifier) to [destination]".

The mobile phone 300 may display, in response to the selection operation performed by the user on the first text information "(Train ticket) from [Xi'an] to [Shenzhen]" 1102 and "(Train ticket) to [Shenzhen]" 1103, a fourth interface 1108 shown in FIG. 11(*c*). The fourth interface 1108 may include third prompt information "Based on your operation, next time you may speak to the voice assistant: (Train ticket) from [departure place] to [destination] and (Train ticket) to [destination]". Optionally, as shown in FIG. 11(*c*), the fourth interface 1108 may further include a statement instance of the first template text "(Train ticket) from [departure place] to [destination]", for example, "Train ticket from Shanghai to Xi'an", and a statement instance of the first template text "(Train ticket) to [destination]", for example, "Train ticket to Xi'an".

The mobile phone 300 may receive, in response to a touch and hold operation performed by the user on a "Record" button 1202 in a voice control interface 1201 shown in FIG. 12(*a*), the first voice command entered by the user, for example, "Train ticket from Shanghai to Xi'an". The mobile phone 300 may determine that the first voice command "Train ticket from Shanghai to Xi'an" matches the first template text "(Train ticket) from [departure place] to [destination]". Therefore, the mobile phone 300 may sequentially display operation interfaces shown in FIG. 12(*b*) to FIG. 12(*d*).

The operation information (namely, the first operation information) includes an application identifier of the "Travel" application, a home page identifier of the "Travel" application, the operation indication information c, an interface identifier of the train ticket interface 1006, the operation indication information d, the search word "Xi'an" entered in the "Departure place" option, and the search word "Shenzhen" entered in the "Destination" option, and the first voice command is "Train ticket from Shanghai to Xi'an". Therefore, the second operation information includes an application identifier of the "Travel" application, a home page identifier of the "Travel" application, the operation indication information c, an interface identifier of the train ticket interface, the operation indication information d, the search word "Shanghai" entered in the "Departure place" option, and the search word "Xi'an" entered in the "Destination" option.

In response to the first voice command "Train ticket from Shanghai to Xi'an" entered by the user in the voice control interface 1201, the mobile phone 300 may start a "Travel" application based on the application identifier "Travel" in the second operation information, and display a home page of the "Travel" application based on the home page identifier of the "Travel" application. The mobile phone 300 may simulate, based on the operation indication information c (operation indication information used to indicate that the user taps a "Train ticket" option on the home page of the "Travel" application), the user to tap the "Train ticket" option on the home page of the "Travel" application, to display an interface 1203 shown in FIG. 12(*b*). Subsequently, the mobile phone 300 may display a train ticket interface based on an interface identifier of the train ticket interface, and simulate, based on the operation indication information d (operation indication information used to indicate that the user modifies the "Departure place" option and the "Destination" option), operation indication information used to modify the "Departure place" option and the "Destination" option, to display an interface 1204 shown in FIG. 12(*c*). In addition, the mobile phone 300 may display, based on the search word "Shanghai" entered in the "Departure place" option and the search word "Xi'an" entered in the "Destination" option, a display interface 1205 shown in FIG. 12(*d*). In this way, after the user enters the voice command "Train ticket from Shanghai to Xi'an" to the mobile phone 300 in the voice control interface 1201 shown in FIG. 12(*a*), the mobile phone 300 may automatically display the operation interfaces shown in FIG. 12(*b*) to FIG. 12(*d*). The user only needs to tap a "Query" button in the interface 1205 shown in FIG. 12(*d*), to trigger the mobile phone 300 to query a train ticket from Shanghai to Xi'an.

Considering that the user may have different names (or statements) for a same object, before displaying the fourth interface, the terminal 100 may further display a fifth interface including an alias input box. In this way, the user may create an alias for the first text information in the alias input box. Specifically, that the terminal 100 displays a fourth interface may include: The terminal 100 displays a fifth interface. The fifth interface includes an alias input box. The alias input box is used to receive second text information, and the second text information is an alias created by the user for the first text information. The terminal 100 receives a fifth operation performed by the user in the fifth interface. The fifth operation is used to trigger the terminal 100 to end recording of text information. The terminal 100 displays the fourth interface in response to the fifth operation.

For example, the mobile phone 300 may display, in response to the selection operation performed by the user on the first text information "(Train ticket) from [Xi'an] to [Shenzhen]" 1102 and "(Train ticket) to [Shenzhen]" 1103 in the third interface 1101 shown in FIG. 11(*a*), a fifth interface 1104 shown in FIG. 11(*b*). The fifth interface 1104 includes an alias input box 1107.

The mobile phone 300 may display, in response to a selection operation performed by the user on first text information "Purchase (milk) through [Taobao]" 1302 in a third interface 1301 shown in FIG. 13(*a*), a fifth interface 1303 shown in FIG. 13(*b*). The fifth interface 1303 includes an alias input box 1305.

Optionally, the fifth interface may further include prompt information used to indicate the user to enter the second text information in the alias input box. For example, the fifth interface 1303 shown in FIG. 13(*b*) further includes prompt information "Tip: You may enter an alias for the foregoing command in the alias input box".

Optionally, the fifth interface may further include fourth prompt information. The fourth prompt information is used to indicate the first text information selected by the user. For example, the fifth interface 1104 shown in FIG. 11(*b*) further includes fourth prompt information "(Train ticket) from [Xi'an] to [Shenzhen]" 1105 and "(Train ticket) to [Shenzhen]" 1106. The fifth interface 1303 shown in FIG. 13(*b*) further includes fourth prompt information "Purchase (milk) through [Taobao]" 1304.

The fifth operation performed by the user in the fifth interface may be a tap operation (for example, a single tap operation) performed by the user on an "OK" button in the fifth interface. For example, the fifth operation may be a tap operation performed by the user on an "OK" button shown in FIG. 11(*b*). Alternatively, the fifth operation performed by the user in the fifth interface may be a preset gesture entered by the user in the fifth interface. For example, the preset gesture may be a slide-up gesture, an S-shaped gesture, or the like.

It may be understood that some users do not enter the second text information in the alias input box in the fifth interface. In other words, the user does not create an alias for the first text information. In this case, the terminal 100 may directly display the fourth interface in response to the fifth operation. For example, the mobile phone 300 may display, in response to the tap operation performed by the user on the "OK" button shown in FIG. 11(*b*), a fourth interface 1108 shown in FIG. 11(*c*).

Some other users enter the second text information in the alias input box in the fifth interface, to create an alias for the first text information. In this case, after the terminal 100 displays the fifth interface, the terminal 100 may receive the second text information entered by the user in the alias input box, and display the second text information in the alias input box. Correspondingly, the terminal 100 may store the second text information and a correspondence between the second text information and the operation information in response to the fifth operation performed by the user in the fifth interface. In this way, after receiving a second voice command whose text is the same as the second text information, the terminal 100 may perform, based on the operation information corresponding to the second text information, an operation corresponding to the operation information.

For example, the mobile phone 300 may receive second text information "Milk in Taobao" entered by the user in the alias input box 1305 in the fifth interface 1303 shown in FIG. 13(*b*), and display a fifth interface 1306 shown in FIG. 13(*c*). In the fifth interface 1306 shown in FIG. 13(*c*), the second text information "Milk in Taobao" is displayed in the alias input box 1305. The mobile phone 300 may display, in response to a tap operation performed by the user on an "OK" button shown in FIG. 13(*c*), a fourth interface 1308 that is shown in FIG. 13(*d*) and that includes second text information "Milk in Taobao" 1310.

It is assumed that the second text information is "Milk in Taobao", and the operation information includes the application identifier "Taobao", the operation indication information a, the operation indication information b, and the search word "Milk". The mobile phone 300 may store a correspondence between the second text information "Milk in Taobao" and the operation information including the application identifier "Taobao", the operation indication information a, the operation indication information b, and the search word "Milk". The correspondence between the second text information and the operation information is used to: when the terminal 100 receives the second voice command whose text is the same as the second text information, indicate the terminal 100 to simulate the user to trigger the terminal 100 to perform an operation corresponding to the second voice command, and display a corresponding operation interface.

According to the voice control command generation method provided in this embodiment of this application, the terminal 100 may further provide a service of the alias (namely, the second text information) created by the user for the first text information. In addition, when receiving the second text information, the voice assistant of the terminal 100 may also simulate the user to trigger the terminal 100 to perform an operation corresponding to the second voice command, and display a corresponding operation interface. In this way, flexibility of custom voice control can be improved and user experience can be improved.

It may be understood that to implement the foregoing functions, the terminal or the like includes corresponding hardware structures and/or software modules for performing the functions. A person skilled in the art should be easily aware that units, algorithms, and steps in the examples described with reference to the embodiments disclosed in this specification, the embodiments of this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the terminal or the like may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that in the embodiments of this application, division into the modules is an example and is merely logical function division, and may be other division in an actual implementation.

Figure 14:
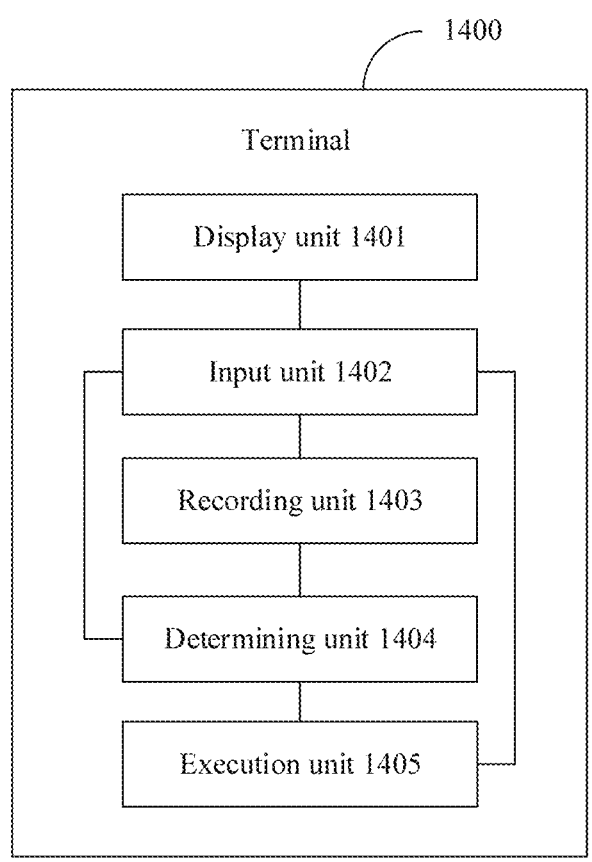
FIG. 14 is a schematic structural composition diagram 1 of a terminal according to an embodiment of this application.

When each function module is obtained through division based on each corresponding function, FIG. 14 is a possible schematic structural diagram of a terminal in the foregoing embodiments. The terminal 1400 includes a display unit 1401, an input unit 1402, a recording unit 1403, a determining unit 1404, and an execution unit 1405.

The display unit 1401 is configured to support the terminal 1400 in performing the operation of "displaying the prompt information in response to the first operation", S201, S202, and S204 in the foregoing method embodiment, and/or is configured to perform another process of the technology described in this specification.

The input unit 1402 is configured to support the terminal 1400 in performing the operation of "receiving the first operation entered by the user", the operation of "receiving the second operation entered by the user", the operation of "receiving the fourth operation entered by the user in the first interface", S205, S207, the operation of "receiving the fifth operation entered by the user", and the operation of "receiving the second text information entered by the user in the alias input box" in the foregoing method embodiment, and/or is configured to perform another process of the technology described in this specification. The recording unit 1403 is configured to support the terminal 1400 in performing S203 in the foregoing method embodiment, and/or is configured to perform another process of the technology described in this specification. The determining unit 1404 is configured to support the terminal 1400 in performing S206 in the foregoing method embodiment, and/or is configured to perform another process of the technology described in this specification. The execution unit 1405 is configured to support the terminal 1400 in performing S208 and S902 in the foregoing method embodiment, and/or is configured to perform another process of the technology described in this specification.

The terminal 1400 may further include a generation unit and a storage unit. The generation unit is configured to support the terminal 1400 in performing S901 in the foregoing method embodiment, and/or is configured to perform another process of the technology described in this specification.

The storage unit is configured to store operation information, first text information, second text information, a first template text, a correspondence between the second text information and the operation information, and the like.

All related content of the steps in the foregoing method embodiments may be cited in function descriptions of corresponding function modules. Details are not described herein again.

Certainly, the terminal 1400 includes but is not limited to the units and modules listed above. For example, the terminal 1400 may further include a receiving unit and a sending unit. The receiving unit is configured to receive data or an instruction sent by another terminal. The sending unit is configured to send data or an instruction to another terminal. In addition, functions that can be specifically implemented by the function units include but are not limited to functions corresponding to the method steps in the foregoing instances. For detailed descriptions of other units of the terminal 1400, refer to detailed descriptions of the method steps corresponding to the units. Details are not described herein again in this embodiment of this application.

Figure 15:
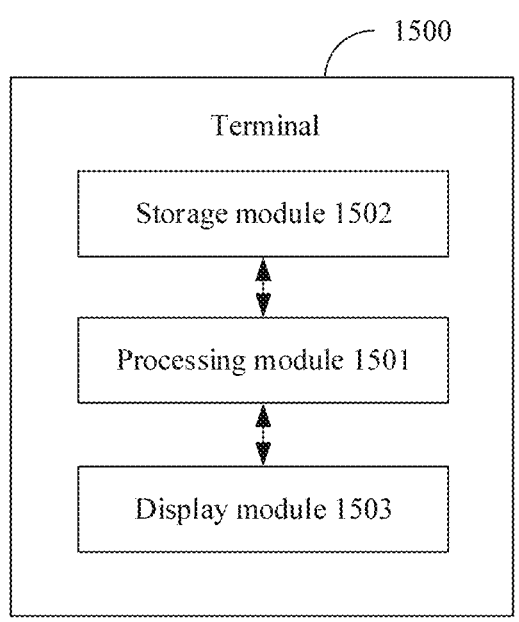
FIG. 15 is a schematic structural composition diagram 2 of a terminal according to an embodiment of this application.

When an integrated unit is used, FIG. 15 is a possible schematic structural diagram of a terminal in the foregoing embodiments. The terminal 1500 includes a processing module 1501, a storage module 1502, and a display module 1503. The processing module 1501 is configured to: control and manage an action of the terminal 1500. The display module 1503 is configured to display an image generated by the processing module 1501. The storage module 1502 is configured to store program code and data that are of the terminal. For example, the storage module 1502 stores operation information, first text information, second text information, a first template text, a correspondence between the second text information and the operation information, and the like. Optionally, the terminal 1500 may further include a communications module, configured to support the terminal in communicating with another network entity. For detailed descriptions of the units included in the terminal 1500, refer to the descriptions in the foregoing method embodiments. Details are not described herein again.

The processing module 1501 may be a processor or a controller, for example, may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), another programmable logic device, a transistor logic device, a hardware component, or any combination thereof. The processor may implement or execute various example logical blocks, modules, and circuits described with reference to content disclosed in this application. The processor may alternatively be a combination of processors implementing a computing function, for example, a combination of one or more microprocessors or a combination of a DSP and a microprocessor. The communications module may be a transceiver, a transceiver circuit, a communications interface, or the like. The storage module 1502 may be a memory.

When the processing module 1501 is a processor (for example, the processor 110 shown in FIG. 1), the communications module includes a Wi-Fi module and a Bluetooth module (for example, the communications module 160 shown in FIG. 1). The communications module such as the Wi-Fi module and the Bluetooth module may be collectively referred to as a communications interface. The storage module 1502 is a memory (for example, the internal memory 121 shown in FIG. 1). When the display module 1503 is a touchscreen (including the display screen 194 shown in FIG. 1), the terminal provided in this embodiment of this application may be the terminal 100 shown in FIG. 1. The processor, the communications interface, the touchscreen, and the memory may be coupled together by using a bus.

An embodiment of this application further provides a computer storage medium. The computer storage medium stores computer program code, and when the processor executes the computer program code, the terminal performs related method steps in FIG. 2 or FIG. 9 to implement the method in the foregoing embodiment.

An embodiment of this application further provides a computer program product. When the computer program product is run on a computer, the computer is enabled to perform related method steps in FIG. 2 or FIG. 9 to implement the method in the foregoing embodiment.

The terminal 1400, the terminal 1500, the computer storage medium, and the computer program product provided in the embodiments of this application each are configured to perform the corresponding method provided above. Therefore, for beneficial effects that can be achieved by the terminal 1400, the terminal 1500, the computer storage medium, and the computer program product, refer to the beneficial effects in the corresponding method provided above. Details are not described herein again.

Based on the foregoing descriptions of the implementations, a person skilled in the art may clearly understand that for the purpose of convenient and brief descriptions, division into the foregoing function modules is merely used as an example for illustration. In actual application, the foregoing functions can be allocated to different modules for implementation based on a requirement, that is, an inner structure of an apparatus is divided into different function modules to implement all or some of the functions described above.

In the several embodiments provided in this application, it should be understood that the disclosed apparatus and method may be implemented in another manner. For example, the described apparatus embodiments are merely examples. For example, division into the modules or units is merely logical function division, and may be other division in an actual implementation. For example, a plurality of units or components may be combined or may be integrated into another apparatus, or some features may be ignored or not be performed. In addition, the displayed or discussed mutual couplings or direct couplings or communication connections may be implemented through some interfaces. The indirect couplings or communication connections between the apparatuses or units may be implemented in an electronic form, a mechanical form, or in another form.

The units described as separate parts may or may not be physically separate, and parts displayed as units may be one or more physical units, and may be located in one place, or may be distributed on different places. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The storage medium includes any medium that can store program code, for example, a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A voice control command generation method implemented by a terminal, wherein the voice control command generation method comprises:
   displaying, in response to a first operation, prompt information prompting a user to enter a to-be-recorded operation;
   receiving, from the user, one or more operations;
   recording, in response to a second operation of the one or more operations, operation information corresponding to the one or more operations;
   determining, based on a third operation of the one or more operations, first text information corresponding to the operation information, wherein the first text information comprises a first part and a second part;
   receiving a first voice command; and
   performing a first corresponding operation based on the operation information when a first text corresponding to the first voice command matches the first text information, wherein the first text matches the first text information comprises:
      the first text is not the same as the first text information; and
      a first location relationship of a third part and a fourth part in the first text is the same as a second location relationship between the first part and the second part, and
      wherein either the third part is different from the first part or the fourth part is different from the second part.

2. The voice control command generation method of claim 1, wherein the operation information comprises a first application identifier, a first interface identifier, a first search word, and operation indication information, wherein the first application identifier is of an operation object application corresponding to the one or more operations, wherein the first interface identifier is of an operation object interface corresponding to the one or more operations, wherein the operation indication information indicates an operation performed in the operation object interface through the one or more operations, wherein the first part comprises the first application identifier or the first interface identifier, and wherein the second part comprises the first search word.

3. The voice control command generation method of claim 2, wherein before determining the first text information, the voice control command generation method further comprises:
   displaying, in response to the second operation, a third interface comprising at least two pieces of text information, wherein the at least two pieces of text information are a statement formed by connecting the first application identifier or the first interface identifier and the first search word based on a preset location relationship using a connection word;
   receiving, from the user, the third operation on the first text information in the at least two pieces of text information, wherein the third operation selects the first text information from the at least two pieces of text information; and
   determining, in response to the third operation, the first text information as second text information corresponding to the operation information.

4. The voice control command generation method of claim 2, wherein after determining the first text information and before receiving the first voice command, the voice control command generation method further comprises:
   generating a first template text by replacing the second part with type information of the first search word; and
   identifying that the first text matches the first template text, wherein the third part is the same as the first part, wherein the first location relationship is the same as the second location relationship, and wherein the fourth part is a word of a type indicated by the type information.

5. The voice control command generation method of claim 4, wherein after generating the first template text and before receiving the first voice command, the voice control command generation method further comprises displaying a fourth interface prompting the user to send, through a voice assistant, the first voice command that matches the first template text to trigger the terminal to perform a second corresponding operation.

6. The voice control command generation method of claim 5, wherein before displaying the fourth interface, the voice control command generation method further comprises:
   displaying a fifth interface comprising an alias input box, wherein the alias input box receives third text information, and wherein the third text information is an alias for the first text information;
   receiving the third text information from the user in the alias input box;
   displaying the third text information in the alias input box;
   receiving a fifth operation from the user in the fifth interface, wherein the fifth operation triggers the terminal to end recording of text information;
   displaying the fourth interface in response to the fifth operation; and
   storing, in response to the fifth operation, the third text information and a correspondence between the third text information and the operation information, wherein the fourth interface further comprises the third text information.

7. The voice control command generation method of claim 6, further comprising:
   receiving, from the user, a second voice command through the voice assistant; and
   performing, based on the correspondence, a sixth operation corresponding to the operation information when a second text of the second voice command is the same as the third text information.

8. The voice control command generation method of claim 1, further comprising:
   displaying, in response to the first operation, the prompt information in a first interface of a voice assistant;
   receiving, from the user, a fourth operation in the first interface;
   displaying, in response to the fourth operation, a second interface to enter, by the user, the one or more operations; and
   receiving, from the user, the one or more operations in the second interface.

9. A terminal comprising:
   a display;
   a memory configured to store computer instructions and information of a voice assistant; and
   a processor coupled to the display and the memory and configured to:
      display, using the display and in response to a first operation, prompt information prompting a user to enter a to-be-recorded operation;
      receive, from the user, one or more operations;

record, in response to a second operation of the one or more operations, operation information corresponding to the one or more operations;

store the operation information in the memory;

determine, based on a third operation of the one or more operations, first text information corresponding to the operation information, wherein the first text information comprises a first part and a second part;

receive a first voice command; and perform a first corresponding operation based on the operation information when a first text corresponding to the first voice command matches the first text information, wherein the first text matches the first text information comprises:

the first text is not the same as the first text information; and a first location relationship of a third part and a fourth part in the first text is the same as a second location relationship between the first part and the second part, and wherein either the third part is different from the first part or the fourth part is different from the second part.

10. The terminal of claim 9, wherein the operation information comprises a first application identifier, a first interface identifier, a first search word, and operation indication information, wherein the first application identifier is of an operation object application corresponding to the one or more operations, wherein the first interface identifier is of an operation object interface corresponding to the one or more operations, wherein the operation indication information indicates an operation performed in the operation object interface through the one or more operations, wherein the first part comprises the first application identifier or the first interface identifier, and wherein the second part comprises the first search word.

11. The terminal of claim 10, wherein the processor is further configured to:

display, using the display and in response to the second operation, a third interface before determining the first text information, wherein the third interface comprises at least two pieces of text information, wherein the at least two pieces of text information are a statement formed by connecting the first application identifier or the first interface identifier and the first search word based on a preset location relationship using a connection word;

receive, from the user, the third operation on the first text information in the at least two pieces of text information, wherein the third operation selects the first text information from the at least two pieces of text information; and determine, in response to the third operation, the first text information as second text information corresponding to the operation information.

12. The terminal of claim 10, wherein the processor is further configured to:

generate a first template text by replacing the second part with type information of the first search word after determining the first text information and before receiving the first voice command; and determine that the first text matches the first text information when the first text matches the first template text, wherein the third part is the same as the first part, wherein the first location relationship is the same as the second location relationship, and wherein the fourth part is a word of a type indicated by the type information.

13. The terminal of claim 12, wherein after generating the first template text and before receiving the first voice command, the processor is further configured to display, using the display, a fourth interface prompting the user to send, through the voice assistant, the first voice command that matches the first template text to trigger the terminal to perform a second corresponding operation.

14. The terminal of claim 13, wherein the processor is further configured to:

display, using the display, a fifth interface comprising an alias input box before displaying the fourth interface, wherein the alias input box receives third text information, and wherein the third text information is an alias for the first text information;

receive the third text information from the user in the alias input box;

display, using the display, the third text information in the alias input box;

receive, from the user, a fifth operation in the fifth interface, wherein the fifth operation triggers the terminal to end recording of text information;

display, using the display, the fourth interface; and store, in response to the fifth operation, the third text information and a correspondence between the third text information and the operation information in the memory, wherein the fourth interface further comprises the third text information.

15. The terminal of claim 14, wherein the processor is further configured to:

receive, from the user, a second voice command through the voice assistant; and perform, based on the correspondence, a sixth operation corresponding to the operation information when a second text of the second voice command is the same as the second text information.

16. The terminal of claim 9, wherein the processor is further configured to:

display, using the display and in response to the first operation, the prompt information in a first interface of the voice assistant;

receive, from the user, a fourth operation in the first interface;

display, using the display and in response to the fourth operation a second interface to enter, by the user, the one or more operations; and receive, from the user, the one or more operations in the second interface.

17. A computer program product comprising computer-executable instructions stored on a non-transitory computer-readable storage medium that, executed by a processor, cause a terminal to:

display, in response to a first operation, a prompt information prompting a user to enter a to-be-recorded operation;

receive, from the user, one or more operations;

record, in response to a second operation of the one or more operations, operation information corresponding to the one or more operations;

determine, based on a third operation of the one or more operations, first text information corresponding to the operation information, wherein the first text information comprises a first part and a second part;

receive a first voice command; and perform a first corresponding operation based on the operation information when a first text corresponding to the first voice command matches the first text information, wherein the first text matches the first text information comprises:
the first text is not the same as the first text information; and
a first location relationship of a third part and a fourth part in the first text is the same as a second location relationship between the first part and the second part, and
wherein either the third part is different from the first part or the fourth part is different from the second part.

18. The computer program product of claim 17, wherein the operation information comprises a first application identifier, a first interface identifier, a first search word, and operation indication information, wherein the first application identifier is of an operation object application corresponding to the one or more operations, wherein the first interface identifier is of an operation object interface corresponding to the one or more operations, wherein the operation indication information indicates an operation performed in the operation object interface through the one or more operations, wherein the first part comprises the first application identifier or the first interface identifier, and wherein the second part comprises the first search word.

19. The computer program product of claim 18, wherein before determining the first text information, the method computer-executable instructions further cause the terminal to:

display, in response to the second operation, a third interface comprising at least two pieces of text information, wherein the at least two pieces of text information are a statement formed by connecting the first application identifier or the first interface identifier and the first search word based on a preset location relationship using a connection word;

receive, from the user, the third operation on the first text information in the at least two pieces of text information, wherein the third operation selects the first text information from the at least two pieces of text information; and determine, in response to the third operation, the first text information as second text information corresponding to the operation information.

20. The computer program product of claim 17, wherein the computer-executable instructions further cause the terminal to:

display, in response to the first operation, the prompt information in a first interface of a voice assistant;

receive, from the user, a fourth operation in the first interface;

display, in response to the fourth operation, a second interface to enter, by the user, the one or more operations; and receive, from the user, the one or more operations in the second interface.

* * * * *

UNITED STATES PATENT AND TRADEMARK OFFICE
CERTIFICATE OF CORRECTION

PATENT NO. : 11,848,016 B2
APPLICATION NO. : 17/266448
DATED : December 19, 2023
INVENTOR(S) : Jun Xu It is certified that error appears in the above-identified patent and that said Letters Patent is hereby corrected as shown below:

In the Claims

Claim 19, Column 47, Line 28: "information, the method" should read "information, the"

Signed and Sealed this
Thirteenth Day of February, 2024

Katherine Kelly Vidal
*Director of the United States Patent and Trademark Office*